(12) United States Patent
Inoue et al.

(10) Patent No.: US 12,224,658 B2
(45) Date of Patent: Feb. 11, 2025

(54) POWER CONVERSION DEVICE

(71) Applicant: Mitsubishi Electric Corporation, Tokyo (JP)

(72) Inventors: Sadayuki Inoue, Tokyo (JP); Koki Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 18/271,308

(22) PCT Filed: Jan. 15, 2021

(86) PCT No.: PCT/JP2021/001210
§ 371 (c)(1),
(2) Date: Jul. 7, 2023

(87) PCT Pub. No.: WO2022/153477
PCT Pub. Date: Jul. 21, 2022

(65) Prior Publication Data
US 2024/0055975 A1    Feb. 15, 2024

(51) Int. Cl.
*H02M 1/12* (2006.01)
*H02J 3/38* (2006.01)
(Continued)

(52) U.S. Cl.
CPC ............. *H02M 1/12* (2013.01); *H02J 3/381* (2013.01); *H02M 1/0009* (2021.05); *H02M 7/42* (2013.01); *H02J 2300/22* (2020.01)

(58) Field of Classification Search
CPC ........ H02M 1/12; H02M 1/0009; H02M 7/42; H02M 1/007; H02M 3/00; H02M 7/44;
(Continued)

(56) References Cited

U.S. PATENT DOCUMENTS

2017/0235322 A1* 8/2017 Rahmani ............... H02J 3/381
                                                          700/295
2019/0334352 A1* 10/2019 Sugimoto ............. H02M 7/48
(Continued)

FOREIGN PATENT DOCUMENTS

| EP | 3780310 A1 | 2/2021 |
| JP | 2018-107991 A | 7/2018 |
| JP | 2019-176584 A | 10/2019 |

OTHER PUBLICATIONS

International Search Report and Written Opinion mailed on Mar. 30, 2021, received for PCT Application PCT/JP2021/001210, filed on Jan. 15, 2021, 8 pages including English Translation.
(Continued)

*Primary Examiner* — Lincoln D Donovan
*Assistant Examiner* — Alex W Lam
(74) *Attorney, Agent, or Firm* — XSENSUS LLP

(57) ABSTRACT

A power conversion device includes a converter, an inverter, a converter control circuit, a virtual synchronous generator control circuit to impart a transient characteristic of a synchronous generator to the inverter, and an inverter control circuit to control the inverter. The virtual synchronous generator control circuit calculates a switching frequency at which charge/discharge of the distributed power source is switched, based on information necessary for virtual synchronous generator control. The converter control circuit uses the switching frequency to create a frequency range of AC system voltage for providing a dead zone in which charge/discharge power of the distributed power source is zero in a drooping characteristic of the power conversion device, or a hysteresis in switching of charge/discharge of the distributed power source. The converter control circuit performs control such that charge/discharge power of the
(Continued)

distributed power source becomes zero in the frequency range.

12 Claims, 46 Drawing Sheets

(51) Int. Cl.
*H02M 1/00* (2007.01)
*H02M 7/42* (2006.01)

(58) Field of Classification Search
CPC .... H02M 1/0025; H02J 3/381; H02J 2300/22; H02J 2300/24; H02J 3/32; H02J 3/38
See application file for complete search history.

(56) References Cited

U.S. PATENT DOCUMENTS

2020/0212823 A1* 7/2020 Gong ...................... H02J 3/381
2020/0343825 A1* 10/2020 Schurch .................. H02M 7/48

OTHER PUBLICATIONS

U.S. Appl. No. 18/014,747, filed Jan. 6, 2023, 138 pages.

* cited by examiner

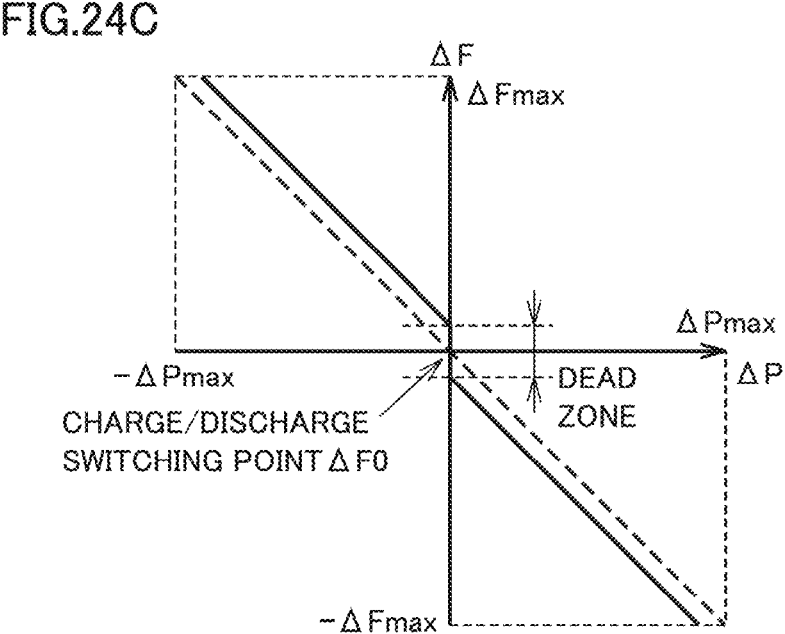

POWER CONVERSION DEVICE

TECHNICAL FIELD

The present disclosure relates to a power conversion device.

BACKGROUND ART

In recent years, energy creation devices using renewable energy, such as photovoltaic batteries, have been increasingly introduced in order to reduce environmental loads. Meanwhile, in order to address power shortages after the Great East Japan Earthquake, systems including energy storage devices such as storage batteries or systems including energy creation devices and energy storage devices in combination have been commercialized. These systems employ static inverters in order to interconnect energy creation devices and energy storage devices to AC systems.

In power grids, with increase of the amount of power generation using renewable energy, thermal power plants serving to adjust the amount of power generation for demand fluctuations are expected to be closed, from the viewpoint of reducing power generation costs including management costs. However, synchronous generators in thermal power plants potentially have functions (for example, inertial force, synchronization force, etc.) to suppress fluctuations of the system frequency when they occur. Therefore, if more thermal power plants are closed, the number of synchronous generators will be decreasing to make it difficult to keep the stability of power grids.

In order to solve the above problem, technology has been developed for controlling virtual synchronous generators which are static inverters provided with the functions of synchronous generators. For example, Japanese Patent Laying-Open No. 2019-176584 (PTL 1) discloses a method of setting a control parameter for a distributed power source (static inverter) equipped with virtual synchronous generator control. Specifically, PTL 1 discloses a method of generating a control parameter for setting virtual inertia in a distributed power source, based on at least one of a required inertia value required by a grid operator and a virtual inertia value calculated based on a specification and an operation state of the distributed power source.

CITATION LIST

Patent Literature

PTL 1: Japanese Patent Laying-Open No. 2019-176584

SUMMARY OF INVENTION

Technical Problem

The method of generating a control parameter described in PTL 1 ensures the grid inertial force intended by the grid operator. However, in a configuration in which a plurality of storage batteries each having a static inverter equipped with virtual synchronous generator control operate as main power sources in an independent micro-grid or the like, the power consumption of loads and the generated power of energy creation devices sometimes balance due to load fluctuations or fluctuations in generated power of energy creation devices. In this case, it is preferable that the charge/discharge power of each storage battery becomes zero.

However, since voltmeters and ammeters mounted in storage batteries have measurement errors, the charge/discharge power of each storage battery is not always controlled to be zero due to the errors. In this case, unnecessary charge/discharge may be performed, for example, discharge power of a first storage battery among a plurality of storage batteries charges a second storage battery. Such unnecessary charge/discharge or repeated charge/discharge may cause power loss resulting from charge/discharge and give unnecessary damage to the storage batteries. In PTL 1, a control parameter is generated only based on the grid inertia force required by the grid operator, and the problem described above is not taken into consideration.

The present disclosure is made to solve the problem described above and an object of the present disclosure is to suppress unnecessary charge/discharge among a plurality of distributed power sources when the power consumption of loads and the generated power of energy creation devices balance in an AC system in which a plurality of distributed power sources having static inverters equipped with virtual synchronous generator control are interconnected.

Solution to Problem

According to an aspect of the present disclosure, a power conversion device is connected to an AC system and equipped with virtual synchronous generator control. The power conversion device includes: a converter to convert a first DC voltage output from a distributed power source into a second DC voltage; an inverter to convert the second DC voltage output from the converter into an AC voltage and output the AC voltage to an AC system; a communication circuit to receive information necessary for the virtual synchronous generator control given from a management device that manages the distributed power source; a first voltmeter to measure the second DC voltage; a second voltmeter to measure an AC system voltage of the AC system; a converter control circuit to control the converter; a virtual synchronous generator control circuit to impart a transient characteristic of a synchronous generator to the inverter; and an inverter control circuit to control the inverter as a voltage source, based on AC system voltage information input from the virtual synchronous generator control circuit. The information necessary for virtual synchronous generator control includes a power target value of the power conversion. The virtual synchronous generator control circuit calculates a switching frequency at which charge/discharge of the distributed power source is switched, based on the information necessary for virtual synchronous generator control. The converter control circuit uses the switching frequency to create a frequency range of AC system voltage for providing a dead zone in which charge/discharge power of the distributed power source is zero in a drooping characteristic of the power conversion device, or a hysteresis in switching of charge/discharge of the distributed power source. The converter control circuit performs control such that charge/discharge power of the distributed power source becomes zero in the frequency range.

Advantageous Effects of Invention

According to the present disclosure, in a power grid in which a plurality of distributed power sources having static inverters equipped with virtual synchronous generator control are interconnected, unnecessary charge/discharge among a plurality of distributed power sources can be suppressed when the power consumption of loads and the generated power of energy creation devices balance.

BRIEF DESCRIPTION OF DRAWINGS

FIG. 24C is a diagram illustrating a third example of the ΔP/ΔF characteristic of power conversion device 41 equipped with virtual synchronous generator control according to the first embodiment.

DESCRIPTION OF EMBODIMENTS

Figure 1:
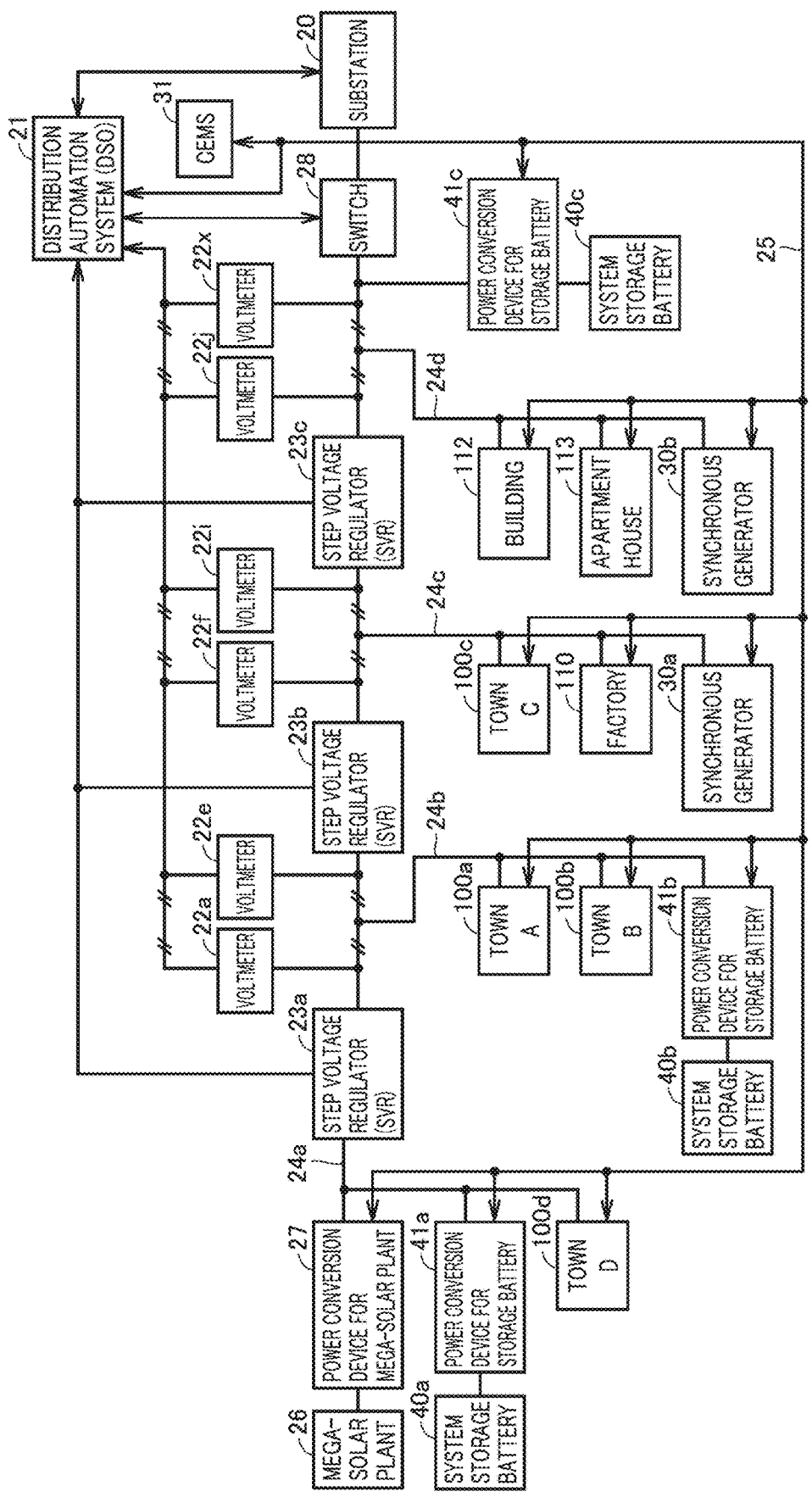
FIG. 1 is a block diagram illustrating a configuration example of a distribution system.

Embodiments of the present disclosure will be described in detail below with reference to the drawings. In the following, like or corresponding parts in the drawings are denoted by like reference signs and a description thereof is basically not repeated.

First Embodiment (Configuration Example of Distribution System)

First of all, a configuration example of a distribution system to which a power conversion device according to a first embodiment is connected will now be described. Although a three-phase system is described by way of example in the first embodiment, the distribution system may be a single-phase system.

FIG. 1 is a block diagram illustrating a configuration example of a distribution system 24. As illustrated in FIG. 1, distribution system 24 receives power supply from a substation 20. A plurality of step voltage regulators (SVRs) 23a to 23c are provided in distribution system 24. A plurality of SVRs 23a to 23c are provided in series with respect to a power flow. A building 112, an apartment house 113, town A100a to town D100d, a factory 110, a power conversion device 27 for a mega-solar plant, power conversion devices 41a to 41c for system storage batteries, and synchronous generators 30a and 30b are connected to a plurality of SVRs 23a to 23c. In the following description, SVRs 23a to 23c may be collectively referred to as "SVR 23". Power conversion devices 41a to 41c may be collectively referred to as "power conversion device 41".

A plurality of voltmeters 22a, 22e, 22f, 22i, 22j, and 22x are disposed in distribution system 24. Hereinafter, voltmeters 22a, 22e, 22f, 22i, 22j, and 22x may be collectively referred to as "voltmeter 22". The measurement value of each voltmeter 22 is transmitted to a distribution automation system 21 (which hereinafter may be referred to as "DSO 21") at predetermined periods. DSO 21 corresponds to an example of "system management device" that manages distribution system 24.

Tap position information, and information on primary-side voltage and secondary-side voltage of SVR 23 are sent to DSO 21. In the first embodiment, SVR 23 gives notification of tap position information, and primary-side voltage and secondary-side voltage information at predetermined periods and gives notification of tap position information, and primary-side voltage and secondary-side voltage information on a non-regular basis at the time of tap change.

A community energy management system (CEMS) 31 collects information such as a variety of measurement values from consumers (towns 100a to 100d, factory 110, building 112, apartment house 113), power conversion device 27, synchronous generators 30a and 30b, and power conversion devices 41a to 41c at predetermined periods. CEMS 31 notifies DSO 21 of the collected data in response to a request from DSO 21. The power consumption of consumers and the generated power of energy creation devices in towns 100a to 100d are measured by smart meters (not shown) installed at the consumers. CEMS 31 collects the measurement values of smart meters at predetermined periods (for example, every 30 minutes). CEMS 31 corresponds to an example of "management device".

A mega-solar plant 26 is connected to power conversion device 27. System storage batteries 40a to 40c are respectively connected to power conversion devices 41a to 41c. Storage batteries 40a to 40c are large-capacity storage batteries that can be connected to distribution system 24. In the following description, storage batteries 40a to 40c may be collectively referred to as "storage battery 40".

Figure 2:
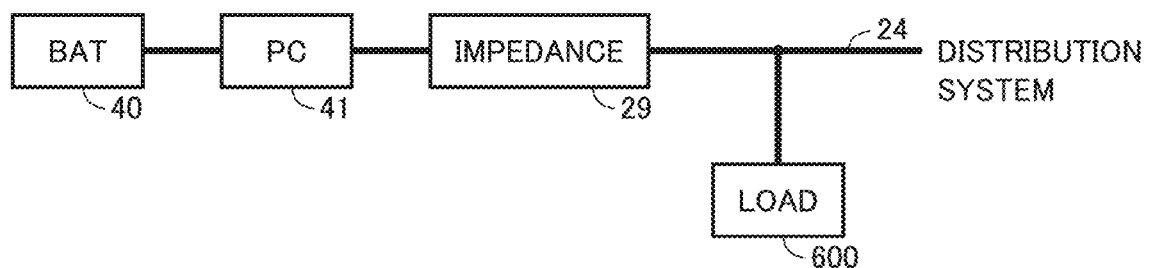
FIG. 2 is a block diagram for further explaining a configuration of the distribution system illustrated in FIG. 1.

FIG. 2 is a block diagram for further explaining a configuration of distribution system 24 illustrated in FIG. 1.

As illustrated in FIG. 2, a load 600, power conversion device 41, and storage battery 40 are connected to distribution system 24. For simplicity of explanation, in FIG. 2, impedance 29 of distribution system 24 is represented in a lumped parameter system. Impedance 29 of distribution system 24 is composed of a reactor component and a resistance component.

(1) CEMS 31

Figure 3:
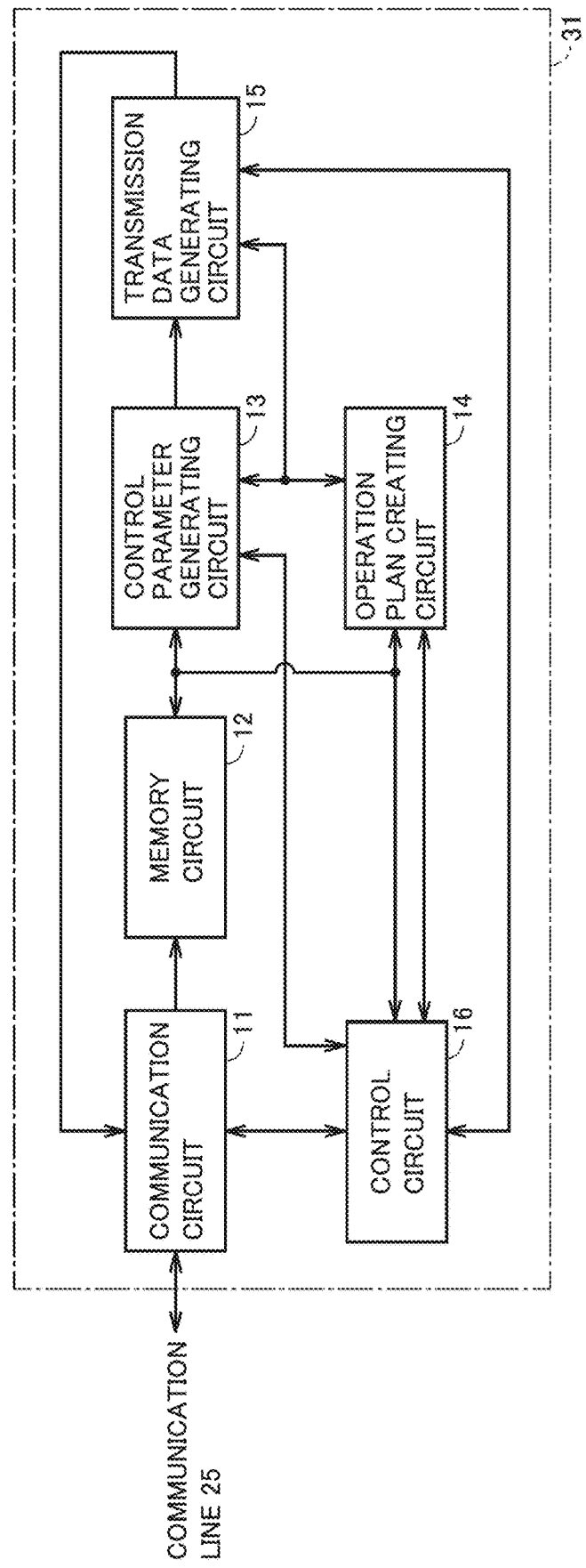
FIG. 3 is a block diagram illustrating a configuration of a CEMS illustrated in FIG. 1.

FIG. 3 is a block diagram illustrating a configuration of CEMS 31 illustrated in FIG. 1.

As illustrated in FIG. 3, CEMS 31 includes a communication circuit 11, a memory circuit 12, a control parameter generating circuit 13, an operation plan creating circuit 14, a transmission data generating circuit 15, and a control circuit 16.

Communication circuit 11 communicates with DSO 21, consumers (towns 100a to 100d, factory 110, building 112, apartment house 113), power conversion device 27, synchronous generators 30a and 30b, and power conversion devices 41a to 41c via a communication line 25.

Memory circuit 12 stores a variety of information acquired through communication circuit 11. The variety of information includes measurement results and status information of each distributed power source.

Control parameter generating circuit 13 generates control parameters of virtual synchronous generator control implemented in each of power conversion device 41a to 41c.

Operation plan creating circuit 14 creates operation plans of power conversion devices 41a to 41c, based on a control command from DSO 21. The operation plans of power conversion devices 41a to 41c include charge/discharge plans (power target values) of the corresponding storage batteries 40a to 40c. In the first embodiment, operation plan creating circuit 14 creates an operation plan for 24 hours, every 30 minutes.

Further, operation plan creating circuit 14 determines whether the operation plan needs to be revised, based on the measurement results of power conversion devices 41a to 41c collected in units of five minutes, state of charge (SOC) information of storage batteries 40a to 40c, and the like. If it is determined that the operation plan needs to be revised, operation plan creating circuit 14 revises the operation plan for a period until it is notified of a control command from DSO 21 next time.

Transmission data generating circuit 15 stores the control parameters of virtual synchronous generator control generated by control parameter generating circuit 13 and the operation plan output from operation plan creating circuit 14. Transmission data generating circuit 15 outputs the stored data to communication circuit 11, in response to a transmission command from control circuit 16. Communication circuit 11 transmits the data output from transmission data generating circuit 15 to communication line 25 in accordance with a control signal output from control circuit 16.

Control circuit 16 is a control circuit for managing a distributed power source connected to distribution system 24. Control circuit 16 manages the operation of communication circuit 11, memory circuit 12, control parameter generating circuit 13, operation plan creating circuit 14, and transmission data generating circuit 15.

(1-1) Operation Plan Creating Circuit 14

Figure 4:
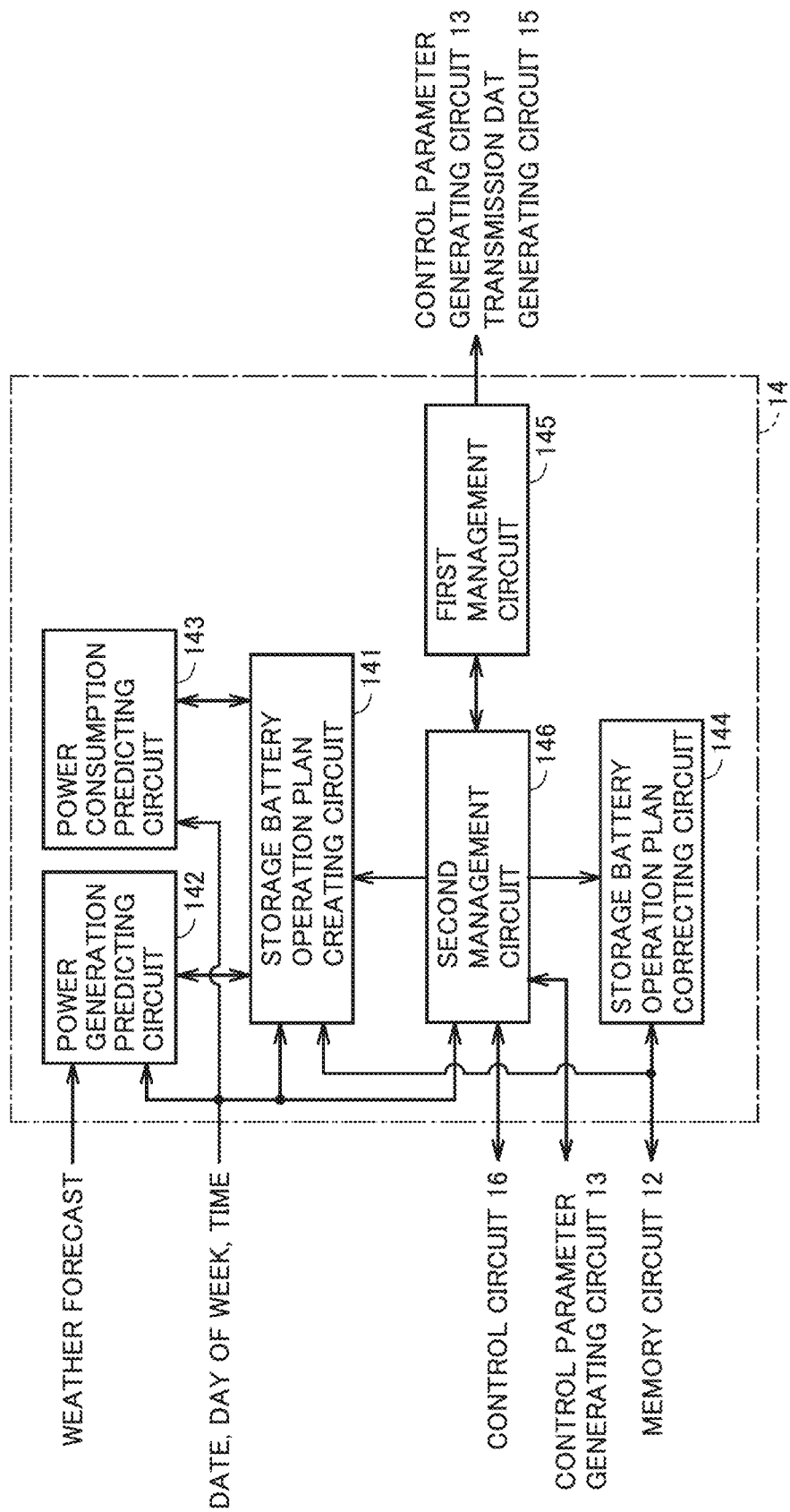
FIG. 4 is a block diagram illustrating a configuration of an operation plan creating circuit illustrated in FIG. 3.

FIG. 4 is a block diagram illustrating a configuration of operation plan creating circuit 14 illustrated in FIG. 3.

As illustrated in FIG. 4, operation plan creating circuit 14 includes a storage battery operation plan creating circuit 141, a power generation predicting circuit 142, a power consumption predicting circuit 143, a storage battery operation plan correcting circuit 144, a first management circuit 145, and a second management circuit 146.

Storage battery operation plan creating circuit 141 creates operation plans (power target values) of power conversion devices 41a, 41b, and 41c, based on information on a control command given from DSO 21, a prediction result of the amount of power generation of mega-solar plant 26 predicted by power generation predicting circuit 142, and information on a prediction result of power consumption of consumers predicted by power consumption predicting circuit 143. The control command that storage battery operation plan creating circuit 141 is notified of from DSO 21 includes a plan value of power consumed downstream of substation 20 (supply power to distribution system 24). The plan value of supply power is formed from plan values for 24 hours every 30 minutes.

Power generation predicting circuit 142 acquires weather forecast information for 24 hours from a not-shown weather forecast server through communication circuit 11. Power generation predicting circuit 142 predicts the generated power of mega-solar plant 26, based on the acquired weather forecast information and information of a database (not shown) prepared for predicting power generation.

Power consumption predicting circuit 143 predicts the total of power consumption of each consumer, based on clock information inside CEMS 31 (year, month, date, day of week, time) and information of a database (not shown) prepared for predicting power consumption.

Storage battery operation plan correcting circuit 144 determines whether an operation plan needs to be revised, based on the amount of charge/discharge power of power conversion devices 41a to 41c and power target value information, through communication circuit 11. If it is determined a revision is needed, storage battery operation plan correcting circuit 144 generates a revision value of the operation plan.

First management circuit 145 stores the power target value (charge power target value and discharge power target value) of each storage battery 40 generated by storage battery operation plan creating circuit 141 and storage battery operation plan correcting circuit 144. First management circuit 145 outputs the power target value to control parameter generating circuit 13 and transmission data generating circuit 15, based on a control signal output from second management circuit 146.

Second management circuit 146 manages the operation of storage battery operation plan creating circuit 141, power generation predicting circuit 142, power consumption predicting circuit 143, storage battery operation plan correcting circuit 144, and first management circuit 145.

(1-2) Control Parameter Generating Circuit 13

Figure 5:
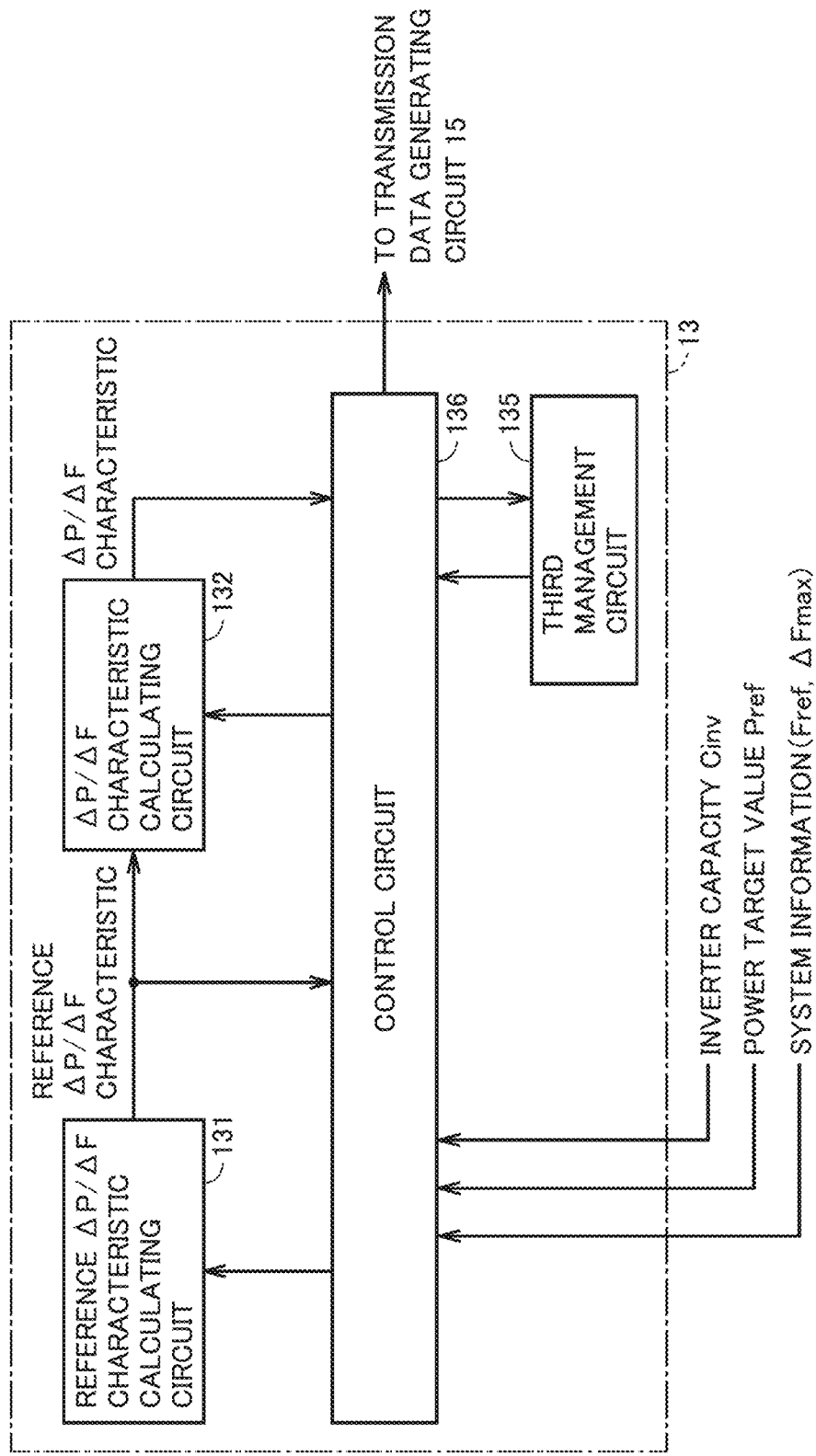
FIG. 5 is a block diagram illustrating a configuration of a control parameter generating circuit illustrated in FIG. 3.

FIG. 5 is a block diagram illustrating a configuration of control parameter generating circuit 13 illustrated in FIG. 3.

As illustrated in FIG. 5, control parameter generating circuit 13 includes a reference $\Delta P/\Delta F$ characteristic calculating circuit 131, a $\Delta P/\Delta F$ characteristic calculating circuit 132, a third management circuit 135, and a control circuit 136.

Reference $\Delta P/\Delta F$ characteristic calculating circuit 131 calculates a reference $\Delta P/\Delta F$ characteristic, based on the capacity information of static inverters (second DC/AC converter 408) of power conversion devices 41a to 41c.

$\Delta P/\Delta F$ characteristic calculating circuit 132 calculates a $\Delta P/\Delta F$ characteristic, based on the reference $\Delta P/\Delta F$ characteristic and power target value information created by operation plan creating circuit 14 (FIG. 4).

Third management circuit 135 manages control parameters of virtual synchronous generator control. Third management circuit 135 stores information such as the $\Delta P/\Delta F$ characteristic calculated by $\Delta P/\Delta F$ characteristic calculating circuit 132 and a power target value Pref into a not-shown memory and manages the information.

Control circuit 136 manages the operation of reference $\Delta P/\Delta F$ characteristic calculating circuit 131, $\Delta P/\Delta F$ characteristic calculating circuit 132, and third management circuit 135.

(2) Power Conversion Device 27

Figure 6:
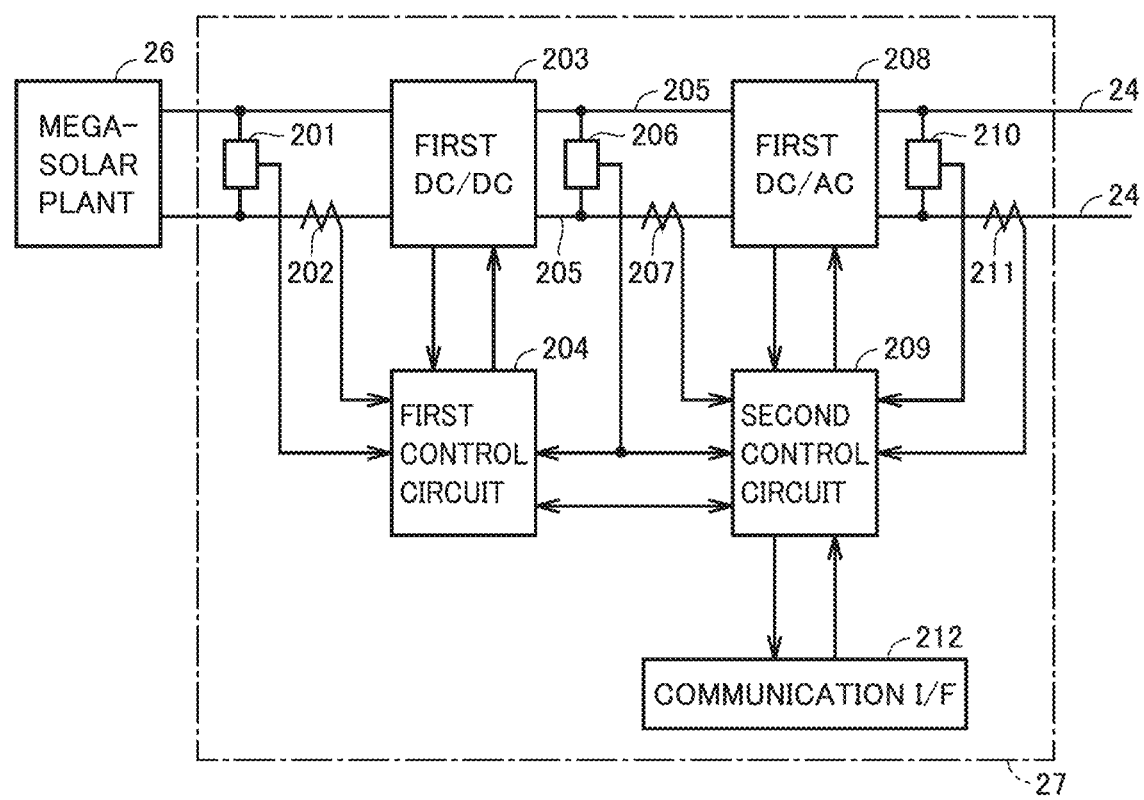
FIG. 6 is a block diagram illustrating a configuration of a power conversion device for a mega-solar plant illustrated in FIG. 1.

FIG. 6 is a block diagram illustrating a configuration of power conversion device 27 illustrated in FIG. 1.

As illustrated in FIG. 6, power conversion device 27 includes voltmeters 201, 206, and 210, ammeters 202, 207, and 211, a first DC/DC converter 203, a first control circuit 204, a DC bus 205, a first DC/AC converter 208, a second control circuit 209, and a communication interface (I/F) 212.

Voltmeter 201 measures a DC voltage output from mega-solar plant 26. Ammeter 202 measures a DC current output from mega-solar plant 26.

First DC/DC converter 203 converts a first DC voltage output from mega-solar plant 26 into a second DC voltage. First control circuit 204 controls first DC/DC converter 203.

DC bus 205 supplies a second DC voltage output from first DC/DC converter 203 to first DC/AC converter 208. Voltmeter 206 measures a voltage on DC bus 205. Ammeter 207 measures a DC current output from first DC/DC converter 203.

First DC/AC converter 208 converts a DC power output from first DC/DC converter 203 into an AC power. Second control circuit 209 controls first DC/AC converter 208.

Voltmeter 210 measures an AC voltage output from first DC/AC converter 208. Ammeter 211 measures an AC current output from first DC/AC converter 208. Communication I/F 212 performs communication between power conversion device 27 and CEMS 31.

(3) Power Conversion Device 41

Figure 7:
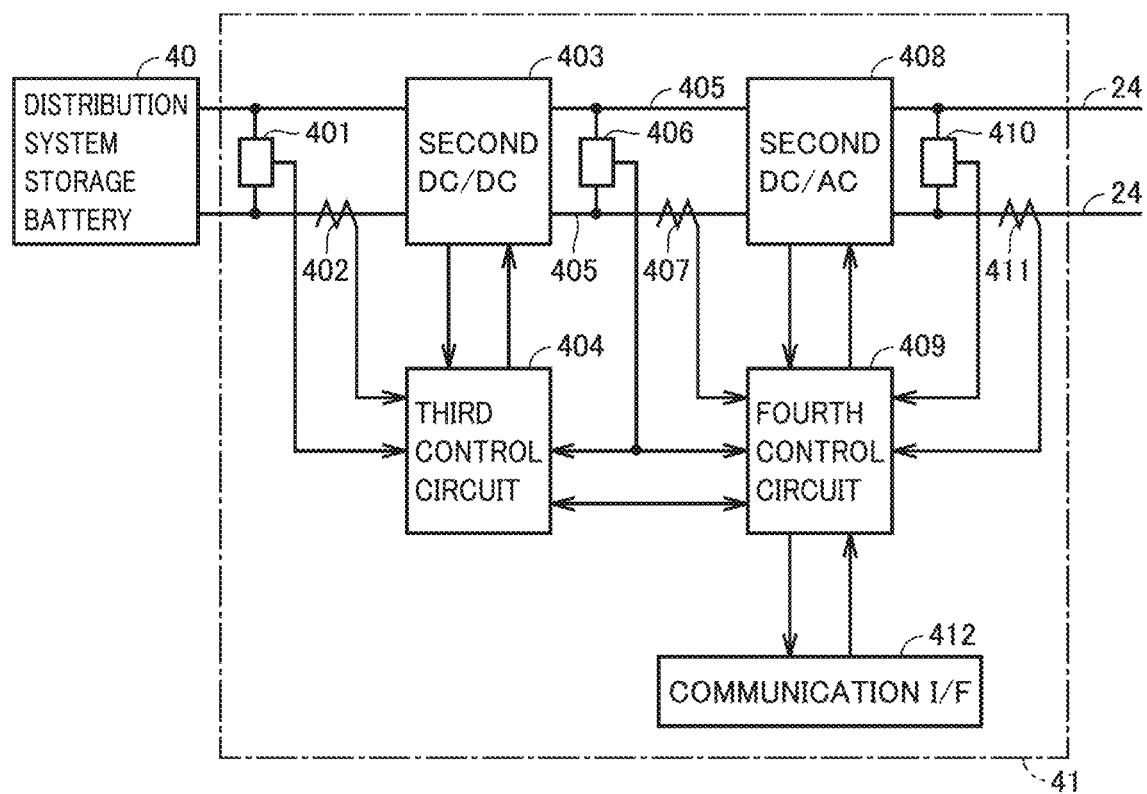
FIG. 7 is a block diagram illustrating a configuration of a power conversion device for a storage battery illustrated in FIG. 1.

FIG. 7 is a block diagram illustrating a configuration of power conversion device 41 illustrated in FIG. 1.

As illustrated in FIG. 7, power conversion device 41 includes voltmeters 401, 406, and 410, ammeters 402, 407, and 411, a second DC/DC converter 403, a third control circuit 404, a DC bus 405, a second DC/AC converter 408, a fourth control circuit 409, and a communication I/F 412.

Voltmeter 401 measures a DC voltage output from storage battery 40. Ammeter 402 measures a DC current output from storage battery 40.

Second DC/DC converter 403 converts a third DC voltage output from storage battery 40 into a fourth DC voltage. Third control circuit 404 controls second DC/DC converter 403. Second DC/DC converter 403 corresponds to an example of "converter".

DC bus 405 supplies a DC voltage output from second DC/DC converter 403 to second DC/AC converter 408. Voltmeter 406 measures a voltage on DC bus 405. Voltmeter 406 corresponds to an example of "first voltmeter". Ammeter 407 measures a DC current output from second DC/DC converter 403.

Second DC/AC converter 408 converts a DC power output from second DC/DC converter 403 into an AC power. Fourth control circuit 409 controls second DC/AC converter 408. Second DC/AC converter 408 corresponds to an example of "inverter".

Voltmeter 410 measures an AC voltage output from second DC/AC converter 408. Voltmeter 410 corresponds to an example of "second voltmeter". Ammeter 411 measures an AC current output from second DC/AC converter 408. Communication I/F 412 performs communication between power conversion device 41 and CEMS 31.

Known DC/DC converters can be used as appropriate for first DC/DC converter 203 (FIG. 6) and second DC/DC converter 403 (FIG. 7). First DC/AC converter 208 (FIG. 6) and second DC/AC converter 408 (FIG. 7) each correspond to an example of "static inverter". Known inverters can be used for first DC/AC converter 208 and second DC/AC converter 408.

(2-1) First Control Circuit 204

Figure 8:
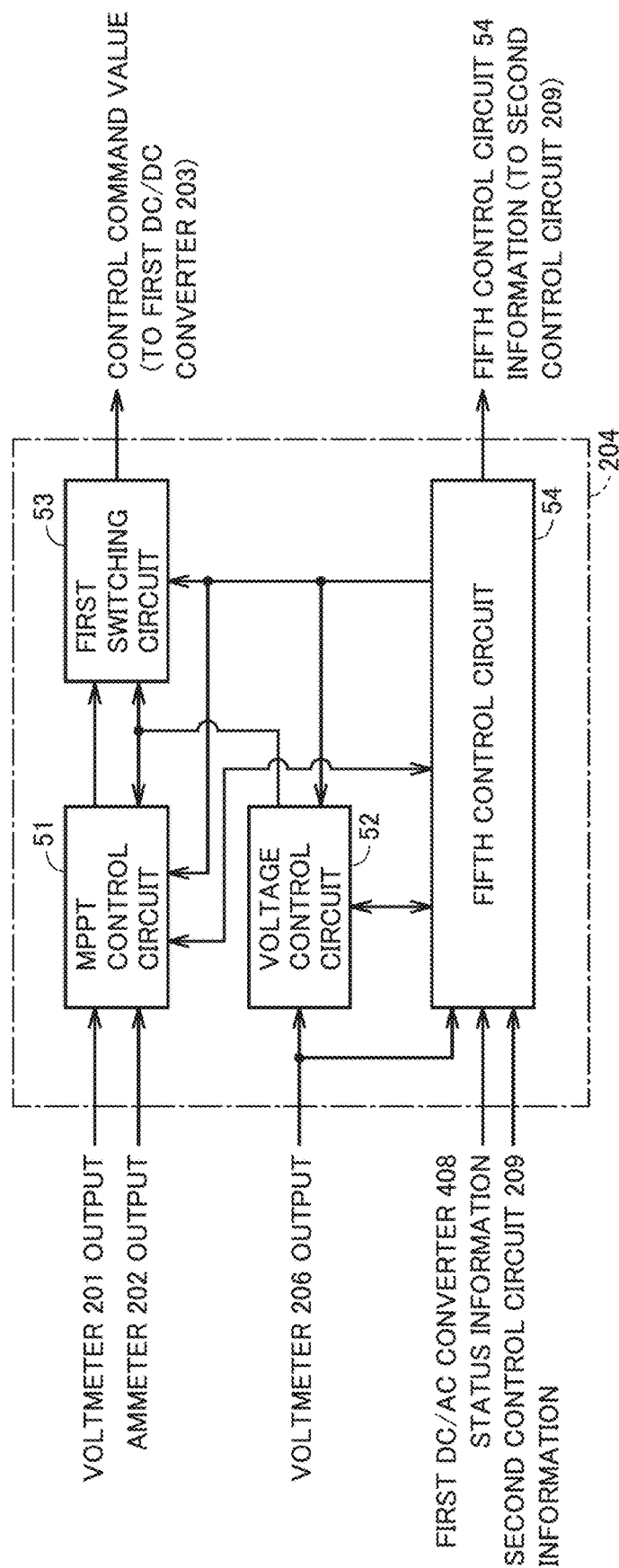
FIG. 8 is a block diagram illustrating a configuration of a first control circuit illustrated in FIG. 6.

FIG. 8 is a block diagram illustrating a configuration of first control circuit 204 illustrated in FIG. 6.

As illustrated in FIG. 8, first control circuit 204 includes a maximum power point tracking (MPPT) control circuit 51, a voltage control circuit 52, a first switching circuit 53, and a fifth control circuit 54.

MPPT control circuit 51 executes maximum power point tracking (MPPT) control, based on measurement values of voltmeter 201 and ammeter 202. MPPT control circuit 51 searches for the maximum power point of mega-solar plant 26 in order to extract the generated power of mega-solar plant 26 to the maximum. Specifically, MPPT control circuit 51 generates a control command value of first DC/DC converter 203 in order to control the DC voltage measured by voltmeter 201 to a voltage corresponding to the maximum power point.

Voltage control circuit 52 generates a control command value of first DC/DC converter 203 for maintaining the DC voltage (second DC voltage) on DC bus 205 at a predetermined target voltage, based on the measurement value of voltmeter 206.

Fifth control circuit 54 outputs a control parameter and a control target value of MPPT control circuit 51 and voltage control circuit 52 and manages a power generation state of mega-solar plant 26. Fifth control circuit 54 further outputs a control signal of first switching circuit 53.

First switching circuit 53 selectively outputs one of the outputs of MPPT control circuit 51 and voltage control circuit 52 as a control command value of first DC/DC converter 203, in accordance with a control signal from fifth control circuit 54.

First DC/DC converter 203 is controlled in a MPPT mode or a voltage control mode. In the MPPT mode, first switching circuit 53 outputs a control command value generated by MPPT control circuit 51. In the voltage control mode, first switching circuit 53 outputs a control command value generated by voltage control circuit 52.

(2-2) Second Control Circuit 209

Figure 9:
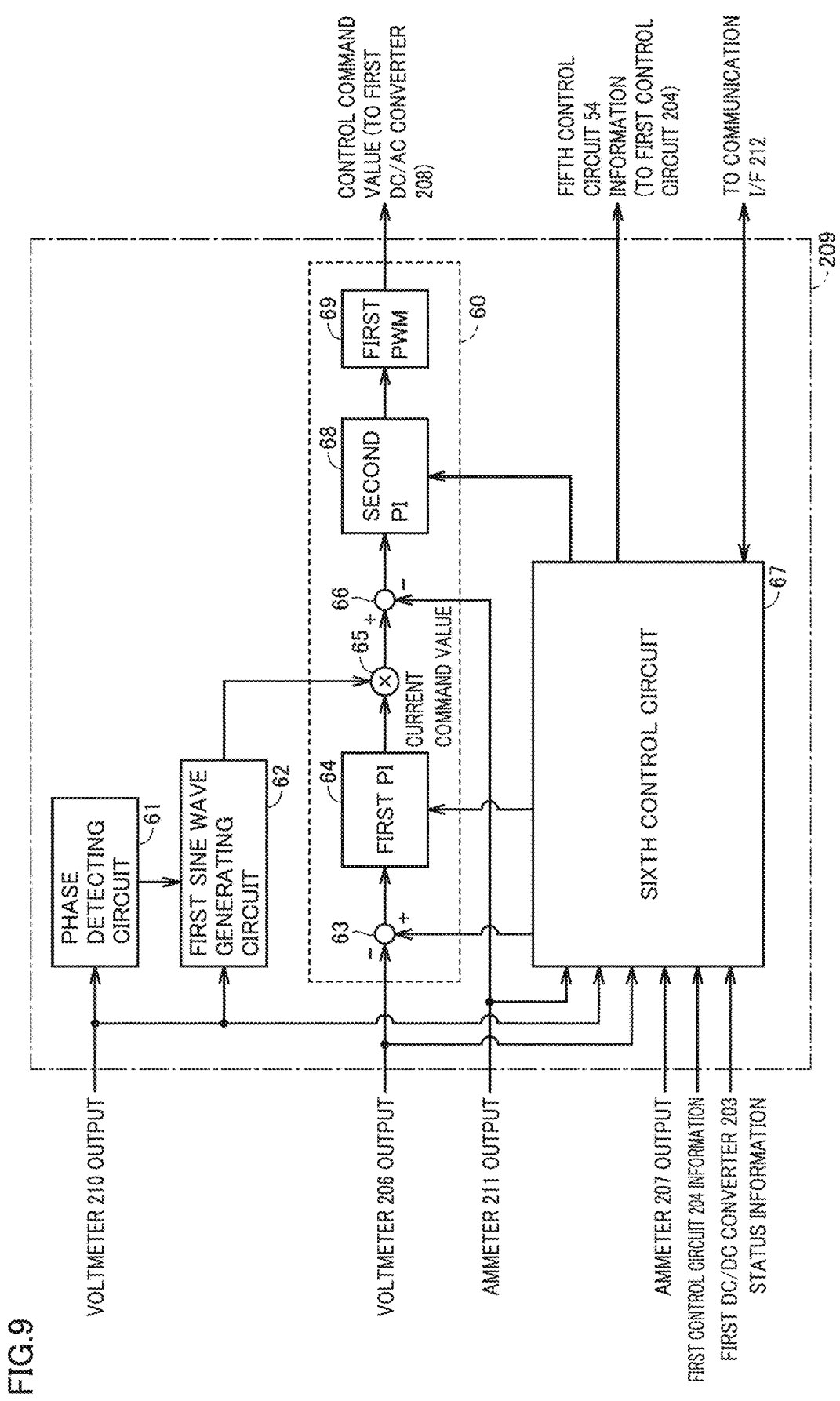
FIG. 9 is a block diagram illustrating a configuration of a second control circuit illustrated in FIG. 6.

FIG. 9 is a block diagram illustrating a configuration of second control circuit 209 illustrated in FIG. 6.

As illustrated in FIG. 9, second control circuit 209 includes a phase detecting circuit 61, a first sine wave generating circuit 62, a current control circuit 60, and a sixth control circuit 67.

Current control circuit 60 includes a subtractor 63, a first PI control circuit 64, a multiplier 65, a subtractor 66, a second PI control circuit 68, and a first PWM converter 69. Current control circuit 60 executes a control mode in which power is output in synchronization with a system voltage. This control mode is a common control method for power converters for photovoltaic power generation installed in households.

Phase detecting circuit 61 detects a phase of an AC voltage from the waveform of AC voltage measured by voltmeter 210 (FIG. 6).

First sine wave generating circuit 62 generates a sine wave synchronized with the waveform of AC voltage, based on the amplitude of AC voltage measured by voltmeter 210 and phase information detected by phase detecting circuit 61. In the first embodiment, phase detecting circuit 61 detects a zero cross point of the waveform of AC voltage and detects the frequency of AC voltage from the detection result of a zero cross point. Phase detecting circuit 61 outputs the detected frequency of AC voltage together with the zero cross point information to first sine wave generating circuit 62.

Current control circuit 60 generates a control command value for controlling first DC/AC converter 208, based on the DC voltage on DC bus 205 measured by voltmeter 206 (FIG. 6). Subtractor 63 subtracts the DC voltage on DC bus 205 measured by voltmeter 206 from a target value of DC bus voltage output from sixth control circuit 67. The subtraction value of subtractor 63 is input to first PI control circuit 64.

Multiplier 65 generates a current command value by multiplying a control command value output from first PI control circuit 64 by a sine wave output from first sine wave generating circuit 62.

Subtractor 66 calculates a deviation between a current command value output from multiplier 65 and a current value of an AC system measured by ammeter 211 (FIG. 6) and outputs the calculated deviation to second PI control circuit 68.

Second PI control circuit 68 generates a control command value such that the deviation output from subtractor 66 becomes zero, based on control parameters (proportional gain and integral time) applied from sixth control circuit 67. Second PI control circuit 68 outputs the generated control command value to first PWM converter 69.

First PWM converter 69 generates a control command value by executing PWM control for a control command value input from second PI control circuit 68 and outputs the generated control command value to first DC/AC converter 208.

Sixth control circuit 67 collects the measurement results concerning DC bus 205 output from voltmeter 206 and ammeter 207, the measurement results concerning an AC system output from voltmeter 210 and ammeter 211, and status information of first DC/DC converter 203 output from first control circuit 204 and notifies CEMS 31 and the like of the collected information through communication I/F 212.

Further, sixth control circuit 67 notifies first PI control circuit 64 and second PI control circuit 68 of a control parameter. Sixth control circuit 67 notifies CEMS 31 of information on active power and reactive power measured by an effective voltage measuring unit (not shown) of the AC system, through communication I/F 212. Sixth control circuit 67 notifies fifth control circuit 54 of the measurement values such as effective voltage and active power of the AC system. For example, when the effective value of the system voltage exceeds a prescribed value, fifth control circuit 54 suppresses increase of the system voltage by switching the control of mega-solar plant 26 from MPPT control to voltage control.

(3-1) Third Control Circuit 404

Figure 10:
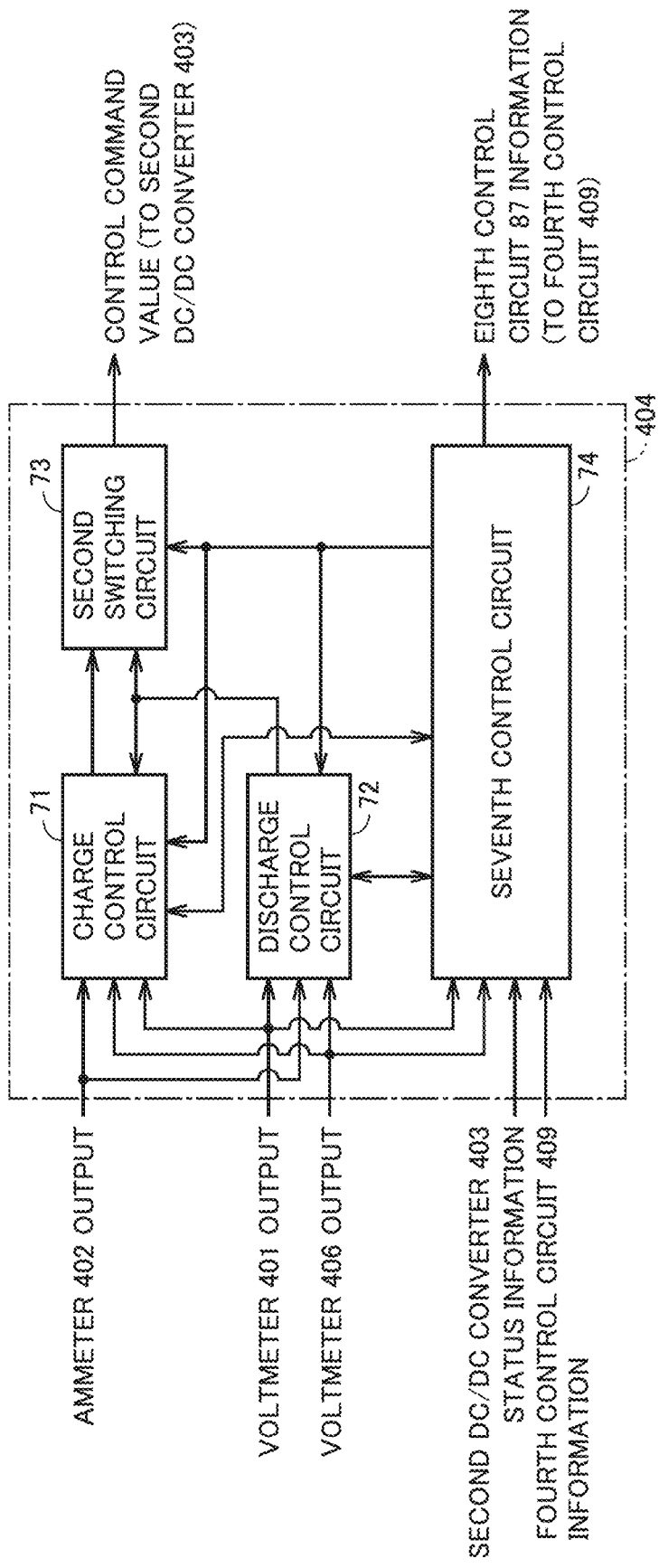
FIG. 10 is a block diagram illustrating a configuration of a third control circuit illustrated in FIG. 7.

FIG. 10 is a block diagram illustrating a configuration of third control circuit 404 illustrated in FIG. 7.

As illustrated in FIG. 10, third control circuit 404 includes a charge control circuit 71, a discharge control circuit 72, a second switching circuit 73, and a seventh control circuit 74.

Charge control circuit 71 generates a control command value of second DC/DC converter 403 when charge control of storage battery 40 is performed.

Discharge control circuit 72 generates a control command value of second DC/DC converter 403 when discharge control of storage battery 40 is performed.

Seventh control circuit 74 outputs a control parameter, a control target value, and the like to charge control circuit 71 and discharge control circuit 72. Seventh control circuit 74 manages the state of charge (SOC), charge power (charge current), discharge power (discharge current), and the like of storage battery 40. Seventh control circuit 74 outputs a control signal of second switching circuit 73.

Second switching circuit 73 selectively outputs one of the outputs of charge control circuit 71 and discharge control circuit 72 as a control command value of second DC/DC converter 403, in accordance with a control signal from seventh control circuit 74. Specifically, second switching circuit 73 outputs a control command value generated by charge control circuit 71 when charge of storage battery 40 is specified. On the other hand, second switching circuit 73 outputs a control command value generated by discharge control circuit 72 when discharge of storage battery 40 is specified.

(3-2) Fourth Control Circuit 409

Figure 11:
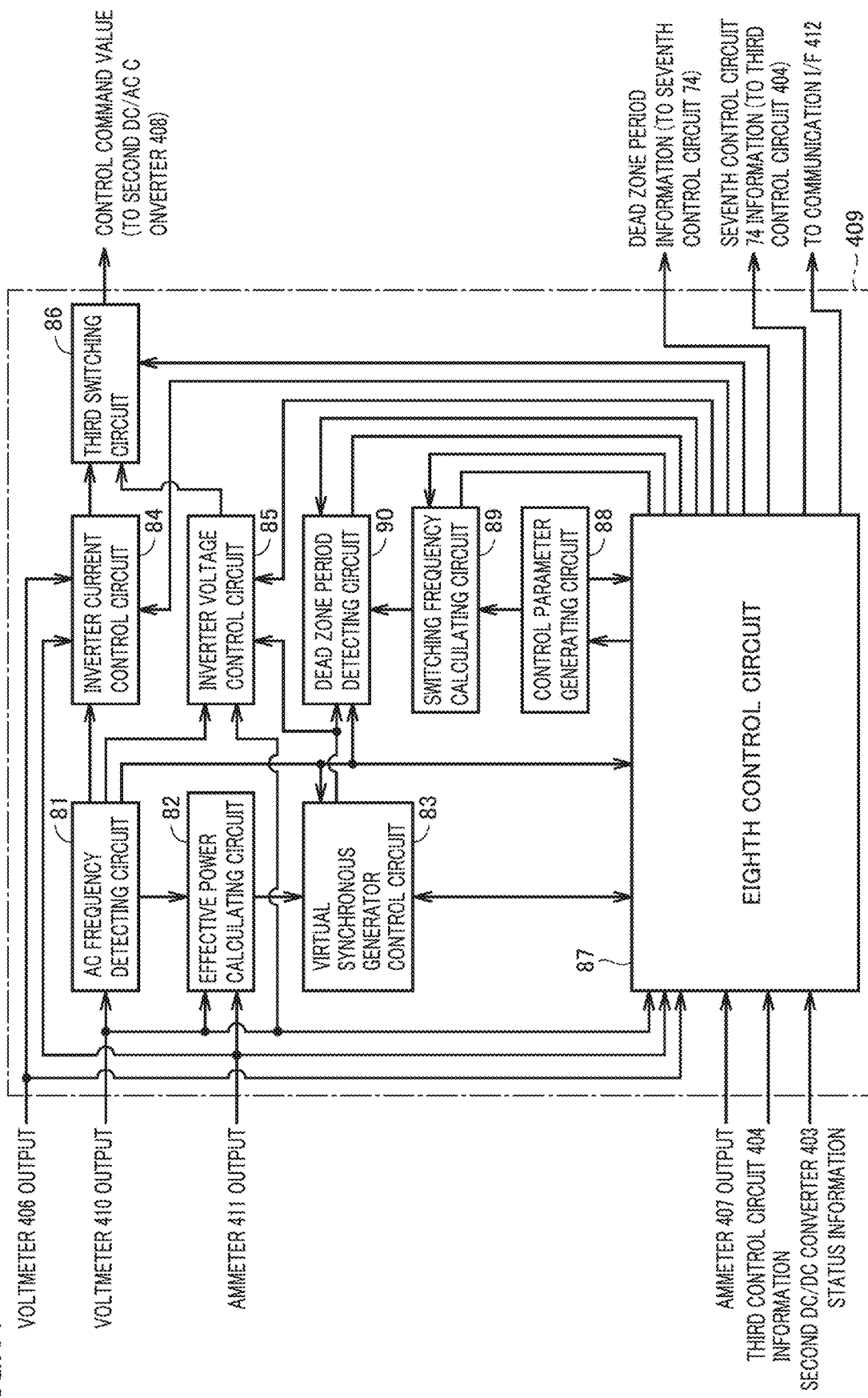
FIG. 11 is a block diagram illustrating a configuration of a fourth control circuit illustrated in FIG. 7.

FIG. 11 is a block diagram illustrating a configuration of fourth control circuit 409 illustrated in FIG. 7.

As illustrated in FIG. 11, fourth control circuit 409 includes an AC frequency detecting circuit 81, an effective power calculating circuit 82, a virtual synchronous generator control circuit 83, an inverter current control circuit 84, an inverter voltage control circuit 85, a third switching circuit 86, a dead zone period detecting circuit 90, a switching frequency calculating circuit 89, an eighth control circuit 87, and a control parameter generating circuit 88.

AC frequency detecting circuit 81 detects a phase of an AC voltage from the waveform of AC voltage measured by voltmeter 410 (FIG. 7). In the first embodiment, a zero cross point is detected from the waveform of AC voltage, and the frequency is detected from the time intervals of the detected zero cross points. The method of detecting the frequency of AC voltage is not limited to the method using the detection results of zero cross points.

Effective power calculating circuit 82 calculates an effective power using information on AC voltage and AC current measured by voltmeter 410 and ammeter 411 (FIG. 7). In the first embodiment, an effective power is calculated by integrating the power of one cycle of the AC voltage waveform, based on zero cross point detection information and AC frequency information output from AC frequency detecting circuit 81. The method of calculating an effective power is not limited to the method above, and for example, an effective power may be calculated using DQ transformation when the AC system is three-phase alternating current.

Virtual synchronous generator control circuit 83 imparts inertial force, synchronization force, and damping force of a synchronous generator to second DC/AC converter 408 (static inverter), based on the frequency information of AC voltage output from AC frequency detecting circuit 81 and the AC effective power information output from effective power calculating circuit 82.

[Virtual Synchronous Generator Control Technology]

Virtual synchronous generator control technology will be described briefly below.

A synchronous generator typically used for thermal power generation has a function of adjusting an output power in accordance with a frequency (governor function), a function of maintaining an angular velocity (inertial force), a function of synchronizing with a system voltage (synchronization force), a function of regulating voltage of a bulk system (AVR function: automatic voltage regulation function), and a function of continuing operation even at a momentary drop of AC system voltage in a system fault.

Virtual synchronous generator control technology allows a static inverter to mimic the functions of a synchronous generator by controlling a transient response of the static inverter. Specifically, three functions, namely, the governor function, the function of mimicking a mass system model (dynamic characteristic of a rotating machine) based on a swing equation, and the AVR function are mimicked.

Figure 42:
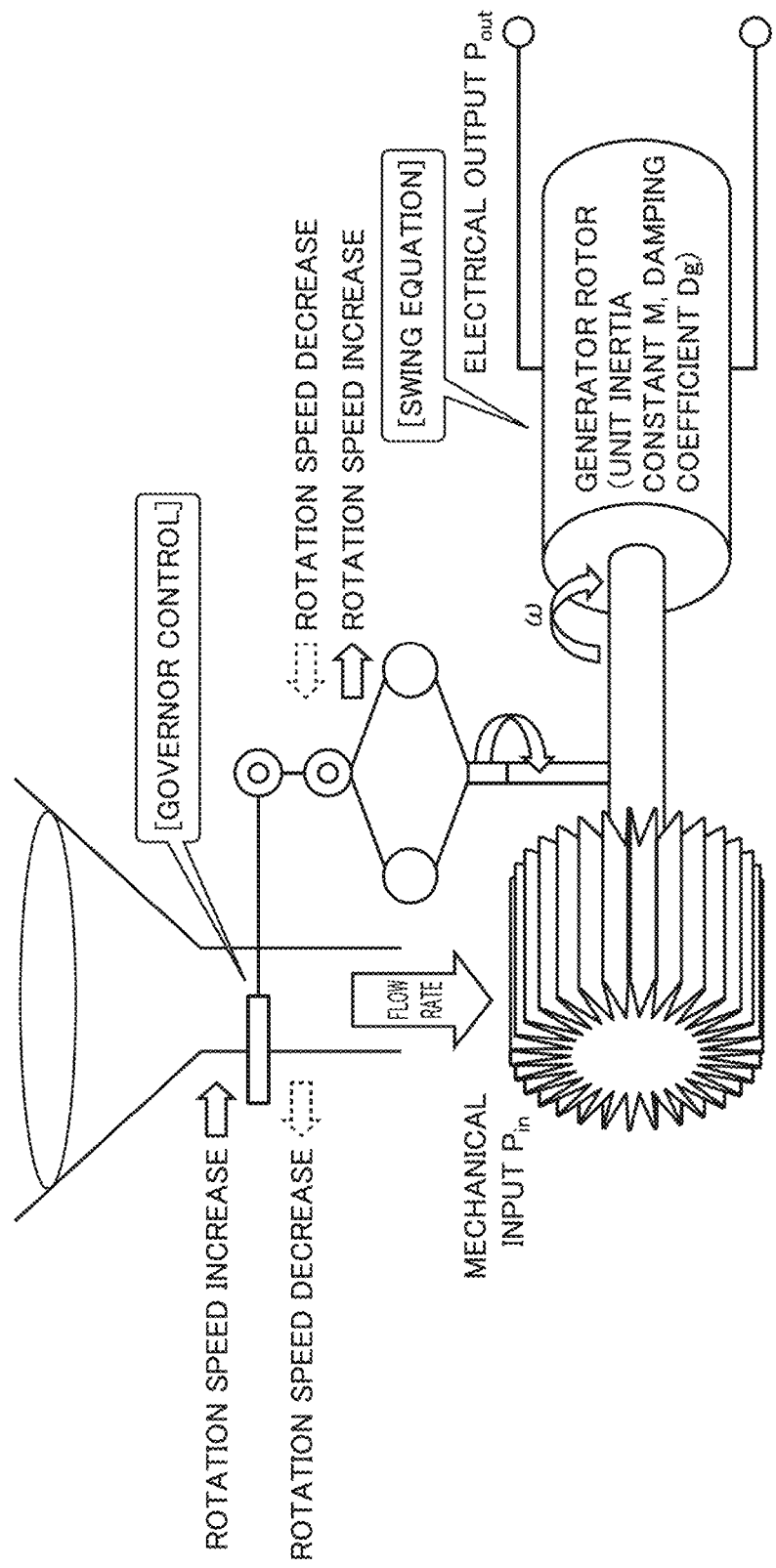
FIG. 42 is a diagram for explaining the concept of virtual synchronous generator control technology.

In the first embodiment, in particular, a case where the governor function and the function of mimicking a mass system model based on a swing equation are implemented in second DC/AC converter 408 will be described. FIG. 42 is a conceptual diagram for explaining the virtual synchronous generator control technology. The AVR function of synchronous generators is the function controlled based on an output voltage command or a reactive power command value given from a higher-level system (in the first embodiment, CEMS 31) and therefore is not implemented in the first embodiment. Hereinafter, the governor function and the function of mimicking a mass system model based on a swing equation will be specifically described.

First, the governor function will be described.

The governor in a power generation plant has the function of controlling an output power of a generator by controlling an output of a gas turbine or a steam turbine in thermal power generation and nuclear power generation or guide vanes of a waterwheel in hydropower generation. When a demand power exceeds a supply power in an AC power system, the frequency of the system voltage decreases. In a thermal power generator or a hydropower generator capable of output control, the droop characteristics are imparted to the governor so that the generator is controlled to increase power generation when the frequency of the system voltage decreases. On the other hand, the generator is controlled to reduce power generation when the supply power exceeds the demand power and thus the frequency of the system voltage increases.

FIG. 42 is a diagram schematically depicting the governor function. As illustrated in FIG. 42, when the angular velocity ω of the synchronous generator increases, the valve adjusting energy inflow moves to the right side whereby energy supplied to the synchronous generator decreases. On the other hand, when the angular velocity ω of the synchronous generator decreases, the valve moves to the left side whereby energy supplied to the synchronous generator increases. Thus, the energy output from the synchronous generator can be controlled independently by the frequency (that is, the angular velocity ω of the synchronous generator) of the local system voltage. Even when the operation above is performed by each individual synchronous generator, the load can be shared among a plurality of synchronous generators as the operation is managed based on the frequency of the system voltage. As the governor, for example, a model configured with a first-order lag system is provided as a standard model by the Institute of Electrical Engineers of Japan.

In the first embodiment, the operation in a case where the governor is approximated by the above model configured with a first-order lag system as represented by the following expression (1) will be described.

$$-1/\{Kgd \times (1 + s \times Tg)\} \qquad (1)$$

In the expression (1), −1/Kgd is a proportional gain of the governor (Kgd: speed adjustment rate), and Tg is a time constant of the first-order lag system (Tg: governor time constant).

Next, the function of mimicking a mass system model based on a swing equation will be described.

As illustrated in FIG. 42, the synchronous generator has a rotor having a unit inertia constant M. For example, when the generated power of mega-solar plant 26 abruptly decreases due to sudden change in solar radiation, the above governor control is unable to instantaneously make up the power shortage. The synchronous generator converts rotation energy accumulated in the rotor into electric power and outputs the power to an AC system. In doing so, if the angular velocity (rotation speed) of the rotor decreases, the energy supplied by the governor control increases, whereby the demand power and the supply power are balanced. The following expression (2) is the swing equation that mimics a mass system model (generator rotor). In the swing equation, energy P is divided by angular velocity ω and converted into torque T.

$$Tin-Tout=M \times d\omega/dt + Dg \times \omega \qquad (2)$$

Dg is a damping coefficient and M is an inertia constant.

In the first embodiment, a case where expression (1) and expression (2) are incorporated into the control of the static inverter (second DC/AC converter 408) to mimic the inertial force, the synchronization force, and the damping force of the synchronous generator will be described.

Returning to FIG. 11, inverter current control circuit 84 generates a control command value for controlling current of second DC/AC converter 408. Inverter current control circuit 84 differs from current control circuit 60 illustrated FIG. 9 only in control parameters, and the circuit configuration and operation is the same and will not be further elaborated.

Inverter voltage control circuit 85 generates a control command value for controlling voltage of second DC/AC converter 408.

Third switching circuit 86 switches a control command value from inverter current control circuit 84 and a control command value from inverter voltage control circuit 85, based on an output of eighth control circuit 87.

Eighth control circuit 87 collects the measurement results concerning DC bus 405 by voltmeter 406 and ammeter 407 and status information of second DC/DC converter 403 output from third control circuit 404 and notifies CEMS 31 and the like of the collected information, through communication I/F 412.

Eighth control circuit 87 also gives notification of a control parameter of each of virtual synchronous generator control circuit 83, inverter current control circuit 84, and inverter voltage control circuit 85.

Further, eighth control circuit 87 notifies CEMS 31 of information on an effective voltage of the AC system measured by a not-illustrated effective voltage measuring unit of the AC system or an active power and a reactive power measured by a not-illustrated active/reactive power measuring unit of the AC system, through communication I/F 412. Eighth control circuit 87 notifies seventh control circuit 74 of the measurement results of effective voltage, active power, and the like of the AC system.

Control parameter generating circuit 88 generates various parameters for virtual synchronous generator control (speed adjustment rate Kgd, governor time constant Tg, inertia constant M, and damping coefficient Dg), based on information necessary for generating control parameters of virtual synchronous generator control that is given from CEMS 31 through communication IN 412. In doing so, control parameter generating circuit 88 also generates a ΔP/ΔF characteristic and outputs the generated ΔP/ΔF characteristic to switching frequency calculating circuit 89 for calculating a frequency at which charge/discharge of storage battery 40 is switched (hereinafter also referred to as "switching frequency"). Virtual synchronous generator control circuit 83 is notified of the generated various parameters for virtual synchronous generator control through eighth control circuit 87.

Switching frequency calculating circuit 89 calculates a frequency (switching frequency) at which charge/discharge of storage battery 40 is switched, using the ΔP/ΔF characteristic output by control parameter generating circuit 88 and the power target value given from CEMS 31 that is output by eighth control circuit 87. The method of calculating the switching frequency will be described later.

Dead zone period detecting circuit 90 calculates a dead zone period, based on the switching frequency calculated in switching frequency calculating circuit 89 and dead zone width information given from CEMS 31. In the first embodiment, dead zone period detecting circuit 90 detects a dead zone period based on charge/discharge switching detection information given from seventh control circuit 74 and a detection result of AC frequency output from AC frequency detecting circuit 81 and notifies seventh control circuit 74 of dead zone period information (dead zone detection flag) through eighth control circuit 87.

(3-2-1) AC Frequency Detecting Circuit 81

Figure 12:
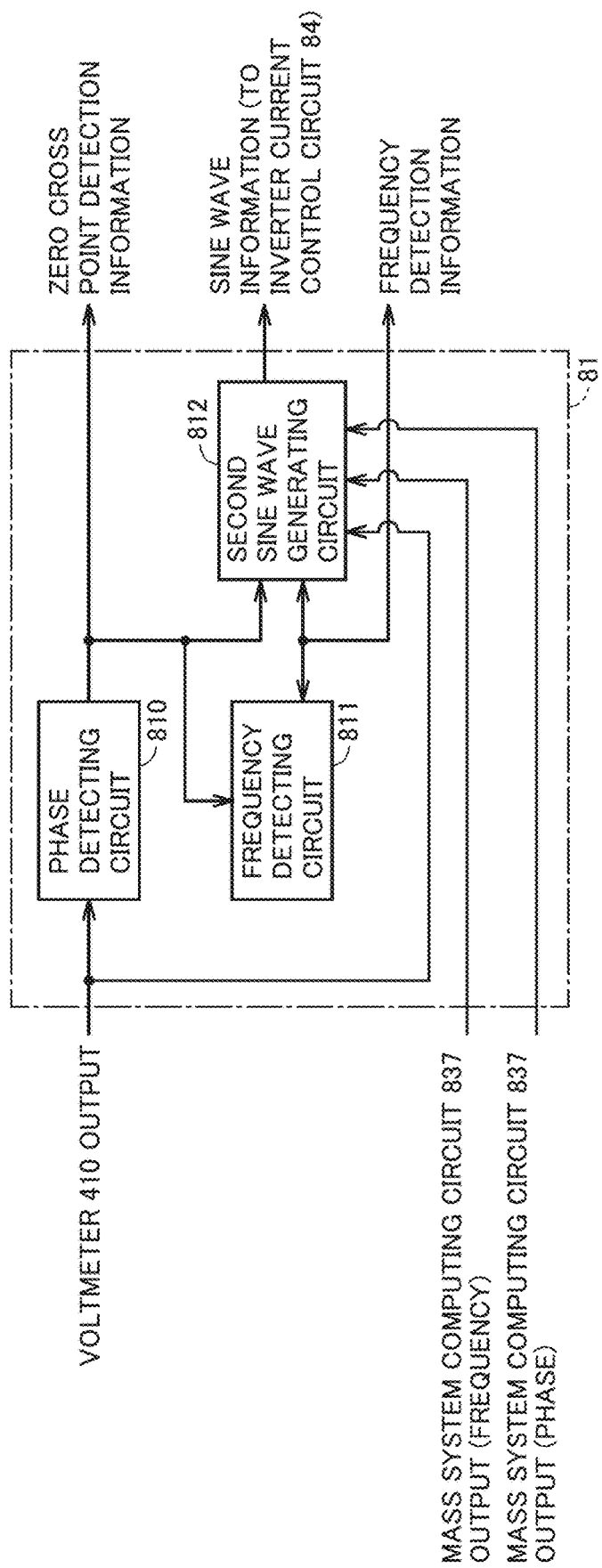
FIG. 12 is a block diagram illustrating a configuration of an AC frequency detecting circuit illustrated in FIG. 11.

FIG. 12 is a block diagram illustrating a configuration of AC frequency detecting circuit 81 illustrated in FIG. 11.

As illustrated in FIG. 12, AC frequency detecting circuit 81 includes a phase detecting circuit 810, a frequency detecting circuit 811, and a second sine wave generating circuit 812.

Phase detecting circuit 810 detects a zero cross point from the waveform of the system voltage output from voltmeter 410. The phase detection method in phase detecting circuit 810 is not limited to detection of a zero cross point. In detection of a zero cross point in an actual device, an error occurs due to a zero cross point detection error in voltmeter 410 (mainly offset error), an amplitude detection error in voltmeter 410 (mainly linearity error), an error in sampling periods when the system voltage waveform is sampled, and the like. The error in sampling periods may occur due to variations in time from carrier interruption to actual sampling when sampling is performed using a microcomputer or the like.

Frequency detecting circuit 811 detects a system frequency from the periods of zero cross points output from phase detecting circuit 810. The method of detecting a system frequency is not limited to the method in which a system frequency is detected from the periods of zero cross points.

Second sine wave generating circuit 812 generates a sine wave synchronized with a system voltage, based on the detection result of zero cross point in phase detecting circuit 810, the detection result of system frequency in frequency detecting circuit 811, and the amplitude of system voltage output from CEMS 31. AC frequency detecting circuit 81 outputs the detection result of zero cross point (detection time of zero cross point), the detection result of frequency, and the sine wave information.

(3-2-2) Inverter Voltage Control Circuit 85

Figure 13:
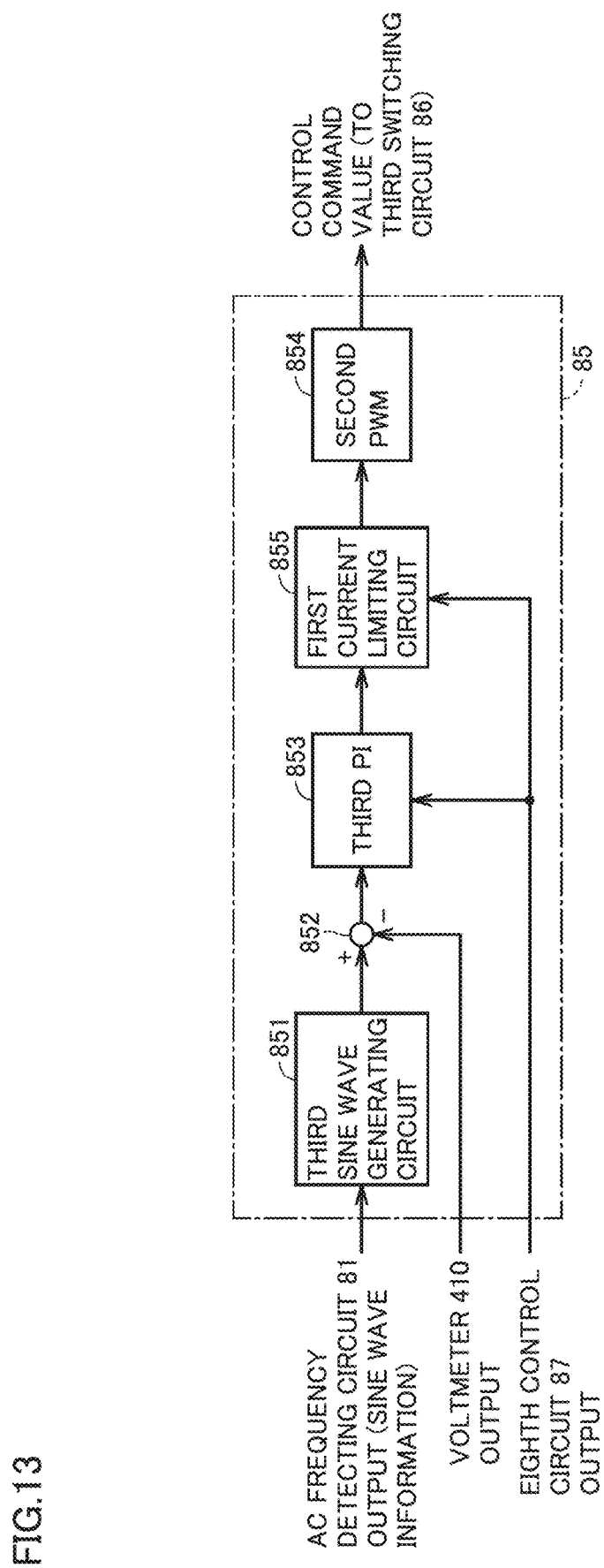
FIG. 13 is a block diagram illustrating a configuration of an inverter voltage control circuit illustrated in FIG. 11.

FIG. 13 is a block diagram illustrating a configuration of inverter voltage control circuit 85 illustrated in FIG. 11.

As illustrated in FIG. 13, inverter voltage control circuit 85 includes a third sine wave generating circuit 851, a subtractor 852, a third PI control circuit 853, a first current limiting circuit 855, and a second PWM converter 854.

Inverter voltage control circuit 85 generates a control command value for controlling second DC/AC converter 408, based on information on frequency and phase output from virtual synchronous generator control circuit 83 (FIG. 11) and amplitude information of system voltage output from eighth control circuit 87 (FIG. 11). The amplitude information of system voltage from eighth control circuit 87 is input to inverter voltage control circuit 85 via second sine wave generating circuit 812.

The sine wave information (information on frequency, phase, and amplitude) from AC frequency detecting circuit 81 (FIG. 11) is input to third sine wave generating circuit 851. However, in the first embodiment, the amplitude information is not controlled since QV control is not performed in virtual synchronous generator control circuit 83.

Third sine wave generating circuit 851 generates a target value of AC voltage (target AC voltage) output from second DC/AC converter 408, based on the input sine wave information.

Subtractor 852 calculates the deviation between the target value of AC voltage from third sine wave generating circuit 851 and the voltage measured by voltmeter 410 and outputs the calculated deviation to third PI control circuit 853.

Third PI control circuit 853 generates a voltage command value by performing PI (proportional integral) computation such that the input deviation becomes zero. Third PI control circuit 853 outputs the generated voltage command value to first current limiting circuit 855.

First current limiting circuit 855 imposes a limit on the voltage command value output from third PI control circuit 853, based on the measurement result of ammeter 411 input via eighth control circuit 87. Specifically, when current exceeding the current capacity of second DC/AC converter 408 flows, first current limiting circuit 855 performs control to limit the voltage command value so that the current flowing through second DC/AC converter 408 becomes equal to or less than a predetermined current value (for example, the current capacity of second DC/AC converter 408). The output of first current limiting circuit 855 is input to second PWM converter 854. The control parameters (control gain and integral time) in third PI control circuit 853 and first current limiting circuit 855 are applied from eighth control circuit 87.

Second PWM converter 854 generates a control signal by executing pulse width modulation (PWM) control, using the voltage command value output from first current limiting circuit 855. Second PWM converter 854 outputs the generated control signal to second DC/AC converter 408.

(3-2-3) Virtual Synchronous Generator Control Circuit 83

Figure 14:
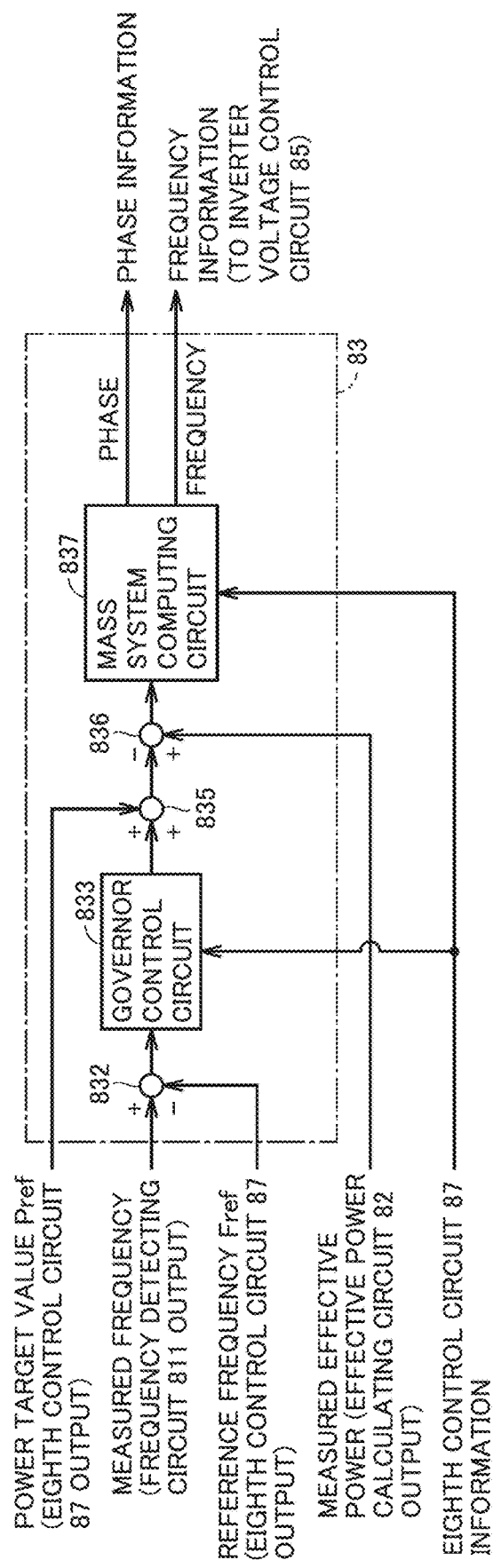
FIG. 14 is a block diagram illustrating a configuration of a virtual synchronous generator control circuit illustrated in FIG. 11.

FIG. 14 is a block diagram illustrating a configuration of virtual synchronous generator control circuit 83 illustrated in FIG. 11.

As illustrated in FIG. 14, virtual synchronous generator control circuit 83 includes a subtractor 832, a governor control circuit 833, an adder 835, a subtractor 836, and a mass system computing circuit 837.

Subtractor 832 calculates the deviation between the measurement result of frequency and a reference frequency Fref output from eighth control circuit 87. The output of subtractor 832 is input to governor control circuit 833. Governor control circuit 833 generates an offset value to be added to a power target value, based on the output of subtractor 832. The detailed operation of governor control circuit 833 will be described later.

Adder 835 generates a control power target value of mass system computing circuit 837 by adding the offset value output from governor control circuit 833 to power target value Pref input from eighth control circuit 87.

Subtractor 836 calculates the deviation between the effective power input from effective power calculating circuit 82 and the control power target value input from adder 835. The output of subtractor 836 is input to mass system computing circuit 837.

Mass system computing circuit 837 calculates the frequency and phase of system voltage output from power conversion device 41 such that the deviation output from subtractor 836 becomes zero. In the first embodiment, notification of the control parameters (speed adjustment rate Kgd, governor time constant Tg, inertia constant M, and damping coefficient Dg) of governor control circuit 833 and mass system computing circuit 837 is given from control parameter generating circuit 88 through eighth control circuit 87.

(3-2-3-1) Governor Control Circuit 833

Figure 15:
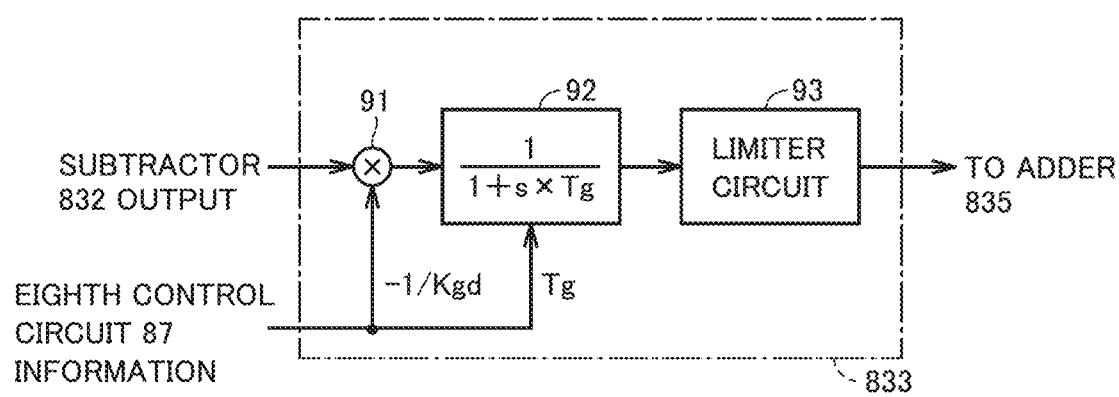
FIG. 15 is a block diagram illustrating a configuration of a governor control circuit illustrated in FIG. 14.

FIG. 15 is a block diagram illustrating a configuration of governor control circuit 833 illustrated in FIG. 14.

As illustrated in FIG. 15, governor control circuit 833 includes a multiplier 91, a first-order lag system model 92, and a limiter circuit 93.

Multiplier 91 multiplies the output of subtractor 832 by the proportional gain ($-1/Kgd$) output from eighth control circuit 87. The output of multiplier 91 is input to first-order lag system model 92. In the first embodiment, first-order lag system model 92 is implemented with a standard model of a first-order lag system ($1/(1+s\times Tg)$) presented by the Institute of Electrical Engineers of Japan. Limiter circuit 93 performs a limiter process on the output of first-order lag system model 92.

(3-2-3-2) Mass System Computing Circuit 837

Figure 16:
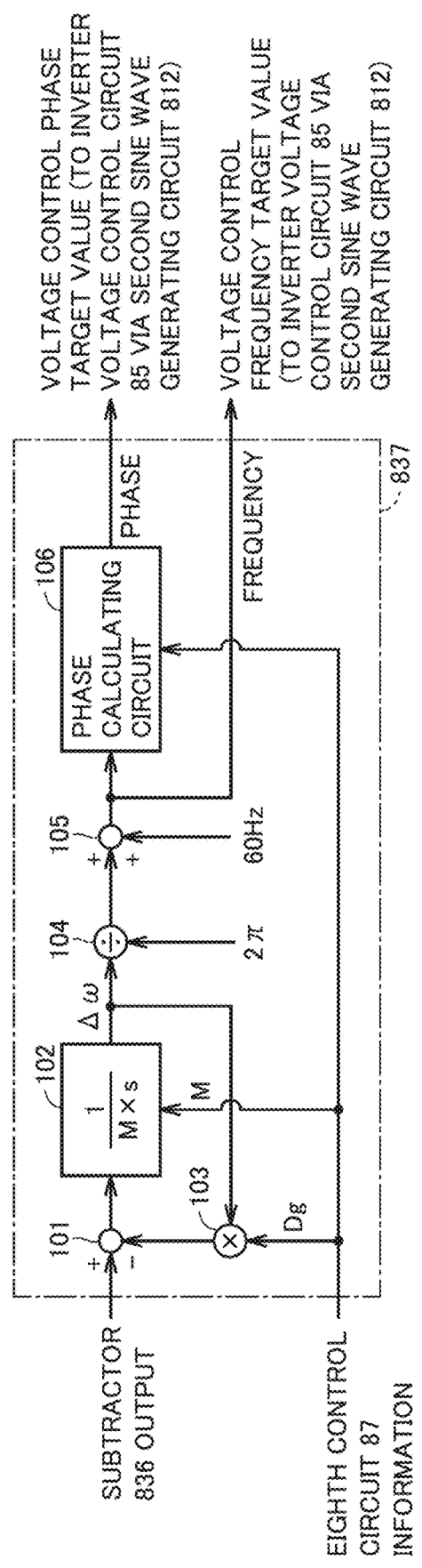
FIG. 16 is a block diagram illustrating a configuration of a mass system computing circuit illustrated in FIG. 14.

FIG. 16 is a block diagram illustrating a configuration of mass system computing circuit 837 illustrated in FIG. 14.

As illustrated in FIG. 16, mass system computing circuit 837 includes a subtractor 101, an integrator 102, a multiplier 103, a divider 104, an adder 105, and a phase calculating circuit 106.

Subtractor 101 calculates the deviation between the output of subtractor 836 and the output of multiplier 103. The output of subtractor 101 is input to integrator 102.

Integrator 102 generates a differential value $\Delta\omega$ between a target angular velocity ($2\times\pi\times$target frequency (for example 60 Hz)) of the generator rotor in FIG. 42 and the angular velocity of the generator rotor by integrating the output of subtractor 101 multiplied by $1/M$. The output of integrator 102 is input to multiplier 103.

Multiplier 103 multiplies the output of integrator 102 by damping coefficient Dg input from eighth control circuit 87.

Mass system computing circuit 837 is configured to mimic the damping force of the synchronous generator by controlling second DC/AC converter 408, based on the deviation between the output of subtractor 836 and the output of multiplier 103.

Divider 104 divides the output $\Delta\omega$ of integrator 102 by $2\times\pi$ to convert the output $\Delta\omega$ into a differential value $\Delta f$ of frequency. Adder 105 converts frequency differential information $\Delta f$ into a frequency of the generator rotor (rotation frequency) by adding target frequency (60 Hz) to frequency differential information $\Delta f$. The output of adder 105 is input to phase calculating circuit 106. Phase calculating circuit 106 calculates the phase of the generator rotor.

The transfer function of the swing equation of mass system computing circuit 837 will now be described. The transfer function of the swing equation can be expressed using the proportional gain (1/Dg) and the time constant (M/Dg) of the first-order time delay system by the following expression (3).

$$(1/M \times s)/\{1+Dg/M \times (1/s)\} = (1/Dg) \times [1/\{1 \pm (M/Dg) \times s\} \quad (3)$$

Governor time constant Tg and time constant M/Dg of the mass system computing unit in the virtual synchronous generator control are determined based on the response speed required for the system.

(Operation Overview of Power Conversion Device)

The operation overview of the power conversion device according to the first embodiment will now be described.

Figure 17:
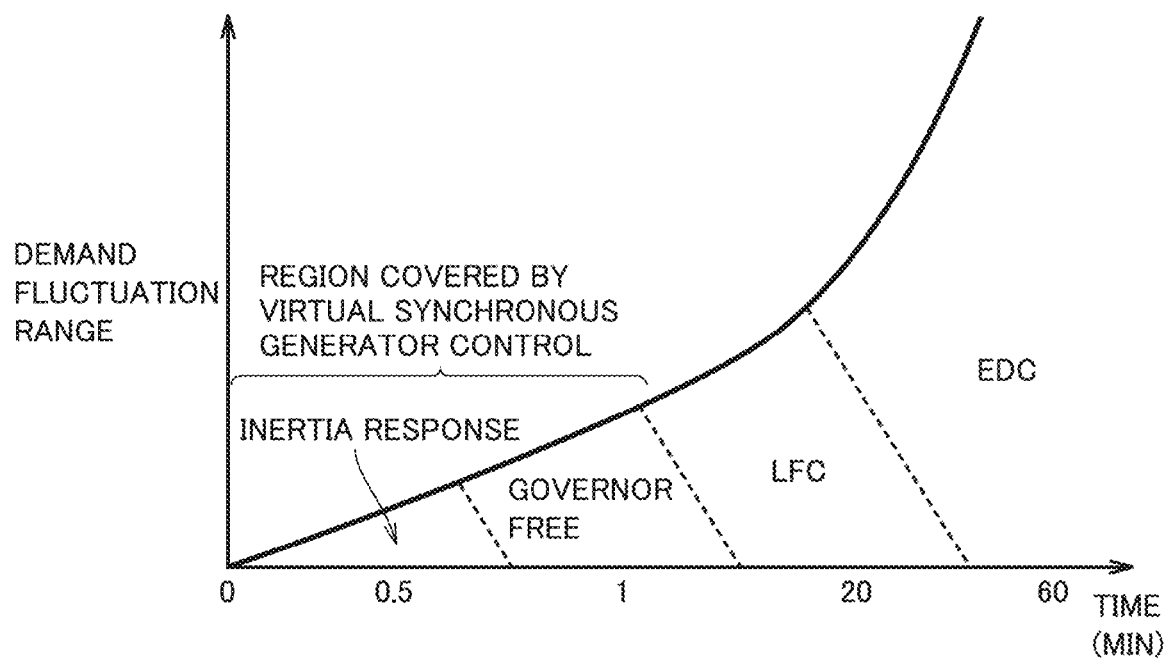
FIG. 17 is a diagram illustrating a region covered by virtual synchronous generator control implemented in a power conversion device.

FIG. 17 is a diagram illustrating a region covered by virtual synchronous generator control implemented in power conversion device 41. In FIG. 17, the horizontal axis shows the response time, and the vertical axis shows the demand fluctuation range.

As illustrated in FIG. 17, the virtual synchronous generator control implemented in the static inverter covers minute fluctuations and short-cycle fluctuations of approximately a few m seconds to a few minutes. Fluctuations longer than a few minutes can be handled by load frequency control (LFC) or economic load distribution control (EDC). Thus, in the first embodiment, the response performance of the virtual synchronous generator control is defined as one second or shorter.

In the following description, a model configured with storage battery 40, power conversion device 41, impedance 29 of the distribution system, and load 600 connected to distribution system 24 illustrated in FIG. 2 is used. For simplicity of explanation, it is assumed that the inverter capacity of power conversion device 41 is 4 kW and the capacity of load 600 is a maximum of 4 kW.

Figure 18:
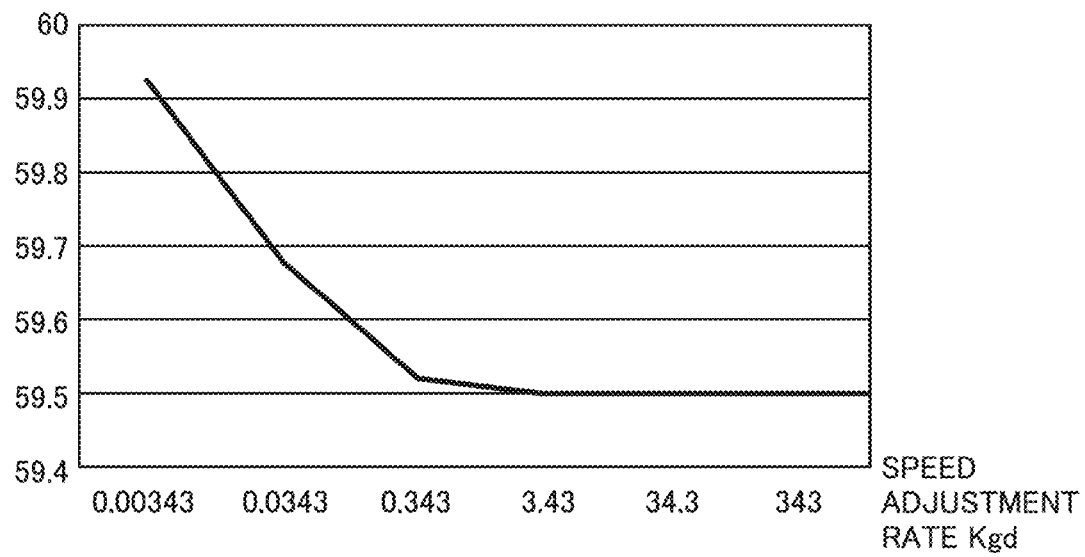
FIG. 18 is a diagram for explaining virtual synchronous generator control implemented in a power conversion device according to a first embodiment.

FIG. 18 is a diagram for explaining virtual synchronous generator control implemented in power conversion device 41 according to the first embodiment. FIG. 18 illustrates an example of the relation between speed adjustment rate Kgd and the system frequency when the power consumption of load 600 is changed without changing the power target value. FIG. 18 illustrates the system frequency at each speed adjustment rate Kgd in a steady state when load 600 fluctuates from 2 kW to 4 kW in a state in which notification of the power target value of 2 kW is given from CEMS 31 in FIG. 2. Each of governor time constant Tg, inertia constant M, and damping coefficient Dg is fixed to a constant value.

In the example in FIG. 18, the system frequency decreases as the value of Kgd increases until Kgd becomes 0.343. On the other hand, it is observed that the system frequency converges when Kgd exceeds 0.343.

Figure 19:
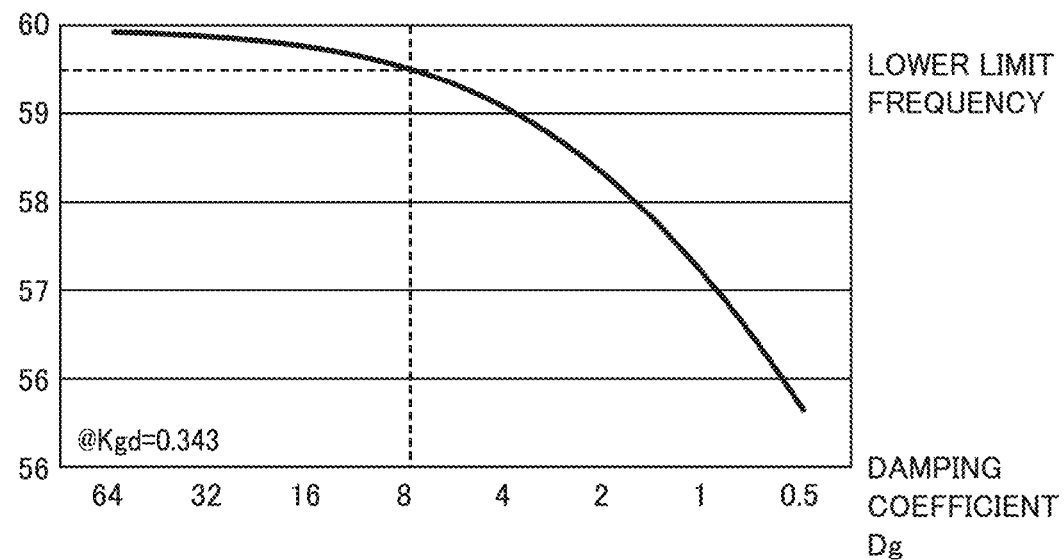
FIG. 19 is a diagram for explaining virtual synchronous generator control implemented in a power conversion device according to the first embodiment.

FIG. 19 is a diagram for explaining virtual synchronous generator control implemented in power conversion device 41 according to the first embodiment. FIG. 19 illustrates an example of the relation between damping coefficient Dg and the system frequency when the load is abruptly changed. FIG. 19 illustrates the system frequency at each damping coefficient Dg when the load fluctuates from 2 kW to 4 kW in a state in which notification of the power target value of 2 kW is given from CEMS 31 in FIG. 2. Each of governor time constant Tg, inertia constant M, and speed adjustment rate Kgd (=0.343) is fixed to a constant value. In the example in FIG. 19, it is observed that as damping coefficient Dg decreases, the decrease of the system frequency increases.

In general, the limit values (upper limit and lower limit) of the system frequency are approximately ±1 to 2% of the reference frequency (hereinafter also referred to as Fref). Thus, when reference frequency Fref is 60 Hz, the upper limit of the system frequency is approximately 61.2 to 60.6 Hz, and the lower limit of the system frequency is approximately 59.4 to 58.8 Hz. It is therefore necessary to set speed adjustment rate Kgd and damping coefficient Dg in the governor control such that the system frequency falls within a frequency range determined by the limit values.

A drooping characteristic (ΔP/ΔF characteristic) will now be described.

Figure 20:
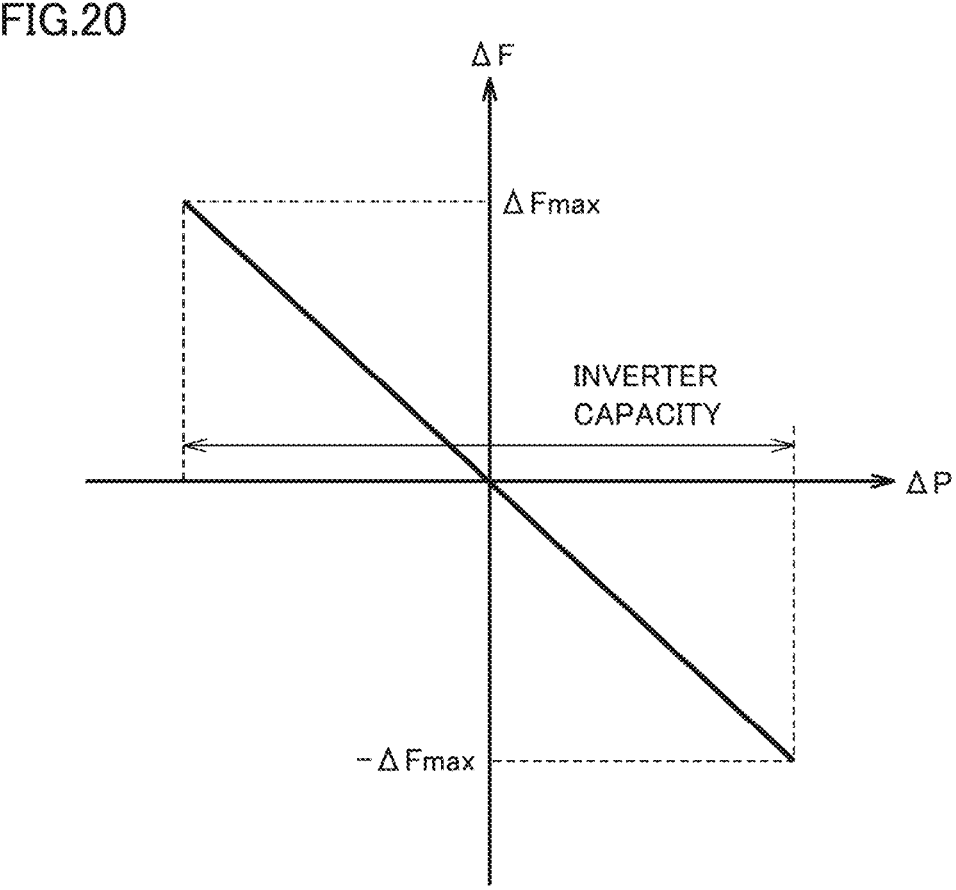
FIG. 20 is a diagram illustrating an example of a ΔP/ΔF characteristic.

FIG. 20 is a diagram illustrating an example of the ΔP/ΔF characteristic. The horizontal axis in FIG. 20 is differential power ΔP that is a deviation of the actual output power of power conversion device 41 from power target value Pref. Differential power ΔP is positive when the output power of power conversion device 41 is greater than power target value Pref.

The vertical axis in FIG. 20 is differential frequency ΔF that is a deviation of the frequency of AC voltage output by power conversion device 41 from reference frequency Fref (for example 60 Hz) of the AC system. Differential frequency ΔF is positive when the frequency of AC voltage output by power conversion device 41 is higher than reference frequency Fref. ΔFmax is the maximum value of differential frequency ΔF.

In virtual synchronous generator control circuit 83 (FIG. 11) according to the first embodiment, the ΔP/ΔF characteristic illustrated in FIG. 20 is determined depending on the capacity of the static inverter (second DC/AC converter 408), speed adjustment rate Kgd, and damping coefficient Dg. In FIG. 20, charging of storage battery 40 is not taken into consideration, and the power target value is set to half the capacity of the static inverter (second DC/AC converter 408). FIG. 20 illustrates the ΔP/ΔF characteristic in a case where the system frequency when the power consumption of load 600 is equal to the capacity of the static inverter (second DC/AC converter 408) in FIG. 2 is the upper limit (Fref+ΔFmax), and the system frequency when the power consumption of load 600 is zero is the lower limit (Fref−ΔFmax).

In the first embodiment, the ΔP/ΔF characteristic illustrated in FIG. 20 is referred to as "reference ΔP/ΔF characteristic". As described above, the reference ΔP/ΔF characteristic is the ΔP/ΔF characteristic under the condition that, in the discharge mode of storage battery 40, a half of the capacity of static inverter is a power target value, the system frequency is the upper limit (Fref+ΔFmax) when the output of the static inverter agrees with the capacity, and the system frequency is the lower limit (Fref−ΔFmax) when the output of the static inverter is zero. The detail of the discharge mode will be described later.

Figure 21:
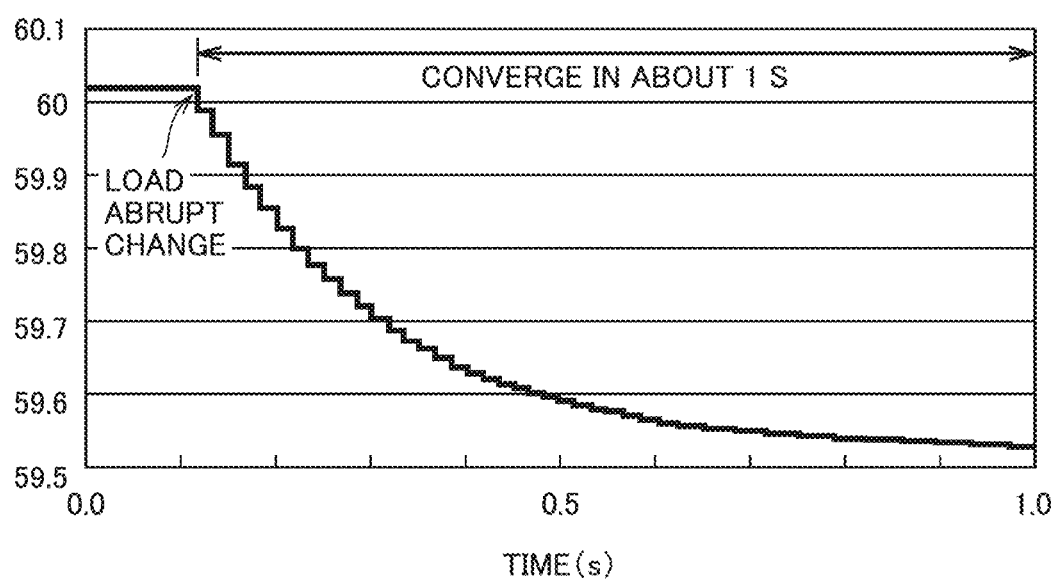
FIG. 21 is a diagram illustrating a response waveform of the frequency of an AC voltage output from a static inverter when a load is abruptly changed in the virtual synchronous generator control implemented in the power conversion device according to the first embodiment.

FIG. 21 is a diagram illustrating a response waveform of the frequency of AC voltage output from the static inverter when a load is abruptly changed in the virtual synchronous generator control implemented in power conversion device 41 according to the first embodiment.

As illustrated in FIG. 17, the virtual synchronous generator control implemented in the static inverter covers minute oscillations and short-cycle fluctuations of approximately a few m seconds to a few minutes. Thus, the response performance of 1 second or shorter is required for the virtual synchronous generator control. In general, when the time constant is reduced, the response performance increases but oscillations occur in the response waveform. Further, when a plurality of distributed power sources operate in cooperation, inconvenience such as occurrence of unnecessary cross current may occur. Thus, in the first embodiment, as illustrated in FIG. 21, the time constant in governor control circuit 833 (FIG. 15) and mass system computing circuit 837 (FIG. 16) is determined such that the system frequency converges in approximately 1 second.

(Problems of Conventional Virtual Synchronous Generator Control)

Problems in a case where two power conversion devices 41 equipped with conventional virtual synchronous generator control are disposed in a distribution system will now be described.

Figure 22:
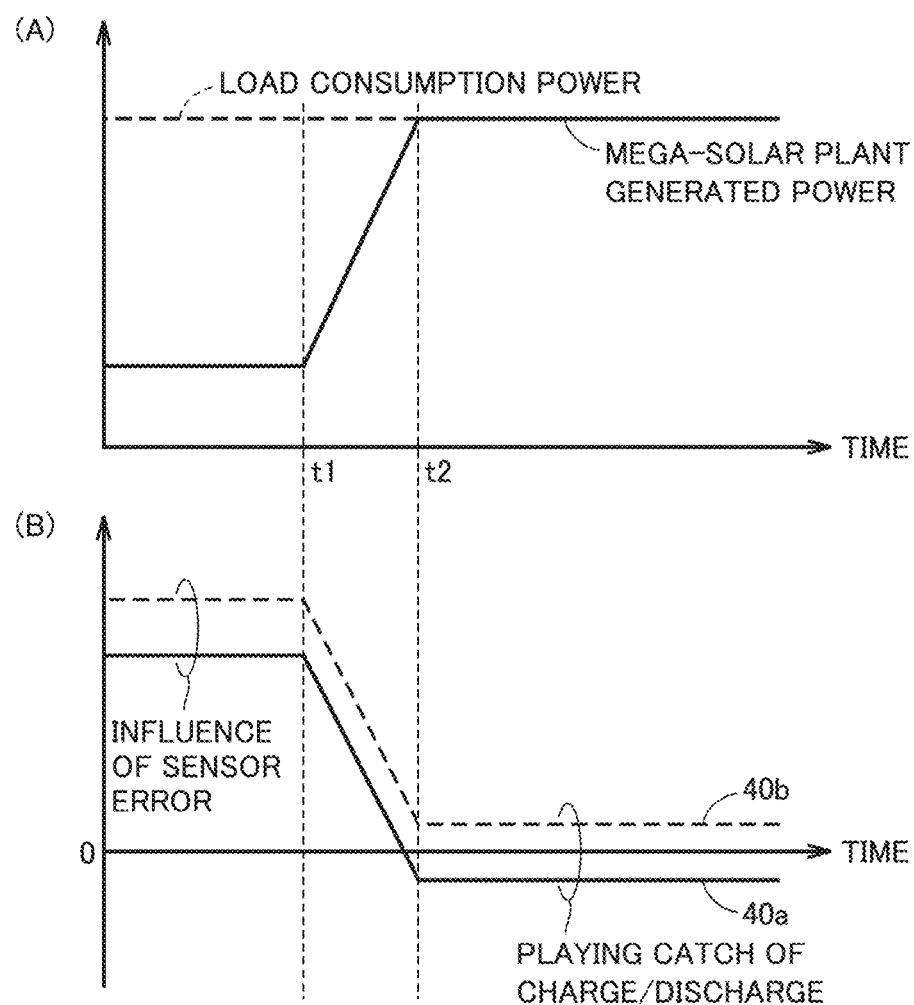
FIG. 22 is a diagram illustrating a response waveform of the effective value of AC power output from two power conversion devices equipped with conventional virtual synchronous generator control.

FIG. 22(A) illustrates the waveforms of the power consumption of loads and the generated power of mega-solar plant 26 in an independent system configured using two power conversion devices 41 equipped with conventional virtual synchronous generator control. The generated power of mega-solar plant 26 abruptly increases at time t1 and becomes equal to the power consumption of loads at time t2. That is, after time t2, the generated power of mega-solar plant 26 and the power consumption of loads become balanced.

FIG. 22(B) illustrates the response waveforms of effective values of AC powers output from power conversion devices 41 (second DC/AC converters 408). The solid line indicates the response waveform of output power from power conversion device 41a connected to storage battery 40a, and the broken line indicates the response waveform of output power of power conversion device 41b connected to storage battery 40b.

It is assumed that the inverter capacities of two power conversion devices 41 are the same. Before time t1, each power conversion device 41 discharges a power of 60% of the inverter capacity. FIG. 22(B) illustrates a conventional response waveform when the generated power of mega-solar plant 26 abruptly increases at time t1 and the power consumption of loads and the generated power of mega-solar plant 26 become balanced.

As explained in the description of AC frequency detecting circuit 81 (FIG. 11), the outputs of sensors such as voltmeters and ammeters have a sensor error (for example, approximately 5%). Specifically, each sensor has an offset error and a linearity error. For example, when the voltmeter has an offset error of 1%, −5.76 V (288 V×2×0.01=5.76 V) is output from the voltmeter for the original voltage 0 V of AC voltage. Thus, in conventional power conversion device 41, power may be output from power conversion device 41 due to the influence of the sensor error, although the power command value is zero.

This is because third control circuit 404 that controls second DC/DC converter 403 (FIG. 7) controls charge/discharge power of storage battery 40 such that DC voltage on DC bus 405 becomes constant. Thus, due to the sensor error, power in storage battery 40 may be discharged through power conversion device 41 or power may be charged into storage battery 40 through power conversion device 41 under the influence of the drooping characteristic (ΔP/ΔF characteristic) in virtual synchronous generator control, although it is essentially not necessary to perform charge/discharge. In the case (conventional control) in FIG. 22(B), storage battery 40a is charged with power received from the distribution system at time t2 when the generated power of mega-solar plant 26 and the power consumption of loads balance. On the other hand, storage battery 40b discharges power to the distribution system at time t2. Here, since the generated power of mega-solar plant 26 and the power consumption of loads balance, the discharged power from storage battery 40b is charged into storage battery 40a. That is, the operation in which the discharge power from one storage battery (storage battery 40b) charges the other storage battery (storage battery 40a), or playing catch (or hunting operation) of charge/discharge is performed. Such unnecessary exchange of power between storage battery 40a and storage battery 40b may cause power loss due to charge/discharge and advance the deterioration of storage battery 40.

Figure 23:
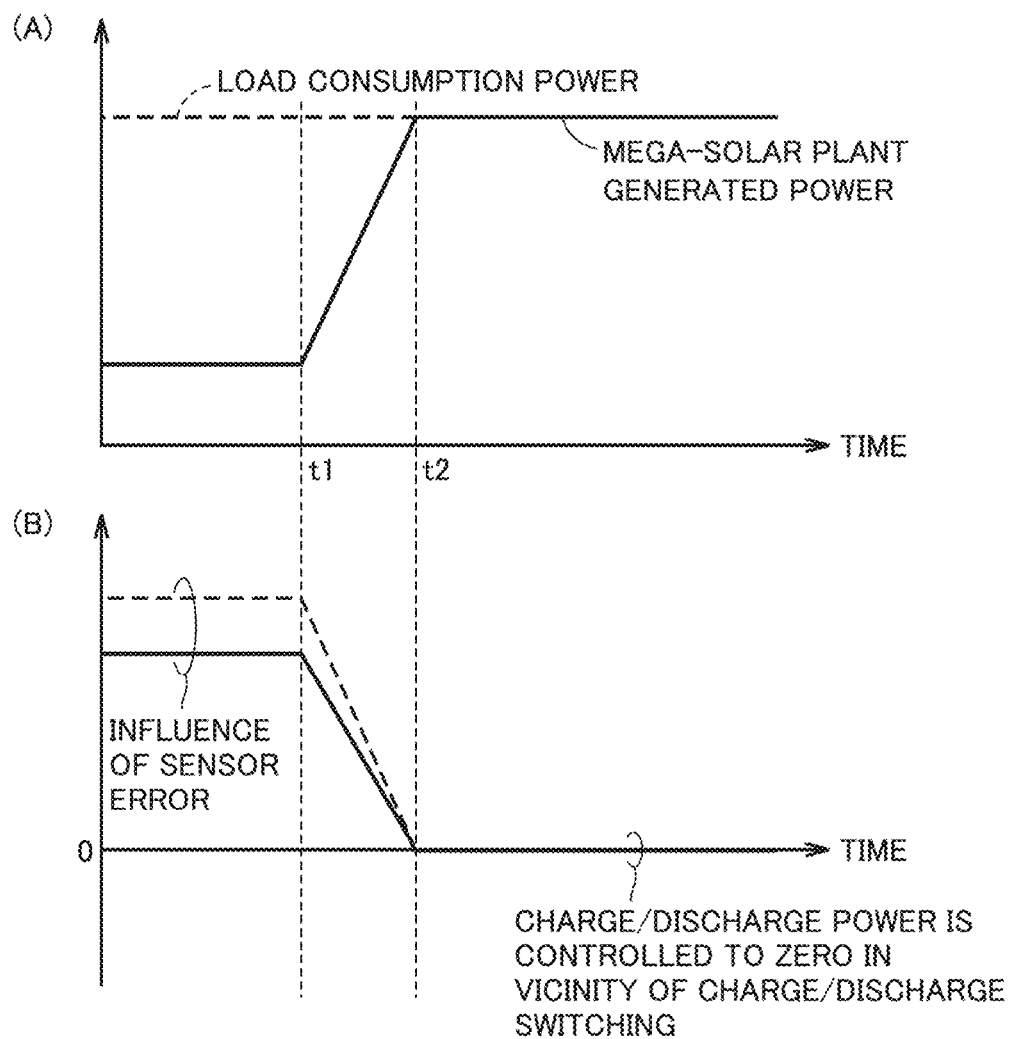
FIG. 23 is a diagram illustrating a response waveform of the effective value of AC power output from two power conversion devices equipped with virtual synchronous generator control according to the first embodiment.

Referring now to FIG. 23, the operation of power conversion devices 41a and 41b equipped with virtual synchronous generator control according to the first embodiment will be described. In the following description, it is assumed that the voltmeters and the ammeters contained in power conversion devices 41a and 41b have errors similar to those in FIG. 22.

In the first embodiment, a dead zone is imparted in the vicinity of the switching frequency of charge/discharge of storage battery 40 in the drooping characteristic (ΔP/ΔF characteristic) of each power conversion device 41. The detail of the dead zone in the drooping characteristic will be described later.

FIG. 23(A) illustrates the waveforms of the power consumption of loads and the generated power of mega-solar plant 26 in an independent system configured using two power conversion devices 41, in the same manner as in FIG. 22(A). The generated power of mega-solar plant 26 abruptly increases at time t1 and becomes equal to the power consumption of loads at time t2. That is, after time t2, the generated power of mega-solar plant 26 and the power consumption of loads become balanced.

FIG. 23(B) illustrates the response waveforms of effective values of AC powers output from power conversion devices 41 (second DC/AC converters 408). The solid line indicates the response waveform of output power from power conversion device 41a connected to storage battery 40a, and the broken line indicates the response waveform of output power from power conversion device 41b connected to storage battery 40b.

It is assumed that the inverter capacities of two power conversion devices 41 are the same. Before time t1, each power conversion device 41 discharges a power of 60% of the inverter capacity. FIG. 23(B) illustrates a response waveform when the generated power of mega-solar plant 26 abruptly increases at time t1 and the power consumption of loads and the generated power of mega-solar plant 26 become balanced.

In the first embodiment, the ΔP/ΔF characteristic is calculated based on information used to generate control parameters of virtual synchronous generator control given from CEMS 31, and the frequency (switching frequency) at which charge/discharge of storage battery 40 is switched is derived using the calculated ΔP/ΔF characteristic and a power target value. A dead zone is then provided in the ΔP/ΔF characteristic (drooping characteristic) in the vicinity of the derived switching frequency. Second DC/DC converter 403 and second DC/AC converter 408 are controlled based on the ΔP/ΔF characteristic with the dead zone so that the charge/discharge power of storage battery 40 becomes "zero".

The system frequency output from virtual synchronous generator control circuit 83 or the detection result of frequency of the system voltage output from AC frequency detecting circuit 81 is used as information for detecting a dead zone. Virtual synchronous generator control circuit 83 continues the normal operation even when the system frequency output from virtual synchronous generator control circuit 83 or the detection result of frequency of the system voltage output from AC frequency detecting circuit 81 is in the frequency range of the dead zone.

Returning to FIG. 23(B), in a period until the generated power of mega-solar plant 26 increases with change in the solar radiation at time t1 and becomes balanced with the power consumption of loads at time t2, the distribution system is sustained by the discharge power from storage batteries 40a and 40b, in addition to the generated power of mega-solar plant 26. In this case, although the power target value from CEMS 31 is the same, there is a difference between powers output from power conversion devices 41 (second DC/AC converters 408). Then, at time t2, when the power consumption of loads and the generated power of mega-solar plant 26 become balanced, the output power from power conversion device 41a is controlled such that the charge/discharge power of storage battery 40a becomes "zero" in the frequency period of the dead zone width (which will be detailed later) when storage battery 40a switches from charge to discharge. Thus, at time t2, the output power from power conversion device 41a sticks to "zero". On the other hand, power conversion device 41b reduces the discharge power toward time t2, and finally the output power sticks to "zero" in the same manner as in power conversion device 41a.

In this way, the first embodiment can suppress unnecessary exchange of power between storage batteries 40a and 40b, which is the problem in the conventional control, and thereby suppress power loss due to unnecessary charge/discharge and suppress progress of deterioration of storage batteries 40a and 40b.

(Method of Creating Control Parameter of Virtual Synchronous Generator Control)

A method of creating a control parameter ($\Delta P/\Delta F$ characteristic) of virtual synchronous generator control of each power conversion device 41 in CEMS 31 will now be described. The control parameter is created by control parameter generating circuit 13 (FIG. 3) in CEMS 31. In the first embodiment, the $\Delta P/\Delta F$ characteristic of each power conversion device 41 is created by CEMS 31. In doing so, the $\Delta P/\Delta F$ characteristic serving as a reference (reference $\Delta P/\Delta F$ characteristic) is created as described above. In the following, for simplicity of explanation, the description will focus only on the discharge operation of storage battery 40.

When storage battery 40 is operated only on the discharge operation or the charge operation, a reference $\Delta P/\Delta F$ characteristic is created such that $\Delta P$ for $\Delta F\max$ is half the capacity of the static inverter. On the other hand, when the charge/discharge operation is included (in particular when the power target value is in the vicinity of zero), a reference $\Delta P/\Delta F$ characteristic is created such that $\Delta P$ for $\Delta F\max$ is the capacity of the static inverter. In doing so, it needs to be generated under the same policy in all of power conversion devices 41 managed by CEMS 31. Thus, the $\Delta P/\Delta F$ characteristic is not created while one of a plurality of power conversion devices 41 considers the charge/discharge operation and the others consider only the charge operation or the discharge operation.

Further, as shown in the first embodiment, when the $\Delta P/\Delta F$ characteristic is created for a plurality of power conversion devices 41, it is necessary that the $\Delta P/\Delta F$ characteristic should be created such that each power conversion device 41 switches charge/discharge at the same $\Delta F$ value. The reason for this is as follows.

In a case where the $\Delta F$ value at which charge/discharge is switched varies among a plurality of power conversion devices 41, when the power target value is a positive value (discharge), with decreasing power supplied to the distribution system, power conversion device 41 with the smallest absolute value of the $\Delta F$ value at which charge/discharge is switched switches to the charge mode, although the other power conversion devices 41 are discharging, and receives the discharge power from the other power conversion devices 41 to charge the corresponding storage battery 40.

Similarly, when the power target value is a negative value (charge), power conversion device 41 with the smallest absolute value of the $\Delta F$ value at which charge/discharge is switched switches to the discharge mode, although the other power conversion devices 41 are charging, and supplies discharge power to the other power conversion devices 41.

In both cases, charge/discharge is unnecessary in each power conversion device 41, and charge/discharge between a plurality of storage batteries 40 causes power loss and advances the deterioration of storage batteries 40. Thus, in the first embodiment, the $\Delta P/\Delta F$ characteristic is created such that each power conversion device 41 switches charge/discharge at the same $\Delta F$ value.

The method of creating the $\Delta P/\Delta F$ characteristic of each power conversion device 41 in CEMS 31 will be specifically described below.

As illustrated in FIG. 4, in operation plan creating circuit 14 in CEMS 31, power generation predicting circuit 142 predicts the amount of power generation of mega-solar plant 26, based on weather forecast information from a not-shown external server and data for predicting the amount of power generation stored in a not-shown database in CEMS 31. The history of the amount of power generation measured at each day, each time, and each weather record is stored in the database.

Similarly, power consumption predicting circuit 143 predicts power consumption of consumer loads, using data for predicting power consumption of consumer loads accumulated in a not-shown database in CEMS 31. The history of load power consumption measured at each day, each time, and each weather record is stored in the database.

Storage battery operation plan creating circuit 141 calculates the total of charge/discharge power of each storage battery 40, based on the prediction result of the amount of power generation of mega-solar plant 26 and the prediction result of power consumption of consumer loads. Storage battery operation plan creating circuit 141 then calculates the power target value to be output to each power conversion device, based on information on the storage battery capacity and the state of charge of each storage battery 40 and the inverter capacity of power conversion device 41 given from first management circuit 145, and the calculation result of the total of charge/discharge power.

In the first embodiment, a power target value of each power conversion device 41 is basically generated such that the state of charge and the storage battery capacity after 30 minutes are equal, based on the storage battery capacity and the state of charge of each storage battery 40. When the power target value exceeds the inverter capacity of power conversion device 41, the power target value is adjusted to be equal to or lower than the inverter capacity. In the first embodiment, a reference $\Delta P/\Delta F$ characteristic is created, assuming that a plurality of power conversion devices 41 for which a power target value is generated are a single power conversion device.

Specifically, control parameter generating circuit 13 (FIG. 3) calculates the total ($\Sigma(Cinv)$) of inverter capacities Cinv of a plurality of power conversion devices 41 for which a power target value is to be generated, and generates a reference $\Delta P/\Delta F$ characteristic such that the $\Delta P$ value for the ΔFmax value is half the total of capacities (Σ(Cinv)) of static inverters. It is noted that only discharge or charge of storage battery 40 is considered.

Upon completion of generation of a reference ΔP/ΔF characteristic, control parameter generating circuit 13 calculates the total of power target values of a plurality of target power conversion devices 41 generated by operation plan creating circuit 14. Control parameter generating circuit 13 then calculates the frequency (switching frequency) at which charge/discharge of storage battery 40 is switched, assuming that a plurality of power conversion devices 41 are a single power conversion device. Specifically, in the first embodiment, when the power target value is a positive value (discharge), a differential frequency ΔF at which ΔP=−(the total of power target values) is calculated as a switching frequency in the reference ΔP/ΔF characteristic. In the following description, the calculated differential frequency ΔF may be referred to as "switching frequency ΔF0".

Then, control parameter generating circuit 13 generates a ΔP/ΔF characteristic, based on the power target value of each power conversion device 41 given from operation plan creating circuit 14, and switching frequency ΔF0, and the inverter capacity. In the first embodiment, control parameter generating circuit 13 notifies power conversion device 41 of data representing the slope of the ΔP/ΔF characteristic and the power target value. Control parameter generating circuit 88 (FIG. 11) generates various control parameters in virtual synchronous generator control circuit 83, based on the given information.

Control parameter generating circuit 13 also calculates a dead zone width applied to the ΔP/ΔF characteristic. The detail of the method of generating a dead zone width will be described later. For example, in a simplified manner, the dead zone width can be set to a width of approximately 5% of ΔFmax. Alternatively, the dead zone width may be changed in accordance with the SOC of each storage battery 40 or the inverter capacity. As a method of changing the dead zone width in accordance with the SOC of storage battery 40, for example, in the discharge mode, in order to reduce the discharge power of storage battery 40 with SOC of less than 20%, the dead zone width of this storage battery 40 is narrowed compared with the dead zone width of the other storage batteries 40. Thus, storage battery 40 with a low SOC can shift to the charge mode quickly. On the other hand, in the charge mode, in order to reduce the charge power of storage battery 40 with SOC exceeding 80%, the dead zone width of this storage battery 40 is narrowed compared with the dead zone width of the other storage batteries 40. Thus, the storage battery with a high SOC can shift to the discharge mode quickly.

Figure 24A:
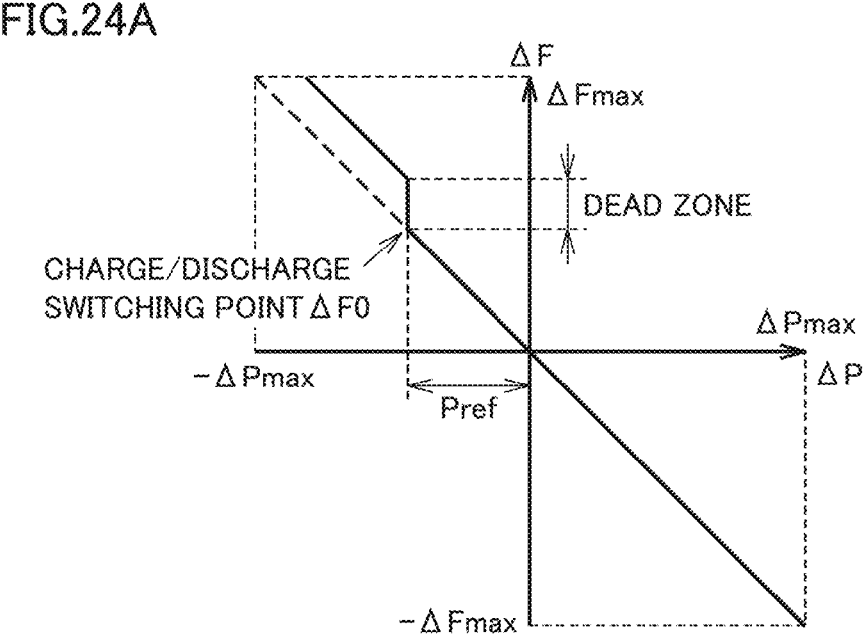
FIG. 24A is a diagram illustrating a first example of the ΔP/ΔF characteristic of power conversion device 41 equipped with virtual synchronous generator control according to the first embodiment.
Figure 24B:
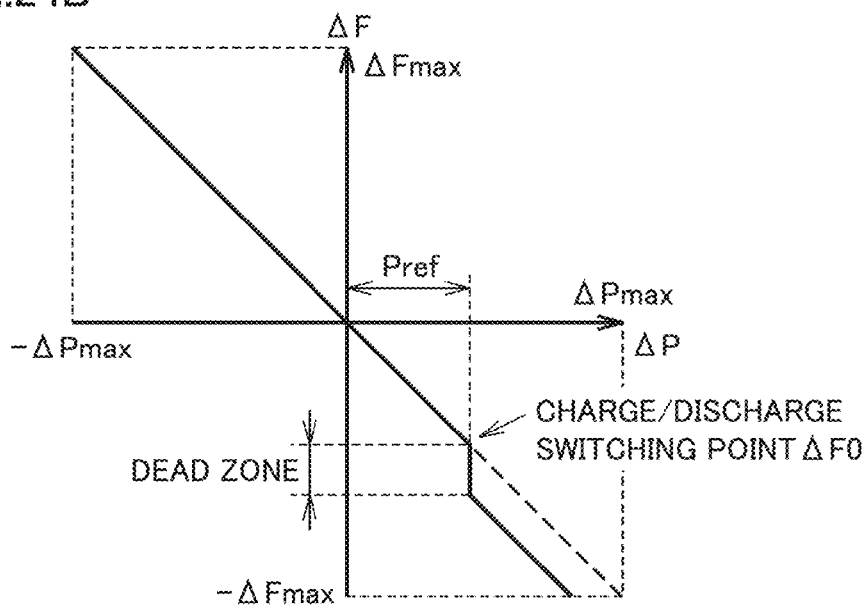
FIG. 24B is a diagram illustrating a second example of the ΔP/ΔF characteristic of power conversion device 41 equipped with virtual synchronous generator control according to the first embodiment.

FIG. 24A to FIG. 24C are diagrams illustrating an example of the ΔP/ΔF characteristic of power conversion device 41 equipped with virtual synchronous generator control according to the first embodiment. A dead zone is provided in each ΔP/ΔF characteristic.

FIG. 24A shows a ΔP/ΔF characteristic in a case where power target value Pref given from CEMS 31 is a positive value (discharge). As illustrated in FIG. 24A, the ΔP value is fixed at a point of time when ΔP=−Pref, that is, ΔF=ΔF0. Since ΔF0 is a switching frequency, the output from second DC/AC converter 408 is set to "zero". The output of second DC/AC converter 408 is set to "zero" until ΔF of the system voltage exceeds the dead zone. Then, when ΔF exceeds the upper limit frequency of the dead zone, the discharge mode shifts to the charge mode, and second DC/AC converter 408 is controlled such that the corresponding storage battery 40 is charged. When ΔF of the system voltage becomes equal to or lower than ΔF0 before exceeding the upper limit frequency of the dead zone, second DC/AC converter 408 is controlled in the discharge mode again.

On the other hand, at the time of returning from the charge mode to the discharge mode, when ΔF becomes equal to or lower than the upper limit frequency of the dead zone, the output from second DC/AC converter 408 is fixed to "zero". Then, when ΔF falls below the lower limit frequency (switching frequency ΔF0) of the dead zone, second DC/AC converter 408 is shifted to the discharge mode. When ΔF becomes equal to or higher than the upper limit frequency of the dead zone before falling below the lower limit frequency (switching frequency ΔF0) of the dead zone, second DC/AC converter 408 is controlled in the charge mode again.

FIG. 24B shows a ΔP/ΔF characteristic in a case where power target value Pref given from CEMS 31 is a negative value (charge). In FIG. 24B, the ΔP value is fixed at a point of time when ΔP=Pref, that is, ΔF=ΔF0. Since ΔF0 is a switching frequency, the output from second DC/AC converter 408 is set to "zero". The output of second DC/AC converter 408 is set to "zero" until ΔF of the system voltage exceeds the dead zone. Then, when ΔF exceeds the lower limit frequency of the dead zone, the charge mode shifts to the discharge mode, and second DC/AC converter 408 is controlled such that the corresponding storage battery 40 is discharged. When ΔF of the system voltage exceeds switching frequency ΔF0 before exceeding the lower limit frequency of the dead zone, second DC/AC converter 408 is controlled in the charge mode again.

On the other hand, at the time of returning from the discharge mode to the charge mode, when ΔF becomes equal to or higher than the lower limit frequency of the dead zone, the output from second DC/AC converter 408 is fixed to "zero". Then, when ΔF exceeds the upper limit frequency (switching frequency ΔF0) of the dead zone, second DC/AC converter 408 is shifted to the charge mode. When ΔF falls below the lower limit frequency of the dead zone before exceeding the upper limit frequency (switching frequency ΔF0) of the dead zone, second DC/AC converter 408 is controlled in the discharge mode again.

FIG. 24C shows a ΔP/ΔF characteristic in a case where power target value Pref given from CEMS 31 is zero. In FIG. 24C, a dead zone is imparted with ΔP=0 at the center.

As explained above, in a case where a plurality of power conversion devices 41 having static inverters equipped with virtual synchronous generator control are connected to a system, a dead zone is imparted to the drooping characteristic (ΔP/ΔF characteristic) applied to each power conversion device 41 by virtual synchronous generator control. This can prevent charging of storage battery 40a with discharge power from storage battery 40b, as illustrated in FIG. 22(B), due to sensor errors of voltmeters and ammeters, although the generated power of mega-solar plant 26 and the power consumption of loads balance. Thus, the power loss due to unnecessary exchange of power between storage batteries 40a and 40b and the progress of deterioration of storage batteries can be suppressed.

In the first embodiment, the method of generating a ΔP/ΔF characteristic by the following procedure has been described. More specifically, first, a reference ΔP/ΔF characteristic is generated, assuming that a plurality of power conversion devices 41 for which a power target value is generated are a single power conversion device. Then, a frequency at which charge/discharge is switched (switching frequency ΔF0) is calculated using the generated reference ΔP/ΔF characteristic and the total of power target values of power conversion devices 41 described above. Finally, the ΔP/ΔF characteristic of each power conversion device 41 is generated using the calculated switching frequency ΔF0 and the power target value of each power conversion device 41.

However, the method of generating a ΔP/ΔF characteristic is not limited to this method. For example, when a plurality of power conversion devices 41 are operated in the discharge mode, the ΔP/ΔF characteristic of power conversion device 41 corresponding to storage battery 40 with the smallest SOC is generated. Then, switching frequency ΔF0 is calculated from the generated ΔP/ΔF characteristic and used as switching frequency ΔF0 when a ΔP/ΔF characteristic is generated in power conversion device 41 corresponding to another storage battery 40.

Alternatively, when a plurality of power conversion devices 41 are operated in the charge mode, the ΔP/ΔF characteristic of power conversion device 41 corresponding to storage battery 40 with the largest SOC is generated. Then, switching frequency ΔF0 is calculated from the generated ΔP/ΔF characteristic and used as switching frequency ΔF0 when a ΔP/ΔF characteristic is generated in power conversion device 41 corresponding to another storage battery 40.

The ΔP/ΔF characteristic is generated in this way, whereby the ΔP/ΔF characteristic can be generated to be matched to storage battery 40 with the smallest SOC in the discharge mode, and the ΔP/ΔF characteristic can be generated to be matched to storage battery 40 with the largest SOC in the charge mode.

(Operation of Power Conversion Device)

Referring now to FIG. 1 to FIG. 38, the operation of the power conversion device according to the first embodiment will be described in detail.

First of all, referring to FIG. 1, distribution system 24 to which the power conversion device according to the first embodiment is applied will be described.

In the first embodiment, distribution system 24 has a plurality of SVRs 23 connected in series between substation 20 and power conversion device 27 (or power conversion device 41*a* or town 100*a*) in order that the system voltage supplied from substation 20 is regulated within a prescribed voltage range.

Power conversion device 41*a* is installed near power conversion device 27. In the first embodiment, power conversion device 41*a* operates as a voltage source. Power conversion device 41*a* can smooth the generated power of mega-solar plant 26 by operating virtual synchronous generator control circuit 83 (FIG. 11).

Examples of the load include towns 100*a* to 100*d*, factory 110, and building 112 and apartment house 113. The power supplied from substation 20, the generated power of mega-solar plant 26, and the discharge power of storage batteries 40*a* to 40*c* are supplied to the load. A synchronous generator for emergency is disposed in the factory, and a synchronous generator for emergency is disposed in the building.

Figure 25:
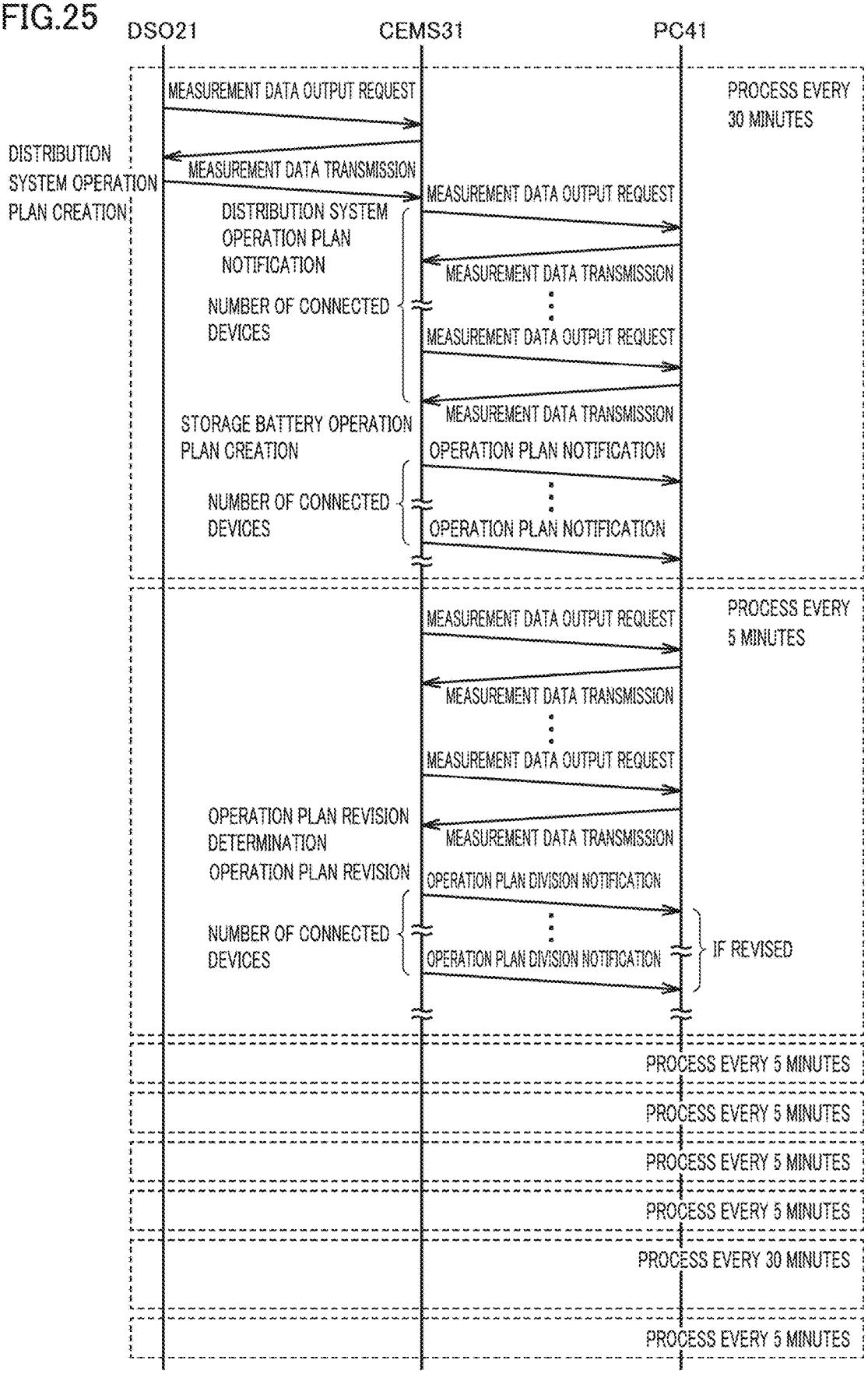
FIG. 25 is a sequence diagram for explaining normal operation of a distributed power source system centered on a CEMS illustrated in FIG. 1.

The operation of a distributed power source system in distribution system 24 receiving the power supplied from substation 20, the generated power of mega-solar plant 26, and the discharge power of storage batteries 40*a* to 40*c* will now be described. FIG. 25 is a sequence diagram for explaining normal operation of a distributed power source system centered on CEMS 31 illustrated in FIG. 1.

As illustrated in FIG. 25, the process at normal times includes a process performed every 30 minutes (hereinafter also referred to as "first process") and a process performed every 5 minutes (hereinafter also referred to as "second process").

Upon start of the first process (process every 30 minutes), DSO 21 requests CEMS 31 to output the collected measurement data through communication line 25. Upon receiving the request from DSO 21, CEMS 31 transmits measurement data including the amount of power consumption of each consumer, the amount of generated power of mega-solar plant 26, and the amount of charge/discharge power and the SOC of storage battery 40 collected for immediate 30 minutes to DSO 21.

Upon receiving the measurement data, DSO 21 creates an operation plan of distribution system 24 based on the measurement data and notifies CEMS 31 of the created operation plan. The operation plan of distribution system 24 includes a power supply plan from substation 20 to distribution system 24 and is necessary for creating an operation plan (charge/discharge plan) of storage battery 40. DSO 21 creates every 30 minutes power supply plans, for 24 hours. The every 30 minutes power supply plan indicates the total amount of power supplied from substation 20 to distribution system 24 for 30 minutes.

Upon receiving the operation plan (power supply plan) from DSO 21, CEMS 31 requests power conversion device 41 to transmit measurement data. The measurement data includes the amount of charge/discharge power and the SOC information of storage battery 40 for immediate 5 minutes Upon receiving the request from CEMS 31, power conversion device 41 notifies CEMS 31 of measurement data.

CEMS 31 receives measurement data from all power conversion devices 41*a* to 41*c* connected to distribution system 24. In doing so, CEMS 31 also collects measurement data such as the amount of power consumption for 30 minutes of each consumer and the amount of generated power of mega-solar plant 26.

Upon completion of collection of measurement data, CEMS 31 creates an operation plan of storage battery 40 and information necessary for generating control parameters. The operation plan of storage battery 40 is a charge/discharge plan of storage battery 40 and includes a target value (power target value) of charge/discharge power of storage battery 40. The method of creating an operation plan of storage battery 40 and information necessary for generating control parameters will be described later.

Upon completion of creation of an operation plan of storage battery 40 and information necessary for generating control parameters, CEMS 31 notifies each power conversion device 41 of the operation plan of the corresponding storage battery 40 and the information necessary for generating control parameters and terminates the first process.

Subsequently, CEMS 31 performs the second process (every 5 minutes process). CEMS 31 collects measurement data from each power conversion device 41 every 5 minutes. CEMS 31 detects the deviation between the power target value and the actual charge/discharge power, based on the collected measurement data. When the deviation is equal to or greater than a predetermined threshold, CEMS 31 recalculates an operation plan (power target value) of storage battery 40 and notifies each power conversion device 41 of the recalculation result. A specific method of recalculation will be described later.

(Operation of CEMS 31)

Figure 26:
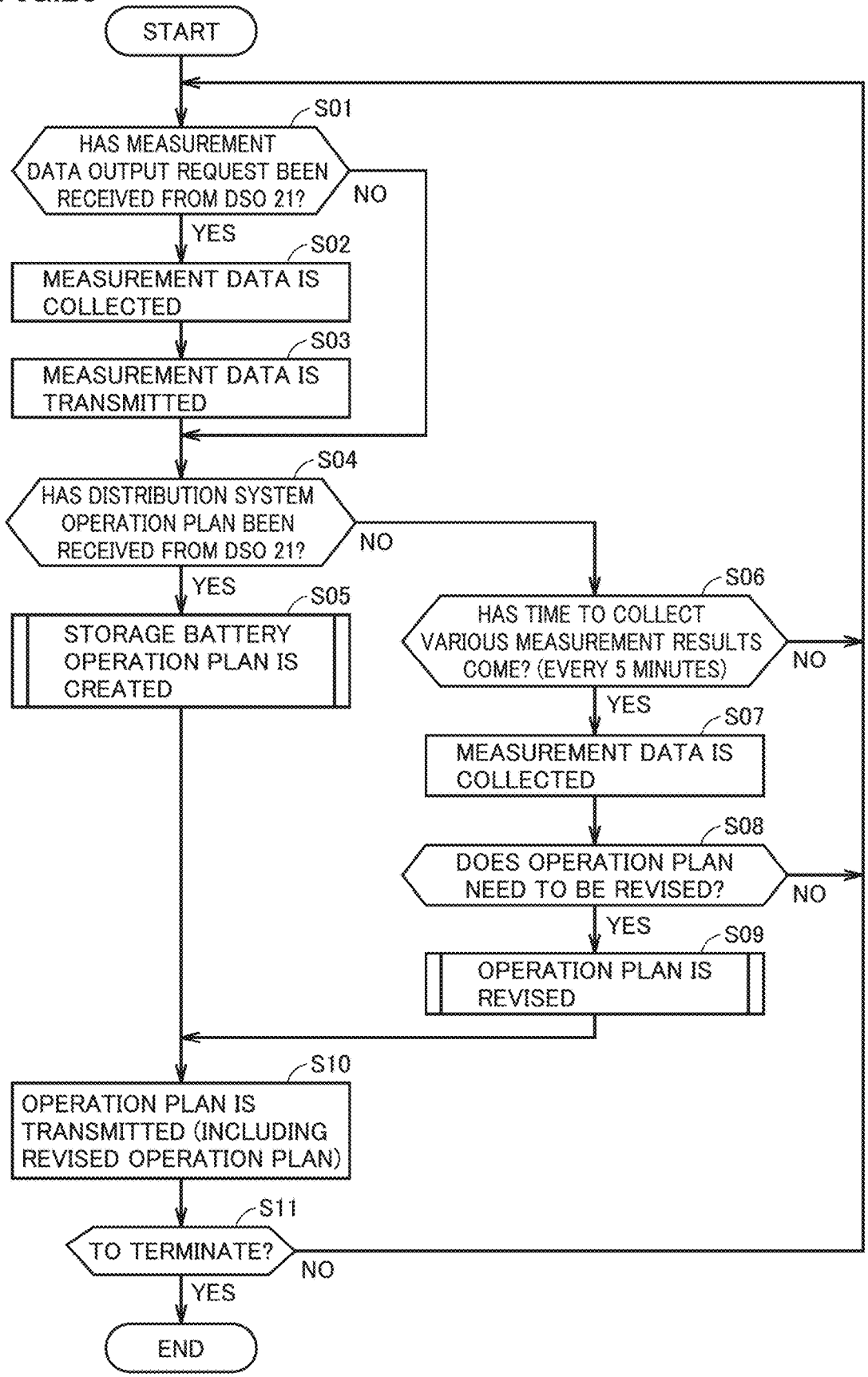
FIG. 26 is a flowchart illustrating a control process of the CEMS illustrated in FIG. 1.

Referring now to FIG. 26, the detailed operation of CEMS 31 will be described.

FIG. 26 is a flowchart illustrating the control process of CEMS 31 illustrated in FIG. 1. As illustrated in FIG. 26, upon start of the process, at step (hereinafter abbreviated as S) 01, CEMS 31 confirms whether an output request of measurement data has been received from DSO 21. If an output request has been received (YES at S01), at S02, CEMS 31 collects measurement data from a plurality of power conversion devices 41. At S03, CEMS 31 notifies DSO 21 of the measurement data stored in memory circuit 12, through communication circuit 11.

On the other hand, if an output request has not been received from DSO 21 (NO at S01) or if measurement data has been transmitted to DSO 21 at S03, CEMS 31 proceeds to S04 and confirms whether an operation plan (power supply plan) has been received from DSO 21. If an operation plan has been received (YES at S04), CEMS 31 proceeds to S05 and creates an operation plan (charge/discharge plan) of storage battery 40.

Figure 27:
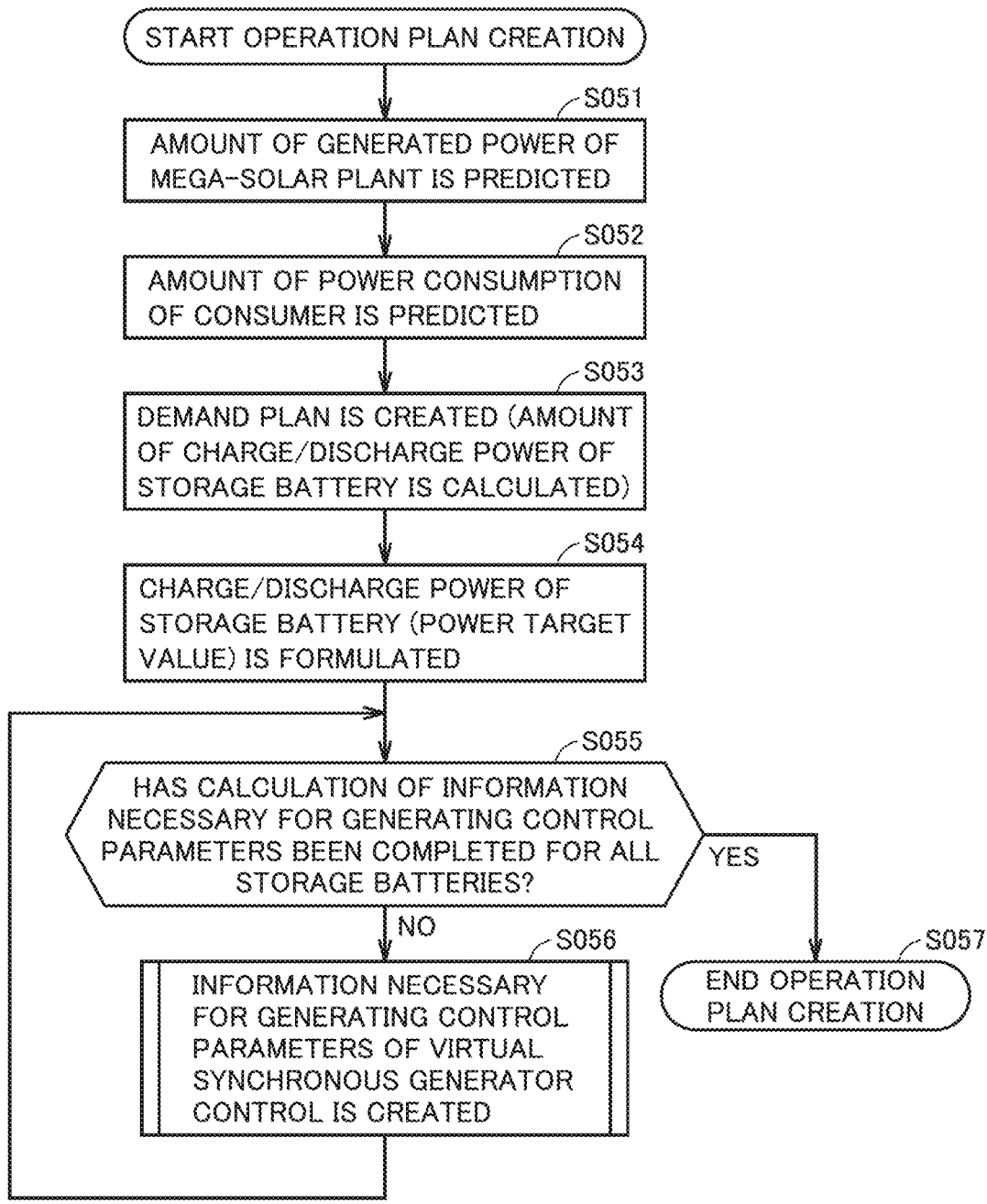
FIG. 27 is a flowchart illustrating a process of creating a storage battery operation plan (S05 in FIG. 26).

FIG. 27 is a flowchart illustrating a process of creating an operation plan of storage battery 40 (S05 in FIG. 27).

As illustrated in FIG. 27, upon start of the process, at S051, CEMS 31 predicts the amount of generated power of mega-solar plant 26. Specifically, returning to FIG. 3 and FIG. 4, upon receiving an operation plan from DSO 21, control circuit 16 (FIG. 3) instructs second management circuit 146 (FIG. 4) in operation plan creating circuit 14 to create an operation plan. Upon receiving the instruction from control circuit 16, second management circuit 146 instructs power generation predicting circuit 142 to predict the generated power of mega-solar plant 26, via storage battery operation plan creating circuit 141.

Upon receiving the instruction from second management circuit 146, power generation predicting circuit 142 accesses a weather forecast server on the Internet not shown to acquire a weather forecast for 24 hours from the present to 24 hours later. Power generation predicting circuit 142 predicts the amount of generated power for 24 hours from the present to 24 hours later, using the acquired weather forecast for 24 hours and data stored in a database (not shown) for the amount of generated power prediction managed by power generation predicting circuit 142. The database for the amount of generated power prediction is constructed based on the history of the amount of generated power of mega-solar plant 26 collected every 30 minutes, and weather history information. Description of the method of constructing the database is omitted.

Upon predicting the amount of generated power at S051, at S052, CEMS 31 predicts the power consumption of consumers. Specifically, returning to FIG. 4, upon receiving the prediction result of the amount of generated power of mega-solar plant 26 from power generation predicting circuit 142, second management circuit 146 instructs power consumption predicting circuit 143 to predict the power consumption of consumers, via storage battery operation plan creating circuit 141.

Upon receiving the instruction from second management circuit 146, power consumption predicting circuit 143 predicts the amount of power consumption of consumers for 24 hours from the present to 24 hours later, using data stored in a database for power consumption prediction (not shown) managed by power consumption predicting circuit 143. The database for power consumption prediction is constructed by processing the power consumption of consumers collected every 30 minutes, based on date, time information, and weather information. Description of the method of constructing the database is omitted.

Upon predicting the amount of power consumption of consumers at S052, at S053, CEMS 31 creates a demand plan. Specifically, returning to FIG. 4, upon receiving the prediction result of the amount of power consumption of consumers from power consumption predicting circuit 143, storage battery operation plan creating circuit 141 calculates the total of the amount of charge/discharge power for every 30 minutes of storage batteries 40a to 40c, based on the prediction result of the amount of generated power of mega-solar plant 26 by power generation predicting circuit 142, the prediction result of the amount of power consumption of consumers by power consumption predicting circuit 143, and the operation plan (power supply plan for every 30 minutes) given from DSO 21.

Upon creating a demand plan at S053, at S054, CEMS 31 formulates the charge/discharge power (power target value) of storage batteries 40a to 40c. Specifically, returning to FIG. 3 and FIG. 4, storage battery operation plan creating circuit 141 allocates the charge/discharge power for every 30 minutes of each storage battery 40, based on the SOC information and the storage battery capacity of storage batteries 40a to 40c collected in memory circuit 12 through communication circuit 11.

In the first embodiment, in creating an operation plan of storage battery 40 for 24 hours, CEMS 31 formulates the charge/discharge power of each storage battery 40 such that the SOC of storage batteries 40a to 40c becomes zero simultaneously or storage batteries 40a to 40c become a fully charged state substantially simultaneously when they are in the charge mode.

The reason for this is as follows. For example, a case where clouds move across above mega-solar plant 26 and the generated power of mega-solar plant 26 decreases from 10 MW to 4 MW for about 5 minutes will be discussed. It is assumed that the capacities of the static inverters of power conversion devices 41a to 41c are 8 MW, 4 MW, and 2 MW, respectively.

Here, it is assumed that power conversion devices 41b and 41c are notified of the operation plan of the storage battery such that the SOC of storage battery 40a first becomes zero and stops discharging and then the remaining storage batteries 40b and 40c discharge 1 MW and 0.5 MW, respectively. When the generated power of mega-solar plant 26 decreases by 6 MW due to sudden change in solar radiation, the virtual synchronous generator control allows for additional outputs of merely 3 MW and 1.5 MW as the discharge powers of storage batteries 40b and 40c, respectively, and therefore a deficit of 6 MW is unable to be compensated for.

On the other hand, when storage batteries 40a to 40c are operating, discharge up to 14 MW (=8 MW+4 MW+2 MW) is possible and the power range that the virtual synchronous generator control can compensate for is extended. Thus, when an operation plan (charge/discharge plan) of storage battery 40 is created in CEMS 31, it is necessary to create an operation plan such that the SOC of storage batteries 40a to 40c becomes zero or becomes full substantially simultaneously.

If the charge/discharge power (power target value) of storage batteries 40a to 40c is formulated at S054, at S055, CEMS 31 confirms whether information necessary for generating control parameters of virtual generator control has been created for all of storage batteries 40a to 40c. If generation of information has not been finished for all of storage batteries 40a to 40c (NO at S055), CEMS 31 proceeds to S056 and generates information necessary for generating control parameters of virtual generator control.

Figure 28:
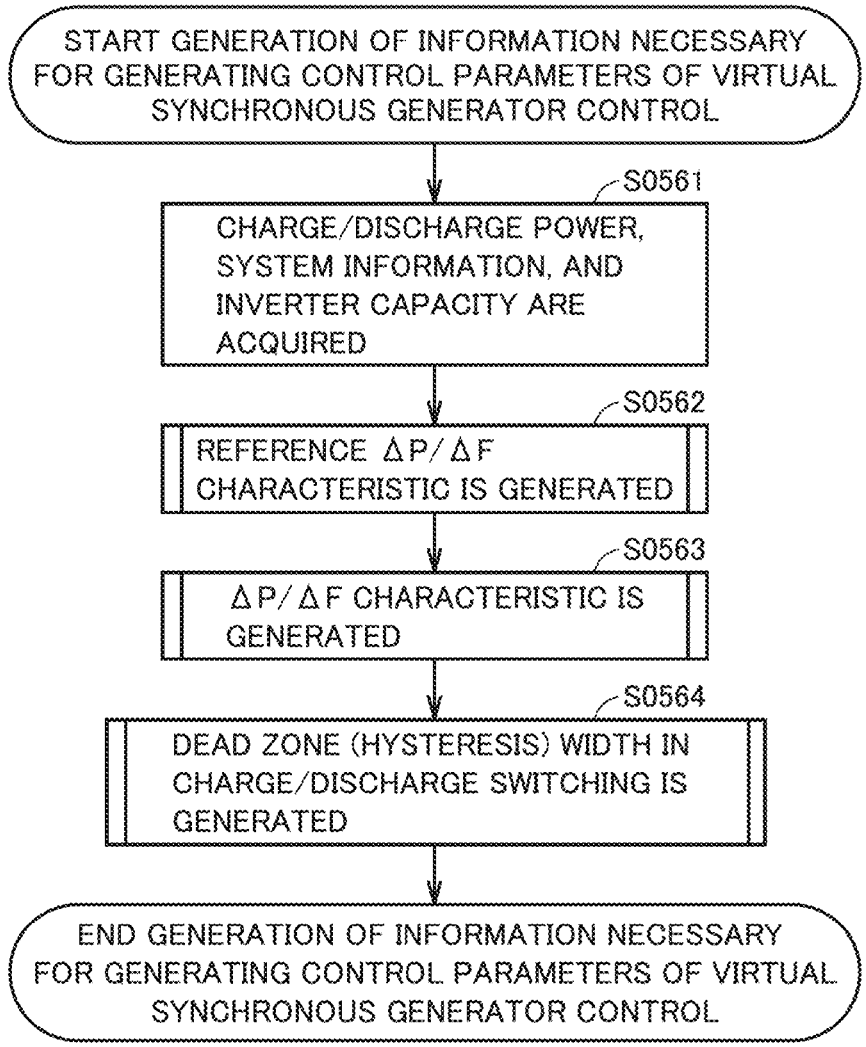
FIG. 28 is a flowchart illustrating a process of generating information necessary for generating control parameters of virtual synchronous generator control (S056 in FIG. 27).

FIG. 28 is a flowchart illustrating a process of generating information necessary for generating control parameters of virtual synchronous generator control (S056 in FIG. 27). The process illustrated in FIG. 28 is executed by control parameter generating circuit 13 (FIG. 5) in CEMS 31.

As illustrated in FIG. 28, upon start of the process, at S0561, control circuit 136 (FIG. 5) collects the power target value of storage battery 40 for the next 30 minutes generated by storage battery operation plan creating circuit 141 at S054 in FIG. 27, the capacity of second DC/AC converter 408 (static inverter) in power conversion device 41, and information on distribution system 24. The information on distribution system 24 includes the upper limit and the lower limit of the system frequency, and response performance of virtual synchronous generator control circuit 83 (FIG. 11). The upper limit of the system frequency is reference frequency Fref (for example, 60 Hz)+ΔFmax, and the lower limit of the system frequency is Fref-ΔFmax.

Upon completion of information collection at S0561, at S0562, reference ΔP/ΔF characteristic calculating circuit 131 calculates the reference ΔP/ΔF characteristic for each power conversion device 41. The reference ΔP/ΔF characteristic will be described below.

When control parameters of power conversion device 41 equipped with virtual synchronous generator control are generated, the reference ΔP/ΔF characteristic of the static inverter is first calculated. In the first embodiment, a configuration for generating control parameters for power conversion device 41 is described. However, the control parameters can be generated using the same method for a power conversion device capable of adjusting its output, such as a wind generator, equipped with virtual synchronous generator control.

Specifically, as illustrated in FIG. 24A to FIG. 24C, at the time of discharge of storage battery 40, reference ΔP/ΔF characteristic calculating circuit 131 (FIG. 5) sets the power target value to half the capacity of the static inverter and determines the reference ΔP/ΔF characteristic such that the system frequency when the static inverter discharges the maximum power is equal to the lower limit frequency (in FIG. 24A, differential frequency ΔF=-ΔFmax) and that the system frequency when the discharge power of the static inverter is zero is equal to the upper limit frequency (in FIG. 24A, ΔF=ΔFmax). The power target value is positive in discharging and negative in charging.

Similarly, at the time of charge of storage battery 40, the power target value is set to half the capacity of the static inverter, and the reference ΔP/ΔF characteristic is determined such that the system frequency when the static inverter charges the maximum power is the upper limit frequency (in FIG. 24B, ΔF=ΔFmax) and the system frequency when the charge power of the static inverter is zero is equal to the lower limit frequency (in FIG. 24B, ΔF=-ΔFmax). In the following, the case where discharge is handled is denoted as discharge mode, and the case where charge is handled is denoted as charge mode.

At the time of charge/discharge of storage battery 40 (hereinafter referred to as charge/discharge mode), the power target value of the static inverter is set to zero, and the reference ΔP/ΔF characteristic is determined such that the system frequency when the static inverter discharges the maximum power is equal to the lower limit frequency (in FIG. 24C, ΔF=-ΔFmax) and the system frequency when the static inverter charges the maximum power is equal to the upper limit frequency (in FIG. 24C, ΔF=ΔFmax).

Figure 29:
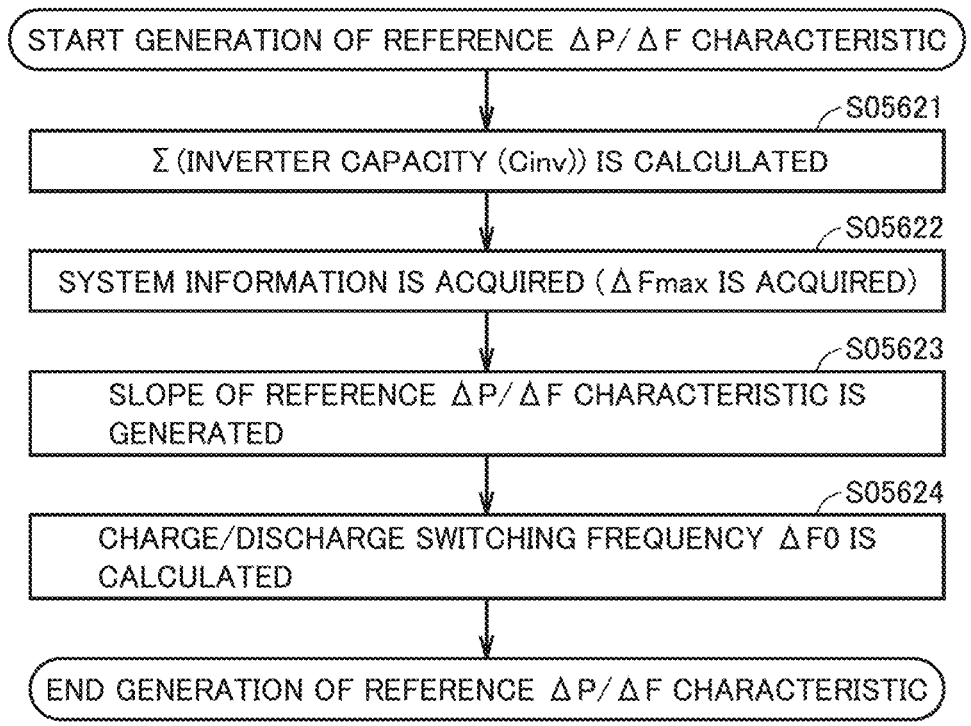
FIG. 29 is a flowchart illustrating a process of generating a reference ΔP/ΔF characteristic (S0562 in FIG. 28).

FIG. 29 is a flowchart illustrating a process of generating a reference ΔP/ΔF characteristic (S0562 in FIG. 28).

As illustrated in FIG. 29, upon start of the process, at S05621, reference ΔP/ΔF characteristic calculating circuit 131 (FIG. 5) collects, from control circuit 136, capacity information (Cinv) of a plurality of static inverters for which a power target value is to be generated, and calculates the sum (=Σ(Cinv)) of the collected capacities Cinv of a plurality of static inverters.

Upon calculating the sum (Σ(Cinv)) of capacities of the static inverters, at S05622, reference ΔP/ΔF characteristic calculating circuit 131 collects system information (ΔFmax). Then, at S05623, reference ΔP/ΔF characteristic calculating circuit 131 obtains the slope of the reference ΔP/ΔF characteristic, using Σ(Cinv) and ΔFmax.

Specifically, when storage battery 40 is in the charge mode or the discharge mode, reference ΔP/ΔF characteristic calculating circuit 131 sets the slope of the reference ΔP/ΔF characteristic to -ΔFmax/(Σ(Cinv)×0.5). On the other hand, when storage battery 40 is in the charge/discharge mode, the slope of the reference ΔP/ΔF characteristic is set to -ΔFmax/Σ(Cinv).

Then, at S0564, reference ΔP/ΔF characteristic calculating circuit 131 generates a dead zone width at the time of switching of charge/discharge. Specifically, reference ΔP/ΔF characteristic calculating circuit 131 calculates the total of power target values of a plurality of power conversion devices 41 output from operation plan creating circuit 14, and calculates the frequency (switching frequency) ΔF0 at which charge/discharge is switched, using the calculated total of power target values and the reference ΔP/ΔF characteristic.

Which of the reference ΔP/ΔF characteristic in the discharge mode (or charge mode) and that in the charge/discharge mode is employed is determined by storage battery operation plan creating circuit 141 (FIG. 4), based on the formulation result of charge/discharge power of storage battery 40 in the demand plan created at S053 in FIG. 27. Specifically, when the absolute value of the formulated charge/discharge power is less than a predetermined value, the charge/discharge mode is employed. On the other hand, when the charge/discharge power is equal to or greater than a predetermined value, the discharge mode is employed, and when the charge/discharge power is a negative value and the absolute value thereof is equal to or greater than a predetermined value, the charge mode is employed. The employed mode is applied to all the power conversion devices 41 connected to distribution system 24.

Figure 30:
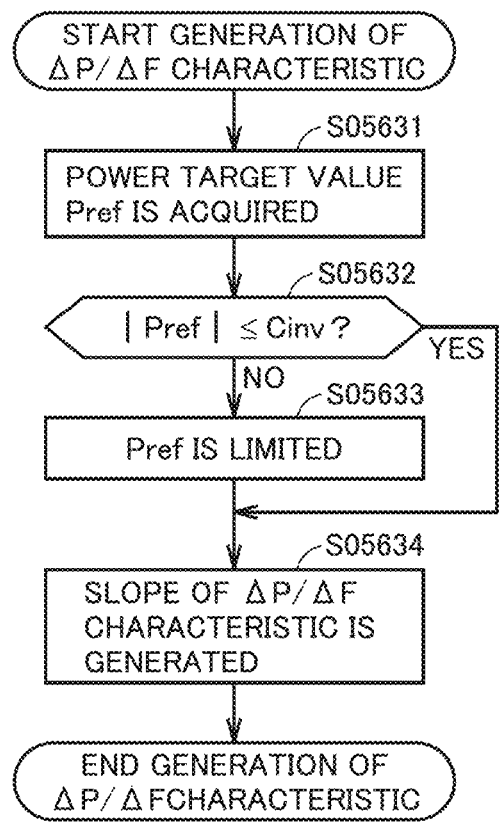
FIG. 30 is a flowchart illustrating a process of generating a ΔP/ΔF characteristic (S0563 in FIG. 28).

Returning to FIG. 28, upon calculation of the reference ΔP/ΔF characteristic at S0562, at S0563, ΔP/ΔF characteristic calculating circuit 132 (FIG. 5) generates a ΔP/ΔF characteristic. Specifically, reference ΔP/ΔF characteristic calculating circuit 131 outputs the generated slope of the reference ΔP/ΔF characteristic and the switching frequency ΔF0 to control circuit 136 and ΔP/ΔF characteristic calculating circuit 132. ΔP/ΔF characteristic calculating circuit 132 calculates the ΔP/ΔF characteristic, based on the power target value applied from control circuit 136. FIG. 30 is a flowchart illustrating a process of generating a ΔP/ΔF characteristic (S0563 in FIG. 28). As illustrated in FIG. 30, upon start of the process, at S05631, ΔP/ΔF characteristic calculating circuit 132 collects power target value Pref from control circuit 136. At S05632, ΔP/ΔF characteristic calculating circuit 132 determines whether the magnitude of the collected power target value Pref does not exceed static inverter capacity Cinv.

For power conversion device 41 in which the magnitude of power target value Pref exceeds static inverter capacity Cinv (NO at S05632), at S05633, ΔP/ΔF characteristic calculating circuit 132 allows a limiter to limit power target value Pref to static inverter capacity Cinv.

At S05634, ΔP/ΔF characteristic calculating circuit 132 obtains the slope of the ΔP/ΔF characteristic using power target value Pref. Specifically, when storage battery 40 is in the discharge mode or the charge mode, the slope of the ΔP/ΔF characteristic is set to -Pref/ΔF0. On the other hand, when storage battery 40 is in the charge/discharge mode, assuming that fluctuations in generated power of renewable energy such as mega-solar plant 26 or wind power generation are absorbed (the power target value is zero), the $\Delta P/\Delta F$ characteristic that depends only on the static inverter capacity, that is, the reference $\Delta P/\Delta F$ characteristic obtained at S0562 in FIG. 28 is used as it is. In the first embodiment, a case where the slope of the $\Delta P/\Delta F$ characteristic, switching frequency $\Delta F0$, system information ($\pm \Delta F\text{max}$, etc.), and power target value Pref are used as information necessary for generating control parameters of virtual synchronous generator control will be described.

Figure 31:
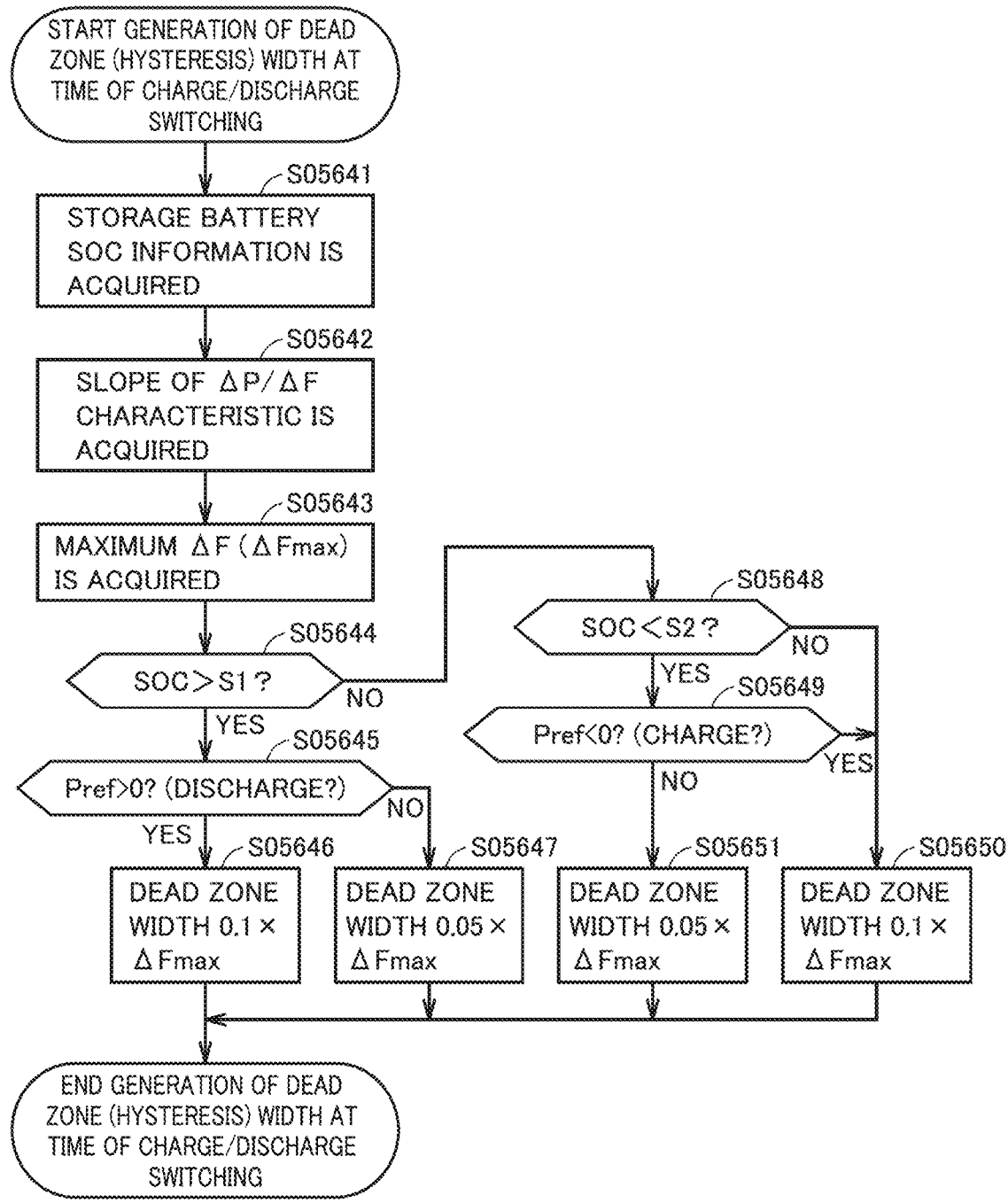
FIG. 31 is a flowchart illustrating a process of generating a dead zone width (S0564 in FIG. 28).

Upon generating the $\Delta P/\Delta F$ characteristic, at S0564 in FIG. 28, control parameter generating circuit 13 generates a dead zone width at the time of charge/discharge switching. FIG. 31 is a flowchart illustrating a process of generating a dead zone width (S0564 in FIG. 28). As illustrated in FIG. 31, control parameter generating circuit 13 acquires SOC information of storage battery 40 at S05641, acquires the slope of the $\Delta P/\Delta F$ characteristic at S05642, and then calculates the maximum value ($\Delta F\text{max}$) of differential frequency $\Delta F$ at S05643. In the discharge mode, $\Delta P\text{max}$ corresponds to the $\Delta P$ value corresponding to $-\Delta F\text{max}$ in the $\Delta P/\Delta F$ characteristic, and in the charge mode, $\Delta P\text{max}$ corresponds to the $\Delta P$ value corresponding to $\Delta F\text{max}$.

Upon acquiring $\Delta F\text{max}$ at S05643, at S05644, control parameter generating circuit 13 confirms whether the collected SOC of storage battery 40 exceeds a predetermined upper limit S1. In the first embodiment, it is assumed that a lithium-ion battery is used as storage battery 40. In a lithium-ion battery, overcharge or overdischarge accelerates the progress of deterioration, leading to a breakdown. In the first embodiment, therefore, an upper limit S1 and a lower limit S2 are set for the SOC of storage battery 40. For example, S1 is set to 80%, and S2 is set to 10%. In the charge mode, when the SOC exceeds S1 (80%), the dead zone width is narrowed compared with other storage batteries 40 in order to reduce the charge power, thereby enabling a quick transition to the discharge mode. On the other hand, in the discharge mode, when the SOC is less than S2 (10%), the dead zone width is narrowed compared with other storage batteries 40 in order to reduce the discharge power, thereby enabling a quick transition to the charge mode.

If SOC>S1 (YES at S05644), control parameter generating circuit 13 proceeds to S05645 and confirms whether the power target value is greater than 0, that is, whether the mode is the discharge mode. If the power target value is greater than 0, that is, if the mode is the discharge mode (YES at S05645), at S05646, control parameter generating circuit 13 sets the dead zone width to $\Delta F\text{max} \times 0.1$. On the other hand, if the power target value is equal to or less than 0, that is, if the mode is the charge mode (NO at S05645), at S05647, control parameter generating circuit 13 sets the dead zone width to $\Delta F\text{max} \times 0.05$.

If SOC≤S1 (NO at S05644), at S05648, control parameter generating circuit 13 confirms whether the SOC is less than lower limit S2 (10%). If SOC<S2 (YES at S05648), control parameter generating circuit 13 proceeds to S05649 and confirms whether the power target value is less than 0, that is, whether the mode is the charge mode. If the power target value is less than 0, that is, if the mode is the charge mode (YES at S05649), at S05650, control parameter generating circuit 13 sets the dead zone width to $\Delta F\text{max} \times 0.1$. On the other hand, if the power target value is equal to or greater than 0, that is, if the mode is the discharge mode (NO at S05649), at S05651, control parameter generating circuit 13 sets the dead zone width to $\Delta F\text{max} \times 0.05$.

In a simplified manner, the dead zone width may be set to approximately 5% of $\Delta F\text{max}$, regardless of the SOC. The dead zone width may be changed in accordance with the SOC of each storage battery 40 or the inverter capacity of the corresponding power conversion device 41, as a matter of course.

Returning to FIG. 27, upon finishing generation of a dead zone width at the time of charge/discharge switching (S0564) as information necessary for generating control parameters of virtual synchronous generator control, control parameter generating circuit 13 returns to S055 and confirms whether the calculation of information necessary for generating control parameters has been completed for all of power conversion devices 41 corresponding to all storage batteries 40 connected to distribution system 24. If calculation of the information has not been completed for all of the power conversion devices 41 (NO at S055), information necessary for generating control parameters for the next power conversion device 41 is calculated. If calculation of the information has been completed for all of the power conversion devices 41 (YES at S055), control parameter generating circuit 13 terminates the process of creating an operation plan of storage battery 40 (S05 in FIG. 26).

The process of generating the slope of the reference $\Delta P/\Delta F$ characteristic and switching frequency $\Delta F0$ illustrated FIG. 29 may be executed for the initial power conversion device 41 when the control parameters of each power conversion device 41 are changed, and the other power conversion devices 41 may use the calculation result as it is until generation of the slope and the like is completed for the last power conversion device 41.

At S05 in FIG. 26, upon finishing the process of creating an operation plan of storage battery 40, storage battery operation plan creating circuit 141 (FIG. 4) notifies first management circuit 145 (FIG. 4) of the created operation plan (power target value), via second management circuit 146. Upon receiving the operation plan, first management circuit 145 stores the received operation plan into a memory and notifies transmission data generating circuit 15 (FIG. 3). Control parameter generating circuit 13 notifies transmission data generating circuit 15 of the information necessary for generating control parameters of virtual synchronous generator control.

Upon acquiring the operation plan (power target value) and the information necessary for generating control parameters (including dead zone width information), transmission data generating circuit 15 processes them into a transmission format and outputs the processed data to communication circuit 11 (FIG. 3). Upon receiving the transmitted data from transmission data generating circuit 15, communication circuit 11 transmits the transmitted data to the corresponding power conversion device 41 through communication line 25.

Upon completion of transmission of the operation plan and information necessary for generating control parameters to all of power conversion devices 41 at S10 in FIG. 26, at S11, it is confirmed whether to stop CEMS 31. If CEMS 31 is to be stopped (YES at S11), the process ends. On the other hand, if CEMS 31 is not to be stopped (NO at S11), the process returns to S01.

On the other hand, if an operation plan (power supply plan) is not received from DSO 21 at S04 in FIG. 26 (NO at S04), CEMS 31 proceeds to S06 and confirms whether the time to collect various measurement data has come. In the first embodiment, CEMS 31 collects measurement data every 5 minutes as described above. If the time to collect measurement data has not yet come (NO at S06), the process returns to S01. On the other hand, if the time to collect measurement data has come (YES at S06), at S07, CEMS 31 collects measurement data. In the first embodiment, CEMS 31 collects the amount of charge/discharge power of storage battery 40 for 5 minutes, the charge/discharge power at present, and the SOC information, as measurement data, from each of power conversion devices 41a to 41c.

Upon collecting measurement data at S07, at S08, CEMS 31 confirms whether the operation plan of storage battery 40 needs to be revised. At S07, CEMS 31 compares the charge/discharge power at present with the operation plan (power target value), for each of a plurality of storage batteries 40. Specifically, CEMS 31 confirms whether the power difference between the charge/discharge power at present and the power target value exceeds a prescribed range and whether the SOC of storage battery 40 exceeds a predetermined permissible range (for example, 5% to 90%). If the power difference exceeds a prescribed range in any one storage battery 40 among a plurality of storage batteries 40 and/or if the SOC exceeds a permissible range, CEMS 31 reviews the operation plans of all of storage batteries 40. The operation plan of storage battery 40 in which the power difference exceeds a prescribed range and/or the SOC exceeds a permissible range may be reviewed.

CEMS 31 confirms whether the operation plan of storage battery 40 needs to be revised in this manner, and, if it is determined that the operation plan of storage battery 40 does not need to be revised (NO at S08), returns to S01 to continue the process. On the other hand, if it is determined that the operation plan of storage battery 40 needs to be revised (YES at S08), CEMS 31 proceeds to S09 and revises the operation plans of all of storage batteries 40.

Figure 32:
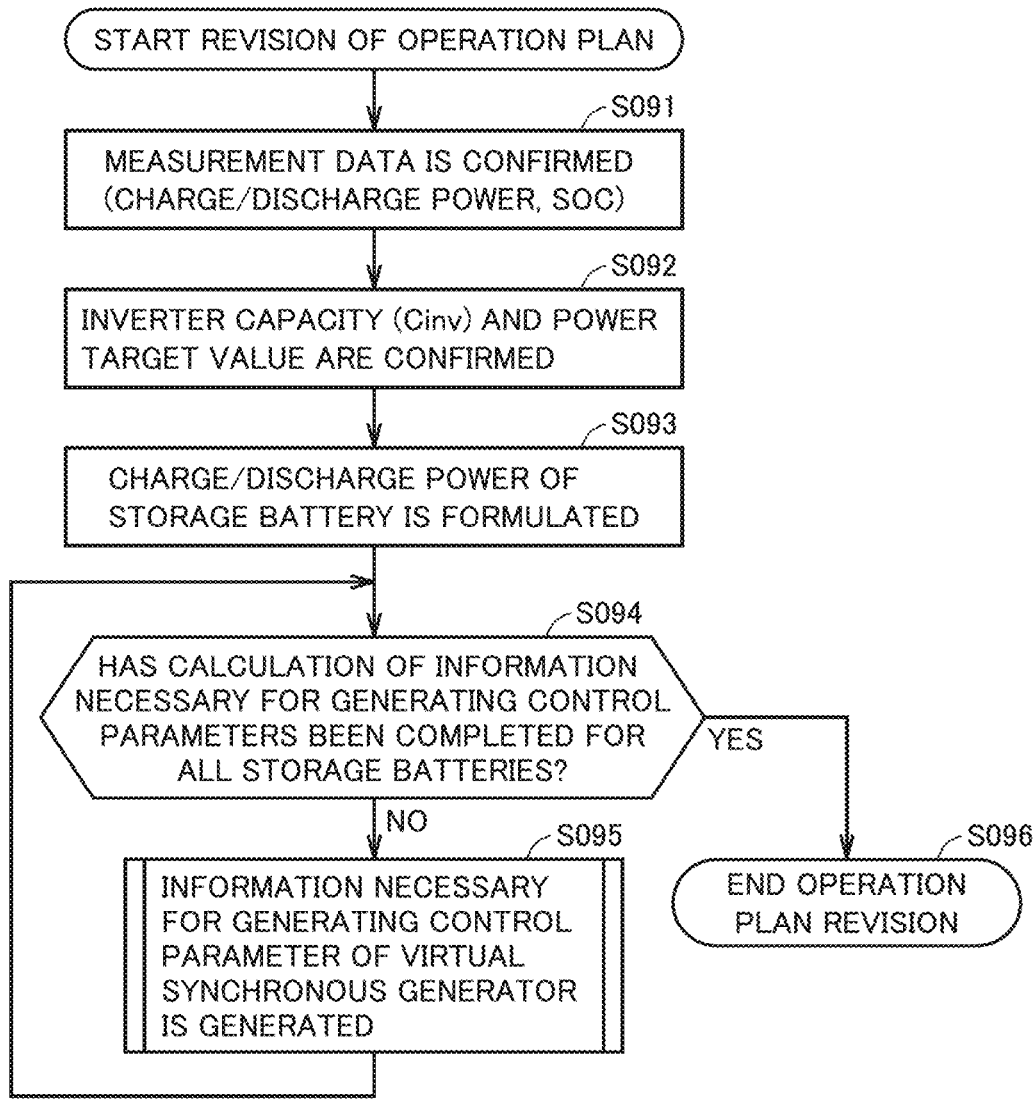
FIG. 32 is a flowchart illustrating a process of revising a storage battery operation plan (S09 in FIG. 26).

FIG. 32 is a flowchart illustrating a process of revising the operation plan of storage battery 40 (S09 in FIG. 26). The process illustrated in FIG. 32 is executed by operation plan creating circuit 14 (FIG. 3) in CEMS 31.

As illustrated in FIG. 32, upon start of the process, at S091, second management circuit 146 (FIG. 4) instructs storage battery operation plan correcting circuit 144 (FIG. 4) to revise the operation plan and transfers the charge/discharge power and the SOC information collected from each power conversion device 41.

At S092, second management circuit 146 also outputs the operation plan of storage battery 40 (power target value) stored in first management circuit 145 (FIG. 4) and the capacity of the static inverter of power conversion device 41 stored in memory circuit 12 to storage battery operation plan correcting circuit 144.

Storage battery operation plan correcting circuit 144 reviews the operation plan of storage battery 40, based on information applied from second management circuit 146. For example, a case where the discharge power of power conversion device 41 is twice the power target value because one of the predicted value of the amount of generated power of mega-solar plant 26 and the predicted value of the amount of power consumption of each consumer falls outside the actual value will be discussed.

In such a case, it is assumed that the system frequency decreases to the vicinity of the lower limit (Fref−ΔFmax). If power deficiency further increases, the system frequency may reach the lower limit and power may not be supplied anymore from power conversion device 41.

Then, in the first embodiment, when the ratio between the power target value and the charge/discharge power does not fall within a prescribed range, storage battery operation plan correcting circuit 144 revises the operation plan (power target value) of storage battery 40, based on the measurement data collected every 5 minutes. Specifically, storage battery operation plan correcting circuit 144 revises the operation plan of storage battery 40 based on the charge/discharge power and the SOC information at present.

Here, the reason why the SOC is used in revising the operation plan of storage battery 40 is as follows. When a lithium-ion battery is used as storage battery 40, storage battery 40 may be broken or suddenly deteriorate due to overcharge or overdischarge. In normal control of a storage battery, therefore, when the SOC exceeds 90%, for example, the charge mode of the storage battery is switched from a constant current charge mode to a constant voltage charge mode. In the constant voltage charge mode, since a large charge power is unable to be set, it is necessary to reduce the power target value in virtual synchronous generator control. Similarly, since deterioration of storage battery 40 also proceeds in the case of overdischarge, it is necessary to limit the discharge power, for example, at the point of time when the SOC becomes below 5%. Thus, the SOC is used in creating and revising the operation plan of storage battery 40.

When a lead-acid battery is used as storage battery 40, it is resistant to overcharge but may deteriorate due to overdischarge. In the case of a lead-acid battery, it is therefore necessary to limit the discharge power, for example, at the point of time when the SOC becomes below 20%. As described above, the power target value is revised using the SOC in order to suppress deterioration of the storage battery used.

At S093, in the same manner as S054 in FIG. 27, the charge/discharge power of each storage battery 40 is allocated, based on the charge/discharge power of each power conversion device 41 at present and the SOC information of storage battery 40. In creation of the operation plan (S05) described above, the power target value is used, but in revision of the operation plan (S09), the operation plan is revised using the measured charge/discharge power as a power target value. Although not described here, in the process at S095 described later (generation of information necessary for generating control parameters), a process similar to S056 in FIG. 27 is performed but the parameters used are different. At S056 in FIG. 27, the power target value generated in operation plan creating circuit 14 (FIG. 3) is used, whereas at S095 in FIG. 32, the measured charge/discharge power value is used instead of the power target value. Similar effects can be achieved by generating an operation plan (power target value) again in operation plan creating circuit 14, based on the data (measured values) collected every five minutes, and revising the operation plan using the generated operation plan.

Upon finishing the allocation of charge/discharge power of each storage battery 40 at S093, at S094, control parameter generating circuit 13 (FIG. 3) confirms whether calculation of information necessary for generating control parameters has been completed for all of storage batteries 40. If calculation of information necessary for generating control parameters has been completed for all of storage batteries 40 (YES at S094), storage battery operation plan correcting circuit 144 terminates the process of revising the operation plan of storage battery 40. On the other hand, if revision of the operation plan of storage battery 40 has not been completed for all of storage batteries 40 (NO at S094), at S095, control parameter generating circuit 13 generates information necessary for generating control parameters of virtual synchronous generator control. The method of generating information necessary for control parameters of virtual synchronous generator control is similar to the generation method used in the process of creating the operation plan of storage battery 40 (at S056 in FIG. 27), except for the difference in parameters used as described above, and will not be further elaborated.

Upon generating information necessary for generating control parameters at S095, returning to S094, control parameter generating circuit 13 conforms whether calculation of information necessary for generating control parameters has been completed for all of power conversion devices 41. If calculation of information necessary for generating control parameters has not been completed for all of power conversion devices 41 (NO at S094), at S095, control parameter generating circuit 13 generates information necessary for generating control parameters for the next power conversion device 41.

On the other hand, if calculation of information necessary for generating control parameters has been completed for all of power conversion devices 41 (YES at S094), at S096, storage battery operation plan correcting circuit 144 terminates the process of revising the operation plan of storage battery 40.

Returning to FIG. 26, upon revising the operation plan of storage battery 40 at S09, storage battery operation plan creating circuit 141 notifies first management circuit 145 of the revised operation plan (power target value) via second management circuit 146, in the same manner as when the operation plan is created.

Upon acquiring the operation plan of storage battery 40 from storage battery operation plan creating circuit 141, first management circuit 145 stores the acquired operation plan into a not-shown memory and notifies transmission data generating circuit 15. Similarly, control parameter generating circuit 13 notifies transmission data generating circuit 15 of the operation plan (power target value) of storage battery 40 and the information necessary for generating control parameters (including dead zone width information).

Upon receiving the operation plan of storage battery 40 and the information necessary for generating control parameters, transmission data generating circuit 15 processes them into a transmission format and outputs the processed data to communication circuit 11.

Upon receiving the transmitted data from transmission data generating circuit 15, communication circuit 11 transmits the transmitted data to the corresponding power conversion device 41 through communication line 25 (at S10 in FIG. 26).

Upon completion of transmission of the operation plan of storage battery 40 to all of power conversion devices 41 at S10 in FIG. 26, at S11, it is confirmed whether to stop CEMS 31. If CEMS 31 is to be stopped (YES at S11), the process ends. On the other hand, if CEMS 31 is not to be stopped, the process returns to S01 and continues.

As explained above, in the first embodiment, when the operation plan (power target value) of storage battery 40 is created for a plurality of power conversion devices 41, information necessary for control parameters of virtual synchronous generator control implemented in the static inverter is generated based on the battery capacity and SOC of storage battery 40, the capacity of the static inverter of each power conversion device 41, and the power target value. In the above configuration, switching frequency ΔF0 at which charge/discharge of each storage battery 40 is switched is calculated, using information on storage battery 40 and power conversion device 41, and the slope of the ΔP/ΔF characteristic is generated based on the calculated switching frequency ΔF0. Then, a dead zone width to be applied to the ΔP/ΔF characteristic of each power conversion device 41 is calculated based on the SOC of each storage battery 40 and the power target value.

With such a configuration, when a plurality of power conversion devices 41 are connected to distribution system 24, a dead zone can be imparted to switching frequency ΔF0 in the drooping characteristic (ΔP/ΔF characteristic) applied to each power conversion device 41 by virtual synchronous generator control. This can prevent charging of storage battery 40*a* with discharge power from storage battery 40*b* as illustrated in FIG. 22(B), due to sensor errors of voltmeters and ammeters, although the generated power of mega-solar plant 26 and the power consumption of loads balance. Thus, unnecessary exchange of power between storage batteries 40*a* and 40*b* can be suppressed, so that the power loss due to charge/discharge and the progress of deterioration of storage battery 40 can be suppressed.

In the first embodiment, when information necessary for generating control parameters for virtual synchronous generator control is generated for the static inverter in power conversion device 41, the capacity of the static inverter and the power target value are used. However, embodiments are not limited to this configuration. When the ratio between the static inverter capacity and the battery capacity varies among a plurality of storage batteries 40, for example, when the battery capacity of storage battery 40*a* is twice as large as the static inverter capacity of power conversion device 41*a* and the battery capacity of storage battery 40*b* is three times as large as the static inverter capacity of power conversion device 41*b*, the operation plan (power target value) may be generated in consideration of the capacity ratio. Alternatively, similar effects can be achieved by considering the capacity ratio when control parameters of virtual synchronous generator control are generated.

(Operation of Power Conversion Device 27 and Power Conversion Device 41)

Referring now to FIG. 6 to FIG. 37, the operation of power conversion device 27 for a mega-solar plant and power conversion device 41 for a storage battery will be described.

[Operation of Power Conversion Device 27]

Referring to FIG. 6, the operation of power conversion device 27 for a mega-solar plant will be described.

When mega-solar plant 26 starts power generation, the DC voltage input from mega-solar plant 26 to first DC/DC converter 203 in power conversion device 27 increases. First control circuit 204 monitors the DC voltage measured by voltmeter 201. When the DC voltage exceeds a prescribed voltage value, first control circuit 204 allows power conversion device 27 to make a transition from a standby state to normal operation. Upon transition to normal operation, second control circuit 209 in power conversion device 27 controls first DC/AC converter 208. The control of power conversion device 27 in normal operation will be described below.

As illustrated in FIG. 6, first control circuit 204 confirms whether mega-solar plant 26 is generating power. Specifically, first control circuit 204 confirms whether the output voltage of mega-solar plant 26 measured by voltmeter 201 exceeds a prescribed voltage. When the output voltage exceeds a prescribed voltage, first control circuit 204 notifies second control circuit 209 that mega-solar plant 26 can generate power.

Upon receiving the notification from first control circuit 204, second control circuit 209 confirms whether power is supplied from substation 20 to distribution system 24

(whether distribution system 24 is not blacked out), based on the AC voltage of distribution system 24 measured by voltmeter 210.

If it is confirmed that the AC voltage measured by voltmeter 210 is equal to or higher than a prescribed voltage and that distribution system 24 is not blacked out, second control circuit 209 starts first DC/AC converter 208 and instructs first control circuit 204 to start power generation of mega-solar plant 26.

In the first embodiment, a case where the DC bus voltage of DC bus 205 is managed by first DC/AC converter 208 in normal operation will be described. In the first embodiment, the entire distributed power source management device is operated by managing the power supplied from power conversion device 27 to distribution system 24 by current control by first DC/AC converter 208.

Upon an instruction to start power generation of mega-solar plant 26 by second control circuit 209, fifth control circuit 54 (FIG. 8) in first control circuit 204 instructs MPPT control circuit 51 (FIG. 8) to start maximum power point tracking control of mega-solar plant 26.

The maximum power point tracking control will be described briefly. In the maximum power point tracking control, whether the last command value is increased or decreased from the power command value before last is managed. Then, the generated power of mega-solar plant 26 measured this time is compared with the generated power of mega-solar plant 26 measured last time, and if the power generation increases, the command value is changed in the same direction as the last time (increasing direction or decreasing direction).

Specifically, if the generated power of mega-solar plant 26 measured this time increases from the power generation measured last time, and when the last command value is greater than the command value before last, the command value this time is increased. On the other hand, when the last command value is smaller than the command value before last, the command value this time is decreased. Conversely, if the generated power of mega-solar plant 26 measured this time decreases from the power generation measured last time, and when the last command value is greater than the command value before last, the command value this time is decreased. On the other hand, when the last command value is smaller than the command value before last, the command value this time is increased. The command value this time is controlled in this manner, whereby mega-solar plant 26 is controlled such that the output power is maximized.

First DC/DC converter 203 allows a step-up circuit contained therein to operate in accordance with a command value output from first control circuit 204 to convert a first DC voltage output from mega-solar plant 26 into a second DC voltage (DC bus voltage of DC bus 205) and output the second DC voltage.

Upon start of supply of generated power of mega-solar plant 26 from first DC/DC converter 203, second control circuit 209 controls first DC/AC converter 208 to output (regenerate) the generated power of mega-solar plant 26 to distribution system 24. Specifically, the DC bus voltage of DC bus 205 is monitored, and when the DC bus voltage exceeds a control target value, the generated power is output in synchronization with the AC voltage supplied from distribution system 24.

Referring now to FIG. 9, the operation of second control circuit 209 will be described.

In second control circuit 209, phase detecting circuit 61 detects a zero cross point in the waveform of AC voltage of distribution system 24 measured by voltmeter 210 (FIG. 1).

First sine wave generating circuit 62 generates a reference sine wave synchronized with the waveform of AC voltage of distribution system 24, based on information indicating the zero cross point detected by phase detecting circuit 61 and the waveform of AC voltage measured by voltmeter 210. First sine wave generating circuit 62 outputs the generated reference sine wave to multiplier 65.

Voltmeter 206 measures the voltage on DC bus 205 and outputs the measurement value to subtractor 63 in current control circuit 60 and sixth control circuit 67. Current control circuit 60 uses a control method (current control) that outputs a power in synchronization with the AC system voltage. This control method is a common control method for power conversion devices for photovoltaic power generation installed in households.

Sixth control circuit 67 stores a target voltage of DC bus 205 and outputs the target voltage to subtractor 63.

Current control circuit 60 controls current output by first DC/AC converter 208 such that the DC bus voltage measured by voltmeter 206 attains a target voltage. The output of subtractor 63 is input to first PI control circuit 64. First PI control circuit 64 performs PI control such that the output of subtractor 63 becomes zero. The output of first PI control circuit 64 is input to multiplier 65 and multiplied by the reference sine wave from first sine wave generating circuit 62 to be converted into a current command value.

The current command value output from multiplier 65 is input to subtractor 66. Subtractor 66 calculates the deviation between the current command value and the AC current value of distribution system 24 measured by ammeter 211 and inputs the calculated deviation to second PI control circuit 68.

Second PI control circuit 68 performs PI control such that the deviation output from subtractor 66 becomes zero. First PWM converter 69 generates a command value of first DC/AC converter 208 by executing PWM control on the output of second PI control circuit 68. First DC/AC converter 208 outputs an AC current in accordance with the command value applied from first PWM converter 69.

When the AC voltage (AC effective voltage) measured by voltmeter 210 exceeds a prescribed voltage value or when a request to suppress the generated power of mega-solar plant 26 is given from CEMS 31, fifth control circuit 54 (FIG. 8) in first control circuit 204 switches the control of mega-solar plant 26 from MPPT control to voltage control. Specifically, fifth control circuit 54 controls the DC voltage output from mega-solar plant 26 such that the AC voltage (AC effective voltage) measured by voltmeter 210 falls within a prescribed voltage range. Alternatively, fifth control circuit 54 controls the output voltage of mega-solar plant 26 such that the generated power of mega-solar plant 26 falls within a power range given from CEMS 31.

First switching circuit 53 (FIG. 8) switches the output of MPPT control circuit 51 and the output of voltage control circuit 52, in accordance with a switch control signal applied from fifth control circuit 54.

Sixth control circuit 67 collects the measurement results concerning DC bus 205 measured by voltmeter 206 and ammeter 207, the measurement results concerning distribution system 24 measured by voltmeter 210 and ammeter 211, and status information of first DC/DC converter 203 output from first control circuit 204 and notifies CEMS 31 and the like of the collected information through communication I/F 212.

Further, sixth control circuit 67 notifies CEMS 31 of the effective voltage of distribution system 24 measured by a not-shown effective voltage measuring unit or information on active power and reactive power of the AC system measured by a not-shown active/reactive power measuring unit, through communication I/F 212, and also notifies fifth control circuit 54 of the measurement results such as effective voltage, active power, and the like of the AC system.

When the effective value of AC system voltage exceeds a prescribed value, fifth control circuit 54 switches the control of mega-solar plant 26 from MPPT control to voltage control as described above, thereby suppressing increase of the AC system voltage.

[Operation of Power Conversion Device 41]

Referring now to FIG. 7 to FIG. 37, the operation of power conversion device 41 for a storage battery will be described.

In the first embodiment, since power conversion device 41 is equipped with virtual synchronous generator control, second DC/AC converter 408 operates as a voltage source by executing voltage control. That is, third control circuit 404 controls second DC/DC converter 403 such that the voltage on DC bus 405 has a constant value. Referring to FIG. 10, the operation of third control circuit 404 will be described below.

The voltage on DC bus 405 is measured by voltmeter 406. The measurement result of voltmeter 406 is input to charge control circuit 71, discharge control circuit 72, and seventh control circuit 74.

Charge control circuit 71 controls the charge power of storage battery 40 such that the voltage on DC bus 405 attains a target voltage when the voltage on DC bus 405 is greater than the target voltage output from seventh control circuit 74. On the other hand, when the voltage on DC bus 405 is smaller than the target voltage, discharge control circuit 72 increases the discharge power of storage battery 40.

The switching between the output of charge control circuit 71 and the output of discharge control circuit 72 is performed by second switching circuit 73. Seventh control circuit 74 outputs a switch control signal to second switching circuit 73, based on the voltage value of DC bus 405 measured by voltmeter 406.

Figure 33:
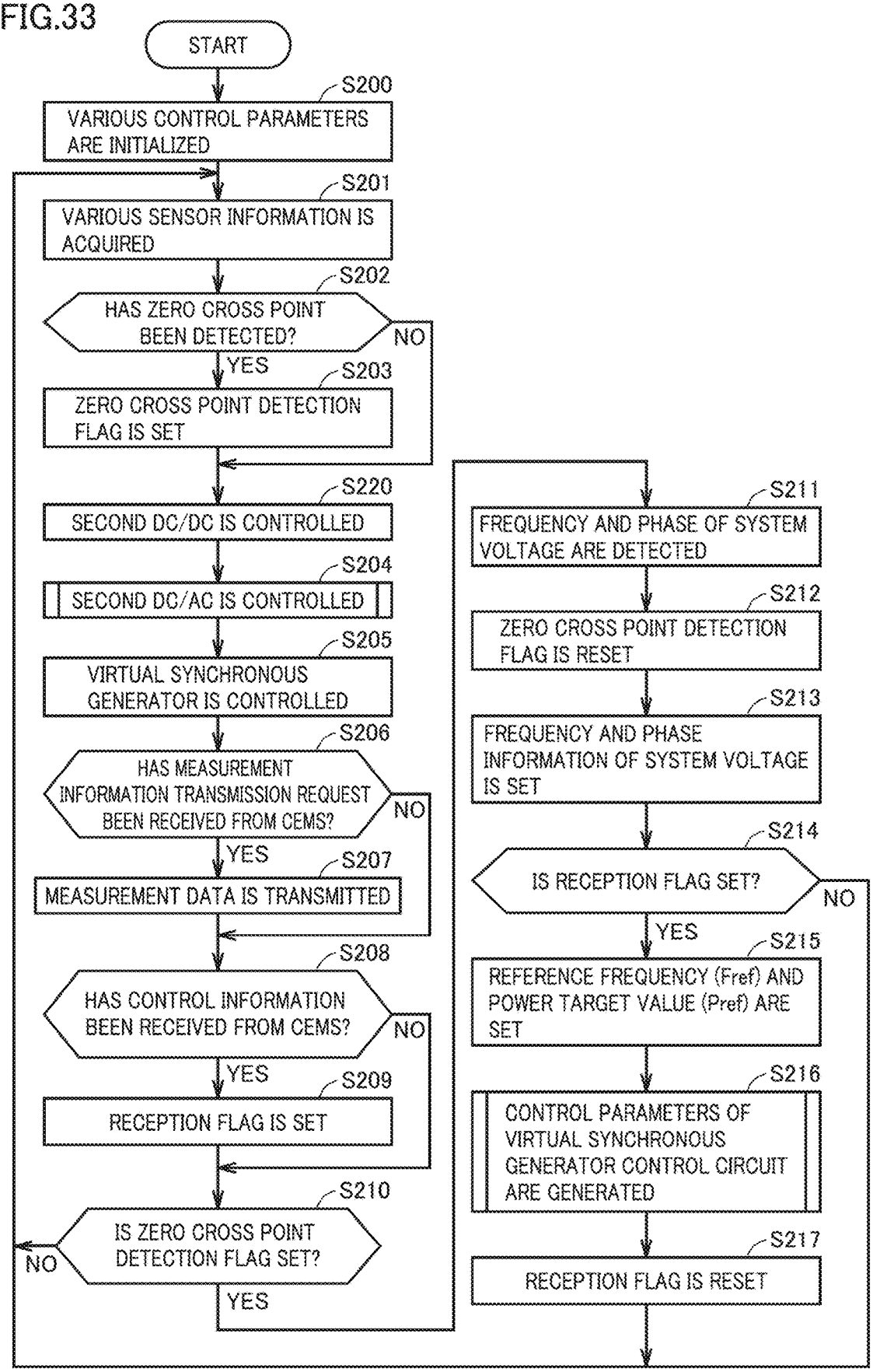
FIG. 33 is a flowchart for explaining the operation of the power conversion device.

The operation of fourth control circuit 409 (FIG. 11) will now be described. FIG. 33 is a flowchart for explaining the operation of power conversion device 41. As illustrated in FIG. 33, upon start of the process, at S200, fourth control circuit 409 initializes various control parameters. Subsequently, at S201, fourth control circuit 409 collects the voltage values measured by voltmeters 401, 406, and 410, current values measured by ammeters 402, 407, and 411, and status information (SOC, etc.) of storage battery 40. Since the measurement value of voltmeter 410 is an AC voltage, the effective value of AC voltage is calculated in eighth control circuit 87 (FIG. 11) and this effective value is defined as a voltage value. Since the measurement value of ammeter 411 is an AC current, the effective value of AC current is calculated in eighth control circuit 87, and this effective value is used as a current value. A charge/discharge power calculating circuit (not shown) in seventh control circuit 74 calculates the charge/discharge power and the amount of charge/discharge power of the storage battery, based on the collected data.

The AC voltage of distribution system 24 measured by voltmeter 410 is input to AC frequency detecting circuit 81 (FIG. 11). At S202, AC frequency detecting circuit 81 detects a zero cross point in the waveform of AC voltage.

FIG. 12 is a block diagram illustrating a configuration of AC frequency detecting circuit 81 illustrated in FIG. 11. As illustrated in FIG. 12, the measurement value of voltmeter 410 is input to phase detecting circuit 810. At S202 in FIG. 33, phase detecting circuit 810 detects a zero cross point of AC voltage. In the first embodiment, a zero cross point indicates a point and the time at which the waveform of AC voltage measured by voltmeter 410 switches from negative to positive. Phase detecting circuit 810 outputs information indicating the detected zero cross point to frequency detecting circuit 811.

Frequency detecting circuit 811 calculates the periods of AC voltage, based on the time of the zero cross point detected by phase detecting circuit 810 last time and the time of the zero cross point detected this time. Frequency detecting circuit 811 calculates the frequency of AC voltage, based on the calculated periods.

Second sine wave generating circuit 812 outputs the zero cross point information detected by phase detecting circuit 810 and the frequency information of AC voltage detected by frequency detecting circuit 811, as sine wave information. The zero cross point information and the frequency information are output to inverter current control circuit 84, inverter voltage control circuit 85, virtual synchronous generator control circuit 83, eighth control circuit 87, and dead zone period detecting circuit 90.

Returning to FIG. 33, if a zero cross point is detected at S202 (YES at S202), at S203, phase detecting circuit 810 sets a zero cross point detection flag. If the process at S203 ends or if no zero cross point is detected at S202 (NO at S202), at S220, fourth control circuit 409 controls second DC/DC converter 403.

Figure 34:
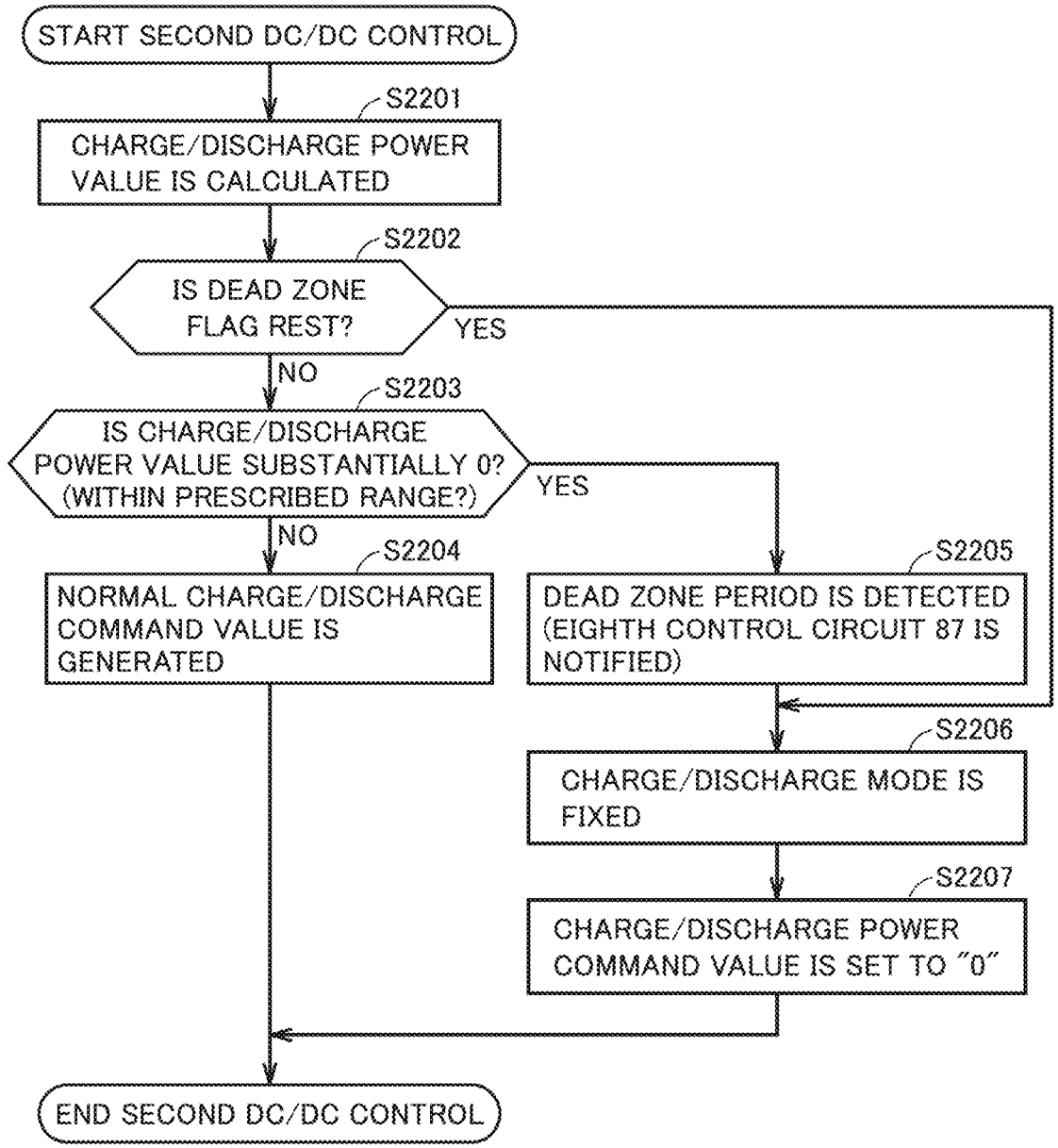
FIG. 34 is a flowchart for explaining the detail of a control process of a second DC/DC converter.

Referring to FIG. 10 and FIG. 34, control of second DC/DC converter 403 will be described below.

As described above, since power conversion device 41 is equipped with virtual synchronous generator control, second DC/AC converter 408 is controlled as a voltage source. That is, second DC/AC converter 408 is voltage-controlled. Thus, the voltage on DC bus 405 is managed by second DC/DC converter 403. FIG. 34 is a flowchart for explaining the detail of a control process of second DC/DC converter 403.

At S2201, third control circuit 404 calculates a charge/discharge power value, based on the voltage on DC bus 405 detected by voltmeter 406 and the current detected by ammeter 407. At S2202, seventh control circuit 74 confirms whether notification of the dead zone flag is given from eighth control circuit 87 (FIG. 11) (whether the dead zone flag is set). If the dead zone flag is not set (NO at S2202), at S2203, third control circuit 404 confirms whether the charge/discharge power value of storage battery 40 acquired at S2201 falls within a prescribed range. The prescribed range is set in a range in which the charge power value is substantially zero. The charge/discharge power value can also be calculated by multiplying the outputs of voltmeter 401 and ammeter 402.

If the charge/discharge power value does not fall within the prescribed range, that is, if the charge/discharge power value is not substantially zero (NO at S2203), third control circuit 404 generates a normal charge/discharge command value. On the other hand, if the charge/discharge power value falls within the prescribed range (YES at S2203), at S2205, third control circuit 404 determines that a dead zone period (the start of a dead zone period) is detected, and notifies eighth control circuit 87 (FIG. 11) of it.

If the dead zone flag is set (YES at S2202) or if a dead zone period is detected at S2205, at S2206, seventh control circuit 74 fixes the operation mode at present. Specifically, if the operation mode at present is the charge mode, the charge mode is maintained, and if it is the discharge mode, the discharge mode is maintained. Then, at S2207, seventh control circuit 74 sets the charge/discharge power command value to zero, which is output to second DC/DC converter 403. The control process of second DC/DC converter 403 then ends.

Figure 35:
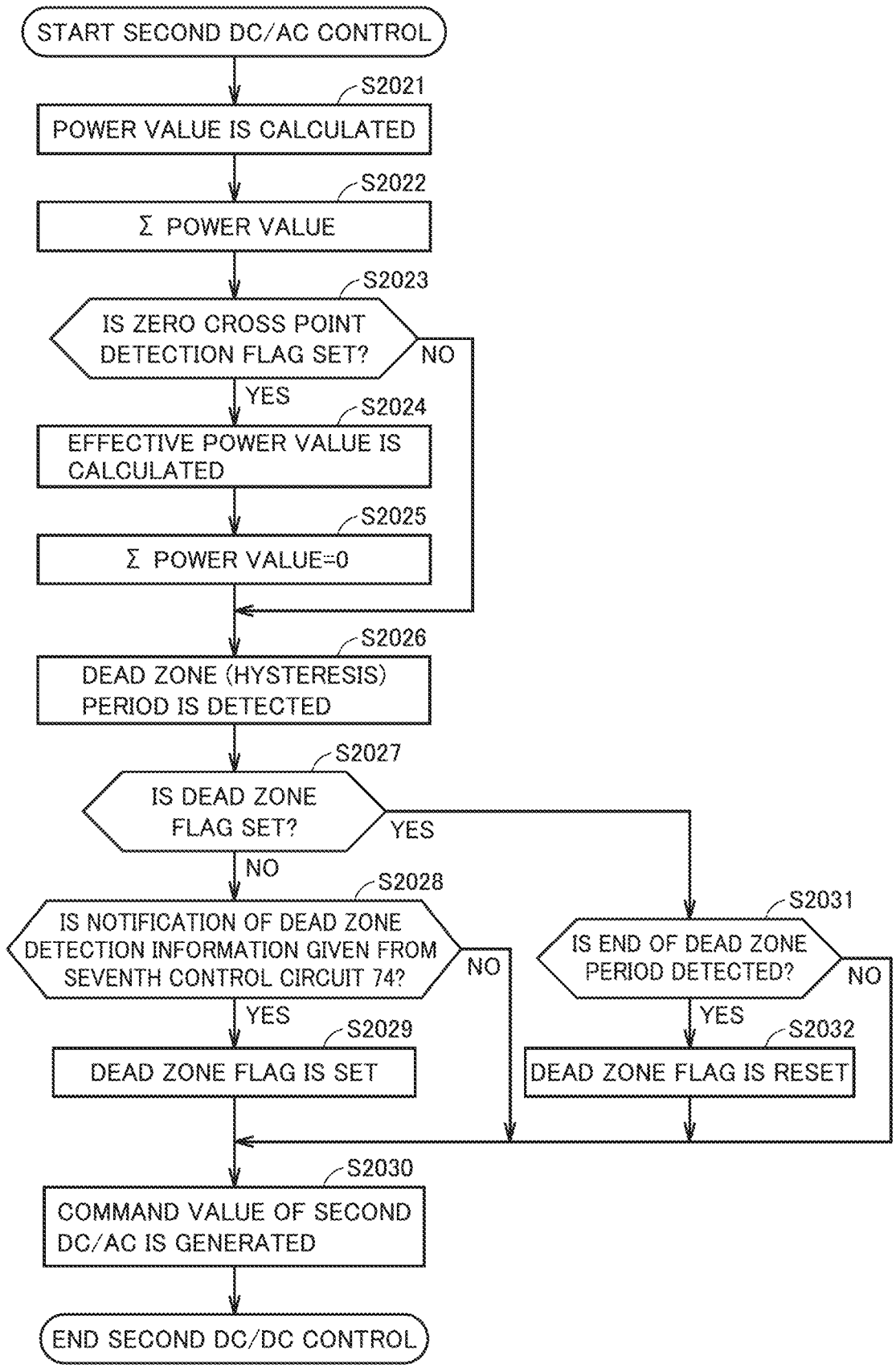
FIG. 35 is a flowchart for explaining the detail of a control process of a second DC/AC converter.

Returning to FIG. 33, at S204, fourth control circuit 409 controls second DC/AC converter 408. Referring to FIG. 11 and FIG. 35, control of second DC/AC converter 408 will be described below.

As described above, since power conversion device 41 is equipped with virtual synchronous generator control, second DC/AC converter 408 is controlled as a voltage source. That is, second DC/AC converter 408 is voltage-controlled. Therefore, when the power supplied to distribution system 24 is deficient, second DC/AC converter 408 is controlled to increase an output power. On the other hand, when the power supplied to distribution system 24 is excessive, second DC/AC converter 408 is controlled to decrease an output power.

FIG. 35 is a flowchart for explaining the detail of a control process of second DC/AC converter 408.

As illustrated in FIG. 35, at S2021, effective power calculating circuit 82 (FIG. 11) calculates a power value based on the measurement values of voltmeter 410 and ammeter 411, and at S2022, integrates the calculated power value. If the zero cross point detection flag is set (YES at S2023), effective power calculating circuit 82 proceeds to S2024 and stores the integrated value of effective power values for one cycle of AC voltage into a memory circuit (not shown) in eighth control circuit 87, and, at S2025, initializes the integrated value to zero.

If the process at S2025 ends or if the zero cross point detection flag is not set (NO at S2023), at S2026, dead zone period detecting circuit 90 detects a dead zone period. Specifically, dead zone period detecting circuit 90 detects a dead zone period, based on dead zone detection information output from seventh control circuit 74 and system frequency information detected by AC frequency detecting circuit 81. The dead zone detection information includes information that the charge/discharge power of storage battery 40 is substantially zero.

Returning to FIG. 35, if a dead zone period is detected at S2026, at S2027, eighth control circuit 87 confirms whether the dead zone flag is set. If the dead zone flag is not set (NO at S2027), at S2028, eighth control circuit 87 confirms whether notification of the dead zone detection information is given from seventh control circuit 74. In the first embodiment, the start of a dead zone is detected based on not the detection result of the system frequency but whether the absolute value of charge/discharge power of storage battery 40 becomes equal to or less than a prescribed value. The start of a dead zone may be detected based on the detection result of the system frequency output by AC frequency detecting circuit 81, but in the first embodiment, the start of a dead zone is detected based on the charge/discharge power of storage battery 40 in order to avoid playing catch of charge/discharge between a plurality of storage batteries 40. With such a configuration, charge/discharge switching can be detected reliably even when the voltmeter and the ammeter have sensor errors.

If notification of the dead zone detection information is given from seventh control circuit 74 at S2028 (YES at S2028), at S2029, dead zone period detecting circuit 90 sets the dead zone flag. On the other hand, if the dead zone flag is set (YES at S2027), at S2031, eighth control circuit 87 confirms whether the end of the dead zone period is detected. If the end of the dead zone period is detected (YES at S2031), at S2032, eighth control circuit 87 resets the dead zone flag. If notification of the dead zone detection information is not given from seventh control circuit 74 (NO at S2028), if the end of the dead zone period is not detected (NO at S2031), or if the dead zone flag is set (S2029) or the dead zone flag is reset (S2032), fourth control circuit 409 generates a control command value for controlling second DC/AC converter 408.

Referring now to FIG. 13, the operation of inverter voltage control circuit 85 will be described.

As illustrated in FIG. 13, inverter voltage control circuit 85 generates a control command value for controlling second DC/AC converter 408, based on the frequency and phase information output from virtual synchronous generator control circuit 83 (input via second sine wave generating circuit 812), and the amplitude information of AC system voltage input from eighth control circuit 87 via second sine wave generating circuit 812.

Specifically, the sine wave information (frequency, phase, and amplitude information, and frequency and phase information calculated by virtual synchronous generator control circuit 83) from AC frequency detecting circuit 81 is input to third sine wave generating circuit 851. Third sine wave generating circuit 851 generates a target value of AC system voltage output from second DC/AC converter 408, based on the input information.

Subtractor 852 subtracts the voltage measured by voltmeter 410 from the output of third sine wave generating circuit 851 and outputs the subtraction result to third PI control circuit 853.

Third PI control circuit 853 generates a voltage command value by executing PI control for setting the input subtraction to zero and outputs the generated voltage command value to first current limiting circuit 855.

First current limiting circuit 855 imposes a limit on the voltage command value applied from third PI control circuit 853, based on the measurement result of ammeter 411 input via eighth control circuit 87. For example, a case where the power target value given from CEMS 31 is 90% of the inverter capacity and the load power consumption increases will be discussed. In this case, in the $\Delta P/\Delta F$ characteristic described in the first embodiment, an output of power exceeding the inverter capacity in power conversion device 41 is demanded before the deviation of frequency of the system voltage (differential frequency $\Delta F$) reaches $-\Delta F\max$. It is therefore necessary to impose a limit on the output power (output current) of power conversion device 41 so that it does not exceed the inverter capacity. Thus, in the first embodiment, when current exceeding the current capacity of second DC/AC converter 408 flows, control is performed by applying current limitation so that the current flowing through second DC/AC converter 408 attains a predetermined current value (for example, the current capacity of second DC/AC converter 408).

Specifically, first current limiting circuit 855 monitors current flowing through second DC/AC converter 408 and controls (limits) the current value such that the current does not exceed the current capacity of second DC/AC converter 408. The output of first current limiting circuit 855 is input to second PWM converter 854. The control parameters (control gain and integral time) of third PI control circuit 853 and first current limiting circuit 855 are output from eighth control circuit 87.

Second PWM converter 854 generates a control command value by executing PWM control using the voltage command value output from first current limiting circuit 855. Second PWM converter 854 outputs the generated control command value to second DC/AC converter 408.

Returning to FIG. 33, upon generating a control command value of second DC/AC converter 408 at S204, at S205, virtual synchronous generator control circuit 83 executes virtual synchronous generator control. In the first embodiment, one cycle of AC voltage is set as a control period. The control period may be an integer multiple of one cycle of AC voltage or a predetermined period such as a one second period.

FIG. 14 is a block diagram illustrating a configuration of virtual synchronous generator control circuit 83. Upon determining that the control timing has come, eighth control circuit 87 (FIG. 11) instructs virtual synchronous generator control circuit 83 to generate information on frequency and phase to be used in voltage control. In the first embodiment, the frequency and phase of a sine wave generated by third sine wave generating circuit 851 (FIG. 13) in inverter voltage control circuit 85 are updated at the zero cross point. Therefore, in the first embodiment, the control period is the period of the zero cross point detected by AC frequency detecting circuit 81.

As illustrated in FIG. 14, in virtual synchronous generator control circuit 83, subtractor 832 subtracts reference frequency Fref (for example 60 Hz) input from eighth control circuit 87 from the measured value of frequency of the system voltage input from AC frequency detecting circuit 81 (FIG. 11) and outputs the subtraction result to governor control circuit 833. FIG. 15 is a block diagram illustrating a detailed configuration of governor control circuit 833 illustrated in FIG. 14.

As illustrated in FIG. 15, in governor control circuit 833, multiplier 91 multiplies the output of subtractor 832 (FIG. 14) by the control parameter (−1/Kgd) given from eighth control circuit 87. Multiplier 91 inputs the multiplication result to first-order lag system model 92.

As for speed adjustment rate Kgd and governor time constant Tg used in governor control circuit 833, that given from CEMS 31 and that generated in control parameter generating circuit 88 are set in a register (not shown) via eighth control circuit 87, and those set in the register are used.

First-order lag system model 92 performs computation to mimic a first-order lag system (1/(1+s×Tg)) using time constant Tg given from eighth control circuit 87 as described above and outputs the computation result to limiter circuit 93.

Limiter circuit 93 imposes a limit on the input data. Specifically, limiter circuit 93 imposes a limit on the output power of second DC/AC converter 408 such that it does not exceed the power capacity of second DC/AC converter 408.

Returning to FIG. 14, adder 835 adds the output of governor control circuit 833 to power target value Pref output from eighth control circuit 87. As for power target value Pref, that given from CEMS 31, is output from eighth control circuit 87.

Subtractor 836 subtracts the actual value of effective power output from effective power calculating circuit 82 (FIG. 11) from the output of adder 835 and outputs the subtraction result to mass system computing circuit 837. FIG. 16 is a block diagram illustrating a detailed configuration of mass system computing circuit 837 illustrated in FIG. 14. As illustrated in FIG. 16, subtractor 101 subtracts the output of multiplier 103 from the output of subtractor 836 (FIG. 14) and outputs the subtraction value to integrator 102.

Integrator 102 divides the subtraction result of subtractor 101 by inertia constant M output from eighth control circuit 87 and integrates the division result. Output Aw of integrator 102 corresponds to a differential value from the angular velocity (2×π×60 Hz) of the frequency of AC voltage. Output Δω of integrator 102 is input to multiplier 103 and divider 104.

Multiplier 103 multiplies output Δω of integrator 102 by damping coefficient Dg applied from eighth control circuit 87 and outputs the multiplication result to subtractor 101.

Divider 104 converts Δω into differential value Δf from reference frequency Fref (60 Hz) by dividing output Δω of integrator 102 by 2×π. Adder 105 generates a frequency (Fref+Δf) for performing voltage control in inverter voltage control circuit 85 (FIG. 11) by adding output Δf of divider 104 to reference frequency Fref (60 Hz).

As for inertia constant M and damping coefficient Dg used in mass system computing circuit 837, those generated by control parameter generating circuit 88 using information necessary for generating virtual synchronous generator control parameters generated and given by CEMS 31 are set in a not-shown register via eighth control circuit 87, and those set in the register are used.

The frequency information (Fref+Δf) output from adder 105 is input to phase calculating circuit 106. The operation of phase calculating circuit 106 will be described below.

In the first embodiment, the frequency information output from adder 105 (FIG. 16) is integrated by phase calculating circuit 106 and output as phase information when inverter voltage control circuit 85 performs voltage control.

The phase information and frequency information output from mass system computing circuit 837 (FIG. 16) are input to third sine wave generating circuit 851 (FIG. 13) in inverter voltage control circuit 85 via second sine wave generating circuit 812 (FIG. 12) in AC frequency detecting circuit 81. Third sine wave generating circuit 851 generates a target value of AC voltage output from power conversion device 41, based on the input information.

In the first embodiment, even when the dead zone flag is set, governor control circuit 833 and mass system computing circuit 837 perform normal operation.

Returning to FIG. 33, when the process of virtual synchronous generator control is finished at S205, at S206, fourth control circuit 409 confirms whether a transmission request for measurement data has been received from CEMS 31. If a transmission request has been received from CEMS 31 (YES at S206), at S207, eighth control circuit 87 (FIG. 11) notifies CEMS 31 of measurement data via communication I/F 412 (FIG. 7).

On the other hand, if notification of measurement data is given at S207 or if a transmission request has not been received from CEMS 31 (NO at S206), eighth control circuit 87 proceeds to S208 and confirms whether control information has been received from CEMS 31.

If control information has been received from CEMS 31 (YES at S208), at S209, eighth control circuit 87 sets a control information reception flag. If the process at S209 ends or if control information has not been received from CEMS 31 (NO at S208), at S210, eighth control circuit 87 confirms whether the zero cross point detection flag is set. If the zero cross point detection flag is not set (NO at S210), the process returns to S201.

On the other hand, if the zero cross point detection flag is set (YES at S210), at S211, second sine wave generating circuit 812 (FIG. 12) takes in information on frequency and phase of the system voltage and, at S212, resets the zero cross point detection flag.

Upon resetting the zero cross point detection flag at S212, at S213, second sine wave generating circuit 812 updates the information on frequency and phase of the system voltage (in the first embodiment, zero cross point time information) to the information taken in at S211.

Upon completion of the process at S213, at S214, eighth control circuit 87 confirms whether control information has been received from CEMS 31 (whether the control information reception flag is set). If the reception flag is not set (NO at S214), the process returns to S201.

On the other hand, if the reception flag is set (YES at S214), at S215, eighth control circuit 87 replaces each of the frequency target value (reference frequency Fref) and power target value Pref with the received data.

Figure 36:
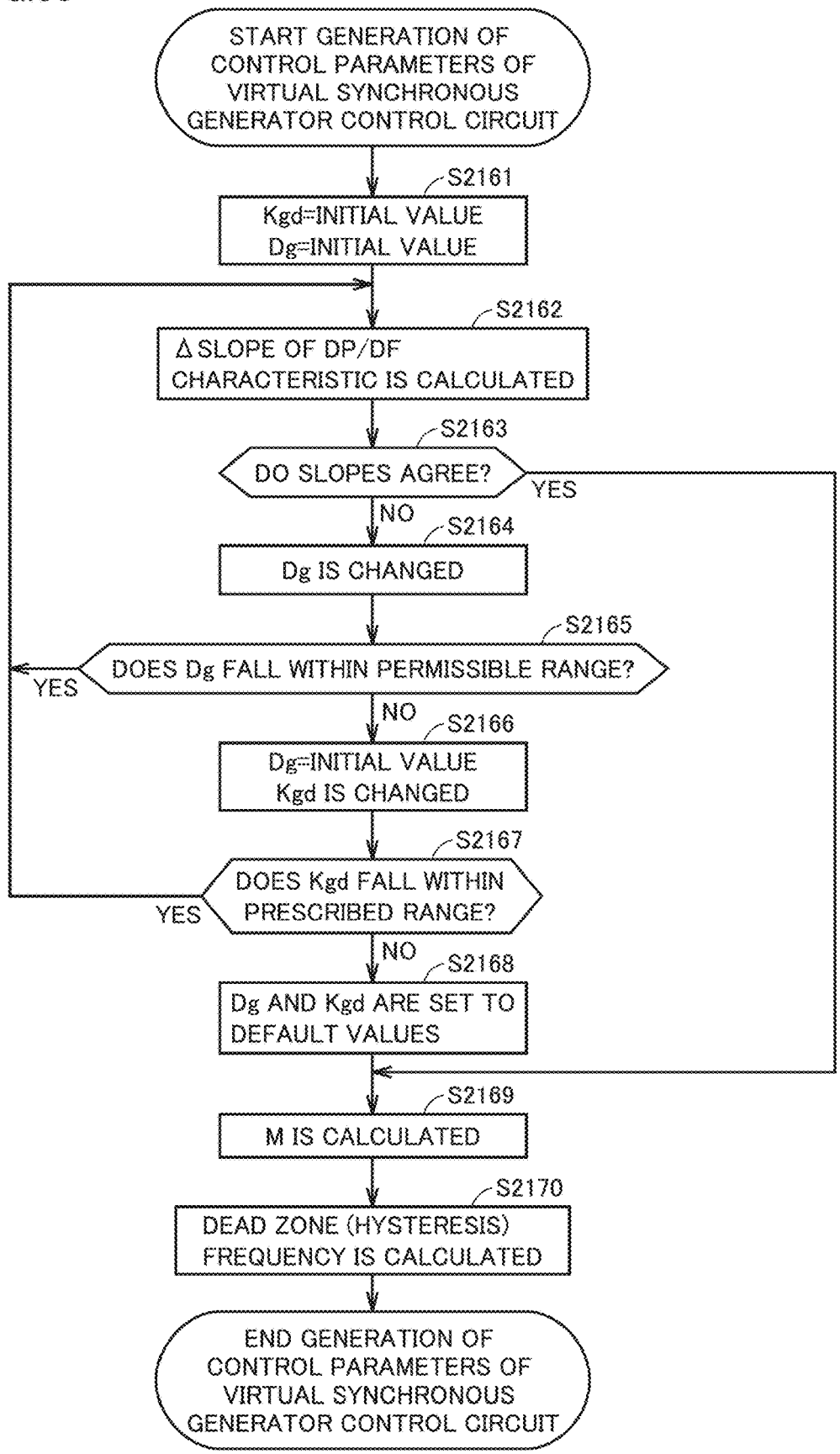
FIG. 36 is a flowchart illustrating a process of generating control parameters (S216 in FIG. 33).

At S216, control parameter generating circuit 88 generates control parameters (speed adjustment rate Kgd, damping coefficient Dg, and inertia constant M) of virtual synchronous generator control. FIG. 36 is a flowchart illustrating a process of generating control parameters (S216 in FIG. 33). In the first embodiment, a case where the $\Delta P/\Delta F$ characteristic is input from CEMS 31 as information necessary for generating control parameters of virtual synchronous generator control will be described. Control parameter generating circuit 88 generates control parameters using system information (reference frequency Fref, power target value Pref, $\Delta F$max information) and inverter capacity Cinv, in addition to the $\Delta P/\Delta F$ characteristic.

As illustrated in FIG. 36, upon starting generation of control parameters, at S2161, control parameter generating circuit 88 initializes speed adjustment rate Kgd and damping coefficient Dg by setting each of speed adjustment rate Kgd and damping coefficient Dg to a predetermined initial value.

Upon initializing speed adjustment rate Kgd and damping coefficient Dg at S2161, control parameter generating circuit 88 proceeds to S2162 and calculates the slope of the $\Delta P/\Delta F$ characteristic using speed adjustment rate Kgd and damping coefficient Dg. In the first embodiment, a case where a virtual synchronous generator model that mimics the operation of virtual synchronous generator control circuit 83 (FIG. 11) is implemented in control parameter generating circuit 88 (FIG. 11) and control parameters are generated using this model will be described.

The method of generating control parameters is not limited to this method. For example, the relation between speed adjustment rate Kgd and the system frequency illustrated in FIG. 18 may be stored as table data corresponding to each damping coefficient Dg, and the relation between damping coefficient Dg and the system frequency illustrated in FIG. 19 may be stored as table data corresponding to each speed adjustment rate Kgd. These table data may be used to determine appropriate speed adjustment rate Kgd and damping coefficient Dg.

In the first embodiment, the block diagrams illustrated in FIG. 14 to FIG. 16 are formed as a mathematical model, which is used as a virtual synchronous generator model. However, embodiments are not limited thereto. For example, a transfer function of virtual synchronous generator control circuit 83 (FIG. 11) may be generated from the transfer function of the governor control unit represented by the above expression (1) and the swing equation represented by the above expression (2), and control parameters may be generated from the generated transfer function.

At S2162, the set speed adjustment rate Kgd and damping coefficient Dg are input to the virtual synchronous generator model to calculate a system frequency output from mass system computing circuit 837 (FIG. 14), for example, when load fluctuations of about 25% of the inverter capacity are input. Differential frequency $\Delta F$ is calculated by subtracting reference frequency Fref from the calculation result. Then, the slope of the $\Delta P/\Delta F$ characteristic is calculated by dividing the calculated differential frequency $\Delta F$ by the amount of load fluctuations (for example, inverter capacity×0.25).

Upon calculating the slope of the $\Delta P/\Delta F$ characteristic at S2162, at S2163, control parameter generating circuit 88 compares the calculated slope of the $\Delta P/\Delta F$ characteristic with the slope of the $\Delta P/\Delta F$ characteristic generated at S0563 (FIG. 30) in FIG. 28. Specifically, control parameter generating circuit 88 confirms whether the deviation between these two slopes of the $\Delta P/\Delta F$ characteristics falls within a predetermined permissible range.

If the deviation between the slopes falls within the permissible range, control parameter generating circuit 88 determines that the two slopes of the $\Delta P/\Delta F$ characteristics agree (YES at S2163) and proceeds to S2169.

On the other hand, if the deviation between the slopes does not fall within the permissible range, control parameter generating circuit 88 determines that the two slopes of the $\Delta P/\Delta F$ characteristics do not agree (NO at S2163). In this case, control parameter generating circuit 88 proceeds to S2164 and changes damping coefficient Dg. In the first embodiment, control parameter generating circuit 88 adds a prescribed value to damping coefficient Dg at present.

Upon changing damping coefficient Dg at S2164, at S2165, control parameter generating circuit 88 confirms whether damping coefficient Dg falls within a predetermined prescribed range. If damping coefficient Dg falls within the prescribed range (YES at S2165), control parameter generating circuit 88 returns to S2162 and calculates the slope of the $\Delta P/\Delta F$ characteristic using the changed damping coefficient Dg.

On the other hand, if damping coefficient Dg falls outside the prescribed range (NO at S2165), control parameter generating circuit 88 determines that speed adjustment rate Kgd at present does not provide an appropriate characteristic and, at S2166, returns damping coefficient Dg to an initial value and changes speed adjustment rate Kgd. Specifically, control parameter generating circuit 88 adds a prescribed value to speed adjustment rate Kgd at present (initial value).

Upon changing speed adjustment rate Kgd at S2166, at S2167, control parameter generating circuit 88 confirms whether speed adjustment rate Kgd falls within a predetermined prescribed range. If speed adjustment rate Kgd falls outside the prescribed range (NO at S2167), control parameter generating circuit 88 proceeds to S2168 and sets speed adjustment rate Kgd and damping coefficient Dg to respective default values prepared in advance, because appropriate speed adjustment rate Kgd and damping coefficient Dg fail to be obtained. The process proceeds to S2169.

On the other hand, if speed adjustment rate Kgd falls within a prescribed range at S2167 (YES at S2167), control parameter generating circuit 88 returns to S2162 and calculates the slope of the $\Delta P/\Delta F$ characteristic using the changed speed adjustment rate Kgd and damping coefficient Dg. Control parameter generating circuit 88 repeats the process at S2162 to S2167 until the determination is YES at S2163 or until the determination is NO at S2167.

If speed adjustment rate Kgd and damping coefficient Dg are set to default values at S2168, a power excess/deficit is unable to be allocated in accordance with the power ratio based on the operation plan even when load fluctuations occur.

In the first embodiment, damping coefficient Dg and speed adjustment rate Kgd are calculated from the relation between damping coefficient Dg and the frequency of AC system voltage illustrated in FIG. 19. Damping coefficient Dg and speed adjustment rate Kgd may be calculated from the relation between speed adjustment rate Kgd and the frequency of AC system voltage illustrated in FIG. 18.

Upon setting of speed adjustment rate Kgd and damping coefficient Dg, at S2169, control parameter generating circuit 88 calculates inertia constant M. In the first embodiment, inertia constant M is calculated based on the response time required for virtual synchronous generator control. Specifically, the response performance of virtual synchronous generator control is determined by governor time constant Tg in governor control circuit 833 (FIG. 14) and time constant M/Dg in mass system computing circuit 837 (FIG. 14) obtained by the swing equation. In the first embodiment, since a default value of governor time constant Tg is used and governor time constant Tg is not generated, only the time constant of mass system computing circuit 837 is controlled. The time constant of mass system computing circuit 837 is obtained by M/Dg from the above expression (3). In the first embodiment, therefore, inertia constant M is calculated by multiplying the time constant of mass system computing circuit 837 defined by a default value by damping coefficient Dg.

Figure 37:
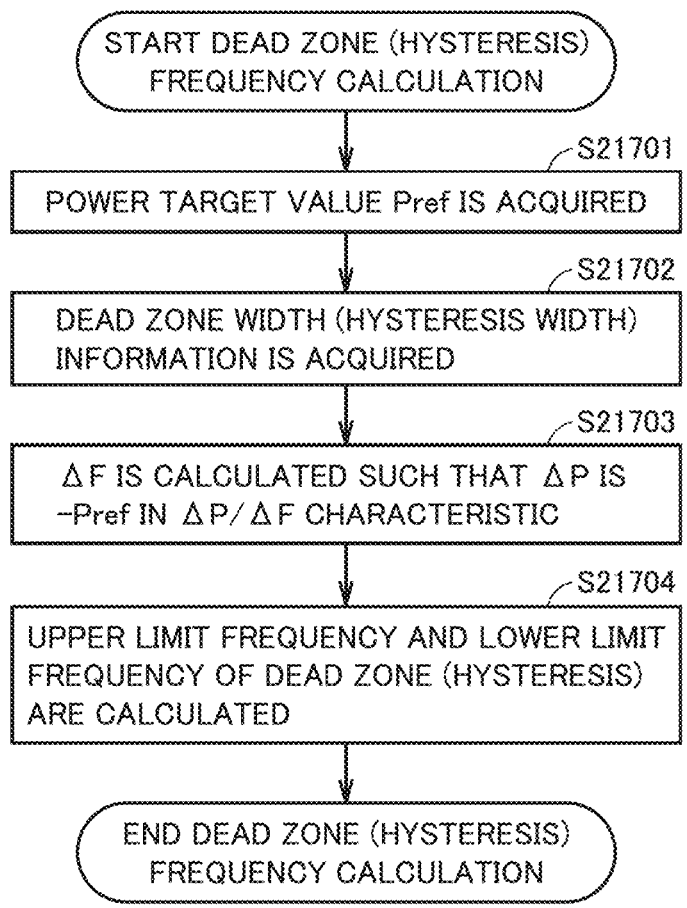
FIG. 37 is a flowchart illustrating a process of calculating a dead zone frequency (S2170 in FIG. 36).

Upon calculation of inertia constant M at S2069, at S2170, control parameter generating circuit 88 calculates a dead zone frequency. FIG. 37 is a flowchart illustrating a process of calculating a dead zone frequency (S2170 in FIG. 36).

As illustrated in FIG. 37, upon start of the process, at S21701, control parameter generating circuit 88 acquires power target value Pref. Further, at S21702, control parameter generating circuit 88 acquires the dead zone width information given from CEMS 31. At S21703, switching frequency calculating circuit 89 calculates switching frequency ΔF0 at which charge/discharge of storage battery 40 is switched, using the ΔP/ΔF characteristic output from control parameter generating circuit 88 and the power target value Pref given from eight control circuit 87. Specifically, switching frequency calculating circuit 89 calculates ΔF at which ΔP=−Pref in the ΔP/ΔF characteristic, as switching frequency ΔF0.

Upon calculation of switching frequency ΔF0 at S21703, at S21704, switching frequency calculating circuit 89 calculates the upper limit frequency and the lower limit frequency of the dead zone, using switching frequency ΔF0 and the dead zone width information acquired at S21702. Specifically, the slope of ΔP/ΔF characteristic=−Pref/ΔF0. Therefore, switching frequency ΔF0 is −Pref/(the slope of the ΔP/ΔF characteristic).

When power target value Pref is a positive value (discharge), as illustrated in FIG. 24A, the lower limit frequency of the dead zone is set to ΔF0+system frequency, and the upper limit frequency of the dead zone is set to ΔF0+dead zone width+system frequency.

When power target value Pref is a negative value (charge), as illustrated in FIG. 24B, the upper limit frequency of the dead zone is set to ΔF0+system frequency, and the lower limit frequency of the dead zone is set to ΔF0−dead zone width+system frequency.

When the absolute value of the power command value is equal to or less than a prescribed value, as illustrated in FIG. 24C, power conversion device 41 enters the charge/discharge mode, the lower limit frequency of the dead zone is set to (−dead zone width)/2, and the upper limit frequency is set to (dead zone width)/2. Switching frequency calculating circuit 89 outputs the calculated upper limit frequency and lower limit frequency of the dead zone to dead zone period detecting circuit 90 and terminates the process of generating control parameters.

Returning to FIG. 33, upon completion of calculation of control parameters for virtual synchronous generator control (speed adjustment rate Kgd, damping coefficient Dg, and inertia constant M) at S216, control parameter generating circuit 88 notifies eighth control circuit 87 of it and outputs the calculated control parameters to eighth control circuit 87.

Upon receiving the calculated control parameters, eighth control circuit 87 outputs the control parameters to virtual synchronous generator control circuit 83 to update the control parameters. Upon completion of updating of the control parameters, at S217, eighth control circuit 87 clears (resets) the register (not shown) with the reception flat set and returns to S201.

As explained above, in the distributed power source system according to the first embodiment, when the generated power of energy creation devices and the power consumption of loads balance due to fluctuations in power consumption of loads or fluctuations in solar radiation, the power conversion device is controlled such that supply power to a distributed power source such as storage battery or supply power from a distributed power source becomes zero. Thus, unnecessary charge/discharge and repeated charge/discharge among a plurality of distributed power sources due to sensor errors of voltmeters and ammeters can be suppressed, so that the power loss due to unnecessary charge/discharge and the progress of deterioration of storage batteries can be suppressed.

Furthermore, as a method of creating a ΔP/ΔF characteristic in a case where a plurality of power conversion devices having static inverters equipped with virtual synchronous generator control are connected to a system, first, assuming that a plurality of power conversion devices 41 for which a power target value is to be generated are a single power conversion device, a reference ΔP/ΔF characteristic is generated, and then switching frequency ΔF0 at which charge/discharge is switched is calculated using the generated reference ΔP/ΔF characteristic and the total of power target values of a plurality of power conversion devices 41. Then, a drooping characteristic (ΔP/ΔF characteristic) of each power conversion device 41 is generated using the switching frequency ΔF0 and the power target value. According to this method, the ΔP/ΔF characteristic with the same switching frequency ΔF0 among a plurality of target power conversion devices 41 can be applied to each power conversion device 41. A dead zone is imparted to the ΔP/ΔF characteristic applied to each power conversion device 41, whereby the static inverter is controlled using the ΔP/ΔF characteristic with the dead zone when the power consumption of consumer loads and the generated power of energy creation devices balance. According to this method, even when voltmeters and ammeters have sensor errors, unnecessary charge/discharge or repeated charge/discharge among distributed power sources such as storage batteries can be suppressed. As a result, power loss due to unnecessary charge/discharge and damage to storage batteries can be suppressed.

Second Embodiment

In the first embodiment, the method of generating information for generating control parameters for virtual synchronous generator control implemented in power conversion device 41 in CEMS 31, the method of generating control parameters in power conversion device 41, the method of generating a dead zone provided in the ΔP/ΔF characteristic, and the control method of second DC/DC converter 403 and second DC/AC converter 408 have been described.

In a second embodiment, how a dead zone is provided in the ΔP/ΔF characteristic is different from that in the first embodiment. Specifically, in the second embodiment, a method of providing a hysteresis rather than a dead zone in the ΔP/ΔF characteristic will be described. In the second embodiment, therefore, a part of the control method of second DC/DC converter 403 and second DC/AC converter 408 differs from the first embodiment, and the circuit configuration and the like of the distributed power source system is the same as the first embodiment and will not be further elaborated here.

Figure 38A:
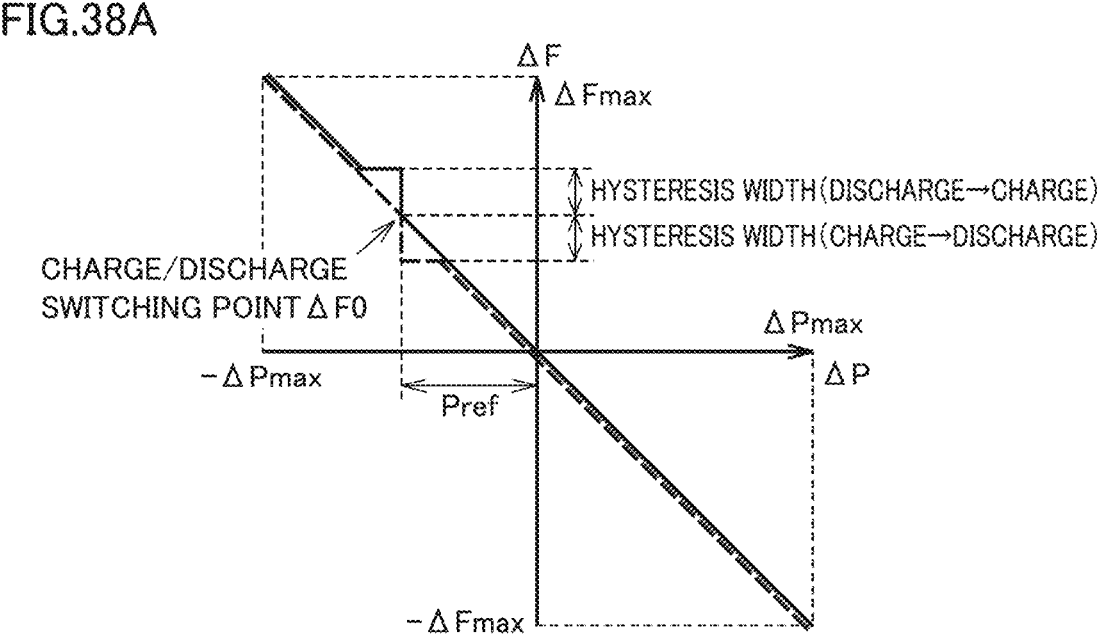
FIG. 38A is a diagram illustrating a first example of the ΔP/ΔF characteristic to be applied to a power conversion device according to a second embodiment.
Figure 38B:
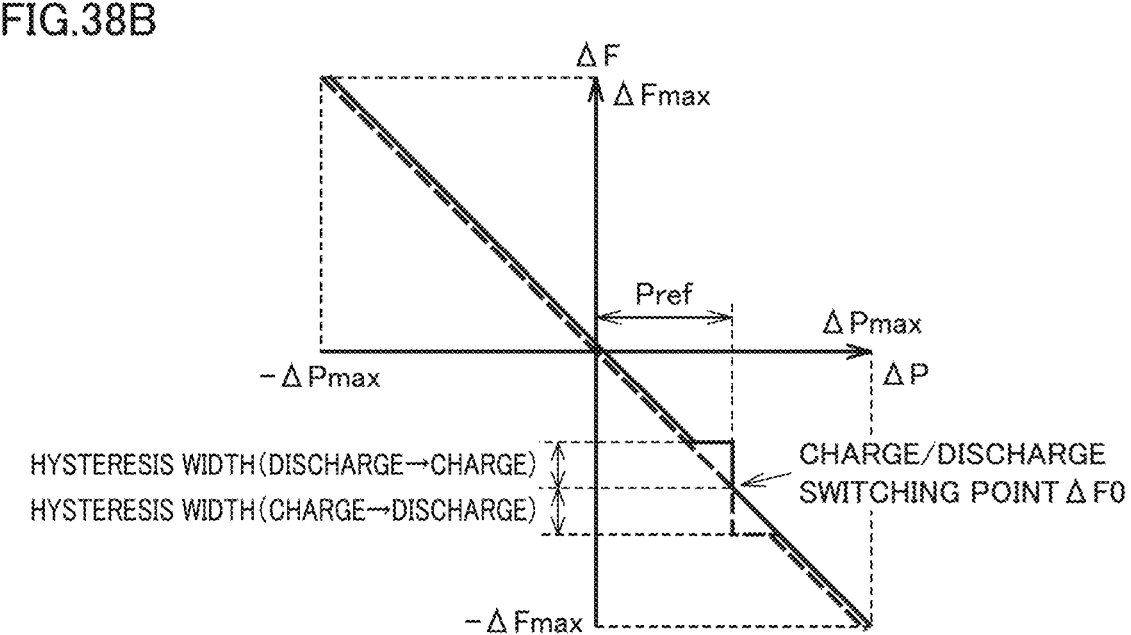
FIG. 38B is a diagram illustrating a second example of the ΔP/ΔF characteristic to be applied to the power conversion device according to the second embodiment.
Figure 38C:
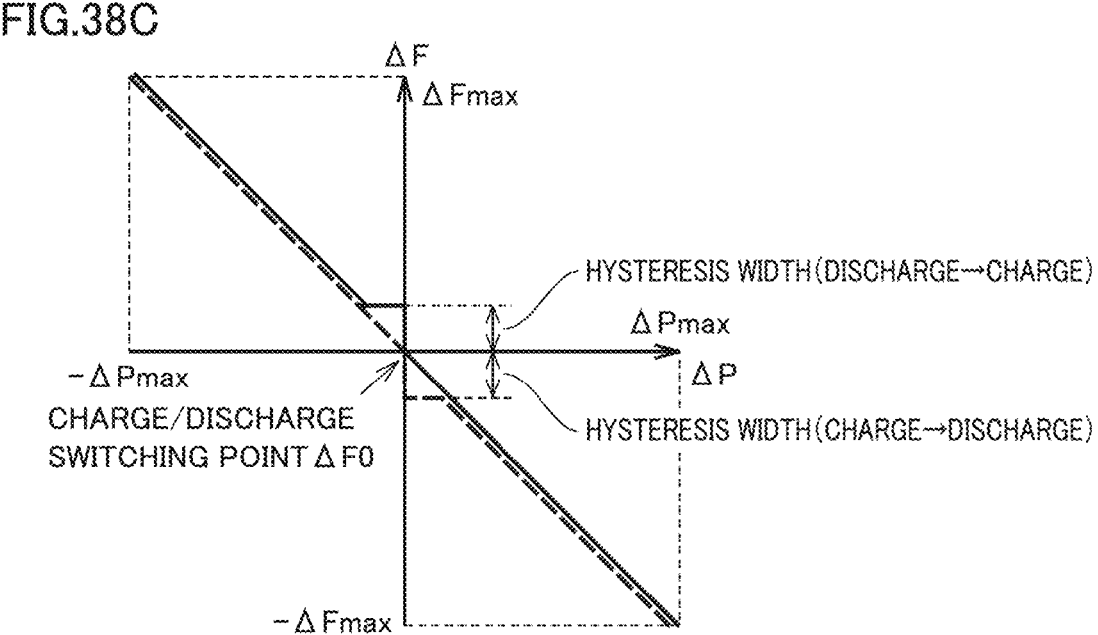
FIG. 38C is a diagram illustrating a third example of the ΔP/ΔF characteristic to be applied to the power conversion device according to the second embodiment.

FIG. 38A to FIG. 38C are diagrams illustrating an example of the ΔP/ΔF characteristic (drooping characteristic) applied to power conversion device 41 according to the second embodiment. A hysteresis is provided in the ΔP/ΔF characteristic in the drawings.

FIG. 38A is a diagram illustrating a ΔP/ΔF characteristic in a case where power target value Pref given from CEMS 31 is a positive value (discharge). The solid line in FIG. 38A indicates the ΔP/ΔF characteristic when storage battery 40 shifts from the discharge mode to the charge mode, and the broken line indicates the ΔP/ΔF characteristic when storage battery 40 shifts from the charge mode to the discharge mode.

When second DC/AC converter 408 is operating in the discharge mode, as indicated by the solid line, the ΔP value is fixed at a point of time when ΔP=−Pref, that is, ΔF=ΔF0, in the same manner as in the first embodiment (FIG. 24A). Since ΔF=ΔF0, the output from second DC/AC converter 408 is set to "zero". Thus, storage battery 40 is also fixed to the discharge mode. Second DC/AC converter 408 outputs "zero" until ΔF of the system voltage exceeds the hysteresis width. Then, unlike the first embodiment, when ΔF exceeds the hysteresis width, the ΔP value is set to a value indicated by the ΔP/ΔF characteristic. Second DC/AC converter 408 operates in the charge mode.

On the other hand, when second DC/AC converter 408 is operating in the charge mode, as indicated by the broken line, the ΔP value is fixed at a point of time when ΔP=−Pref (a point of time when ΔF=ΔF0). Since ΔF=ΔF0, the output from second DC/AC converter 408 is set to "zero". Thus, storage battery 40 is also fixed to the charge mode. Second DC/AC converter 408 outputs "zero" until ΔF of the system voltage falls below the hysteresis width. Then, unlike the first embodiment, when ΔF falls below the hysteresis width, the ΔP value is set to a value indicated by the ΔP/ΔF characteristic. Second DC/AC converter 408 operates in the discharge mode.

FIG. 38B is a diagram illustrating a ΔP/ΔF characteristic in a case where power target value Pref given from CEMS 31 is a negative value (charge). The solid line in FIG. 38B indicates the ΔP/ΔF characteristic when storage battery 40 shifts from the discharge mode to the charge mode, and the broken line indicates the ΔP/ΔF characteristic when storage battery 40 shifts from the charge mode to the discharge mode.

When second DC/AC converter 408 is operating in the charge mode, as indicated by the broken line, the ΔP value is fixed at a point of time when ΔP=Pref, that is, ΔF=ΔF0, in the same manner as in the first embodiment (FIG. 24B). Since ΔF=ΔF0, the output from second DC/AC converter 408 is set to "zero". Thus, storage battery 40 is also fixed to the charge mode. Second DC/AC converter 408 outputs "zero" until ΔF of the system voltage falls below the hysteresis width. Then, unlike the first embodiment, when ΔF falls below the hysteresis width, the ΔP value is set to a value indicated by the ΔP/ΔF characteristic. Second DC/AC converter 408 operates in the discharge mode.

On the other hand, when second DC/AC converter 408 is operating in the discharge mode, as indicated by the solid line, the ΔP value is fixed at a point of time when ΔP=Pref (a point of time when ΔF=ΔF0). Since ΔF=ΔF0, the output from second DC/AC converter 408 is set to "zero". Thus, storage battery 40 is also fixed to the discharge mode. Second DC/AC converter 408 outputs "zero" until ΔF of the system voltage exceeds the hysteresis width. Then, unlike the first embodiment, when ΔF exceeds the hysteresis width, the ΔP value is set to a value indicated by the ΔP/ΔF characteristic. Second DC/AC converter 408 operates in the charge mode.

FIG. 38C is a diagram illustrating a ΔP/ΔF characteristic in a case where power target value Pref given from CEMS 31 is zero (charge/discharge mode). The solid line in FIG. 38C indicates the ΔP/ΔF characteristic when storage battery 40 shifts from the discharge mode to the charge mode, and the broken line indicates the ΔP/ΔF characteristic when storage battery 40 shifts from the charge mode to the discharge mode.

When second DC/AC converter 408 is operating in the charge mode, as indicated by the broken line, the ΔP value is fixed at a point of time when ΔP=0 (Pref), that is, ΔF=ΔF0, in the same manner as in the first embodiment (FIG. 24C). Since ΔF=ΔF0, the output from second DC/AC converter 408 is set to "zero". Thus, storage battery 40 is also fixed to the charge mode. Second DC/AC converter 408 outputs "zero" until ΔF of the system voltage falls below the hysteresis width. Then, unlike the first embodiment, when ΔF falls below the hysteresis width, the ΔP value is set to a value indicated by the ΔP/ΔF characteristic. Second DC/AC converter 408 operates in the discharge mode.

On the other hand, when second DC/AC converter 408 is operating in the discharge mode, as indicated by the solid line, the ΔP value is fixed at a point of time when ΔP=0 (Pref) (a point of time when ΔF=ΔF0). Since ΔF=ΔF0, the output from second DC/AC converter 408 is set to "zero". Thus, storage battery 40 is also fixed to the discharge mode. Second DC/AC converter 408 outputs "zero" until ΔF of the system voltage exceeds the hysteresis width. Then, unlike the first embodiment, when ΔF exceeds the hysteresis width, the ΔP value is set to a value indicated by the ΔP/ΔF characteristic. Second DC/AC converter 408 operates in the charge mode.

As explained above, in a case where a plurality of power conversion devices 41 having static inverters equipped with virtual synchronous generator control are connected to a distribution system, a hysteresis is imparted to the drooping characteristic (ΔP/ΔF characteristic) applied to power conversion device 41 by virtual synchronous generator control. This can prevent charging of storage battery 40*a* with discharge power from storage battery 40*b* (including playing catch of charge/discharge (hunting operation)) as illustrated in FIG. 22(B), due to the influence of sensor errors, although the generated power of mega-solar plant 26 and the power consumption of loads balance. Thus, unnecessary exchange of power between storage batteries 40*a* and 40*b* can be suppressed, so that the power loss due to charge/discharge and the progress of deterioration of storage batteries can be suppressed.

In the second embodiment, similar to the first embodiment, as a method of creating a ΔP/ΔF characteristic, first, assuming that a plurality of power conversion devices 41 for which a power target value is to be generated are a single power conversion device, a reference ΔP/ΔF characteristic is generated, and then switching frequency ΔF0 at which charge/discharge is switched is calculated using the generated reference ΔP/ΔF characteristic and the total of power target values of a plurality of power conversion devices 41. Then, the ΔP/ΔF characteristic of each power conversion device 41 is generated using the switching frequency ΔF0 and the power target value of each power conversion device 41.

However, the method of generating a ΔP/ΔF characteristic is not limited to this method. For example, when a plurality of power conversion devices 41 are operated in the discharge mode, the ΔP/ΔF characteristic of power conversion device 41 corresponding to storage battery 40 with the smallest SOC is generated. Then, switching frequency ΔF0 is calculated from the generated ΔP/ΔF characteristic and used as switching frequency ΔF0 when a ΔP/ΔF characteristic is generated in power conversion device 41 corresponding to another storage battery 40.

Alternatively, when a plurality of power conversion devices 41 are operated in the charge mode, the ΔP/ΔF characteristic of power conversion device 41 corresponding to storage battery 40 with the largest SOC is generated. Then, switching frequency ΔF0 is calculated from the generated ΔP/ΔF characteristic and used as switching frequency ΔF0 when a ΔP/ΔF characteristic is generated in power conversion device 41 corresponding to another storage battery 40.

The ΔP/ΔF characteristic is generated in this way, whereby the ΔP/ΔF characteristic can be generated to be matched to storage battery 40 with the smallest SOC in the discharge mode, and the ΔP/ΔF characteristics can be generated to be matched to storage battery 40 with the largest SOC in the charge mode.

In the following, referring to FIG. 10 to FIG. 16, FIG. 33, FIG. 36, and FIG. 38 to FIG. 41, the operation of power conversion device 41 according to the second embodiment will be described. The operation of CEMS 31 is similar to the operation of CEMS 31 in the first embodiment and will not be further elaborated.

The operation of fourth control circuit 409 (FIG. 7) will now be described. FIG. 33 is a flowchart for explaining the operation of power conversion device 41. As illustrated in FIG. 33, upon start of the process, at S200, fourth control circuit 409 initializes various control parameters, in the same manner as in the first embodiment. Subsequently, at S201, fourth control circuit 409 collects the voltage values measured by voltmeters 401, 406, and 410, current values measured by ammeters 402, 407, and 411, and status information (SOC, etc.) of storage battery 40, and calculates the charge/discharge power and the amount of charge/discharge power of storage battery 40, based on the collected data.

The AC voltage of distribution system 24 measured by voltmeter 410 is input to AC frequency detecting circuit 81 (FIG. 11). At S202, AC frequency detecting circuit 81 detects a zero cross point in the waveform of AC voltage.

When a zero cross point is detected at S202 (YES at S202), at S203, phase detecting circuit 810 sets a zero cross point detection flag. If the process at S203 ends or if no zero cross point is detected at S202 (NO at S202), at S220, fourth control circuit 409 controls second DC/DC converter 403.

Figure 39:
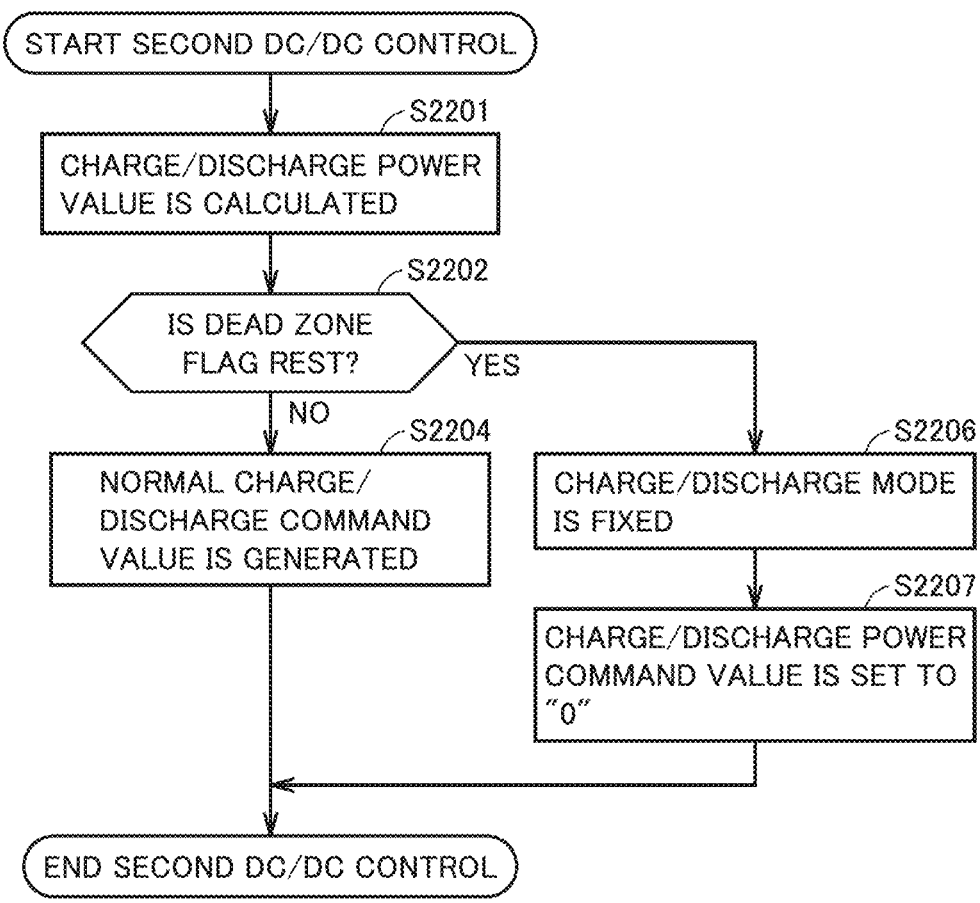
FIG. 39 is a flowchart for explaining the detail of a control process of the second DC/DC converter.

Referring to FIG. 10 and FIG. 39, control of second DC/DC converter 403 in power conversion device 41 according to the second embodiment will be described below.

As described above, since power conversion device 41 is equipped with virtual synchronous generator control, second DC/AC converter 408 is controlled as a voltage source. That is, second DC/AC converter 408 is voltage-controlled. Thus, the voltage on DC bus 405 is managed by second DC/DC converter 403. FIG. 39 is a flowchart for explaining the detail of a control process of second DC/DC converter 403.

At S2201, third control circuit 404 calculates a charge/discharge power value, based on the voltage on DC bus 405 detected by voltmeter 406 and the current detected by ammeter 407. At S2202, seventh control circuit 74 confirms whether notification of the dead zone flag is given from eighth control circuit 87 (FIG. 11) (whether the dead zone flag is set). If the dead zone flag is not set (NO at S2202), at S2204, third control circuit 404 generates a normal charge/discharge command value. On the other hand, if the dead zone flag is set (YES at S2202), at S2206, seventh control circuit 74 fixes the operation mode at present. Specifically, if the operation mode at present is the charge mode, the charge mode is maintained, and if it is the discharge mode, the discharge mode is maintained. Then, at S2207, seventh control circuit 74 sets the charge/discharge power command value to zero, which is output to second DC/DC converter 403. The control process of second DC/DC converter 403 then ends.

Figure 40:
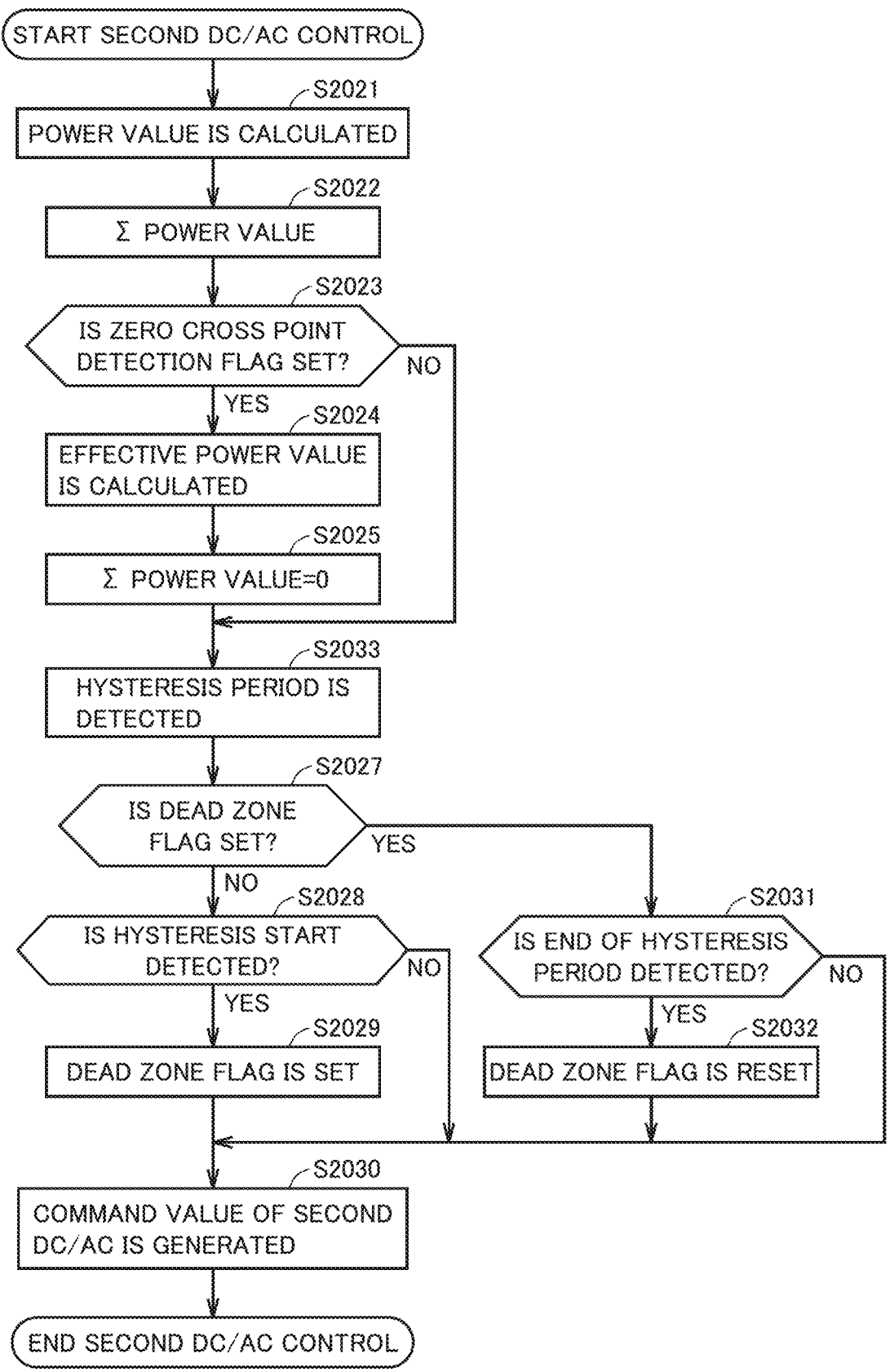
FIG. 40 is a flowchart for explaining the detail of a control process of the second DC/AC converter.

Returning to FIG. 33, when the control process of second DC/DC converter 403 is finished, at S204, fourth control circuit 409 controls second DC/AC converter 408. Referring to FIG. 11 and FIG. 40, control of second DC/AC converter 408 in the second embodiment will be described below.

Since power conversion device 41 is equipped with virtual synchronous generator control, second DC/AC converter 408 is controlled as a voltage source, in the same manner as in the first embodiment. That is, second DC/AC converter 408 is voltage-controlled. Therefore, when the power supplied to distribution system 24 is deficient, second DC/AC converter 408 is controlled to increase an output power. On the other hand, when the power supplied to distribution system 24 is excessive, second DC/AC converter 408 is controlled to decrease an output power.

FIG. 40 is a flowchart for explaining the detail of a control process of second DC/AC converter 408.

As illustrated in FIG. 40, at S2021, effective power calculating circuit 82 (FIG. 11) calculates a power value based on the measurement values of voltmeter 410 and ammeter 411, and at S2022, integrates the calculated power value. If the zero cross point detection flag is set (YES at S2023), effective power calculating circuit 82 proceeds to S2024 and stores the integrated value of effective power values for one cycle of AC voltage into a memory circuit (not shown) in eighth control circuit 87, and, at S2025, initializes the integrated value to zero.

If the process at S2025 ends or if the zero cross point detection flag is not set (NO at S2023), at S2033, dead zone period detecting circuit 90 detects a dead zone period. In the second embodiment, dead zone period detecting circuit 90 detects a hysteresis period. Specifically, dead zone period detecting circuit 90 detects a hysteresis period, based on the system frequency information detected by AC frequency detecting circuit 81, and the upper limit frequency and the lower limit frequency of the hysteresis calculated by switching frequency calculating circuit 89.

Figure 41:
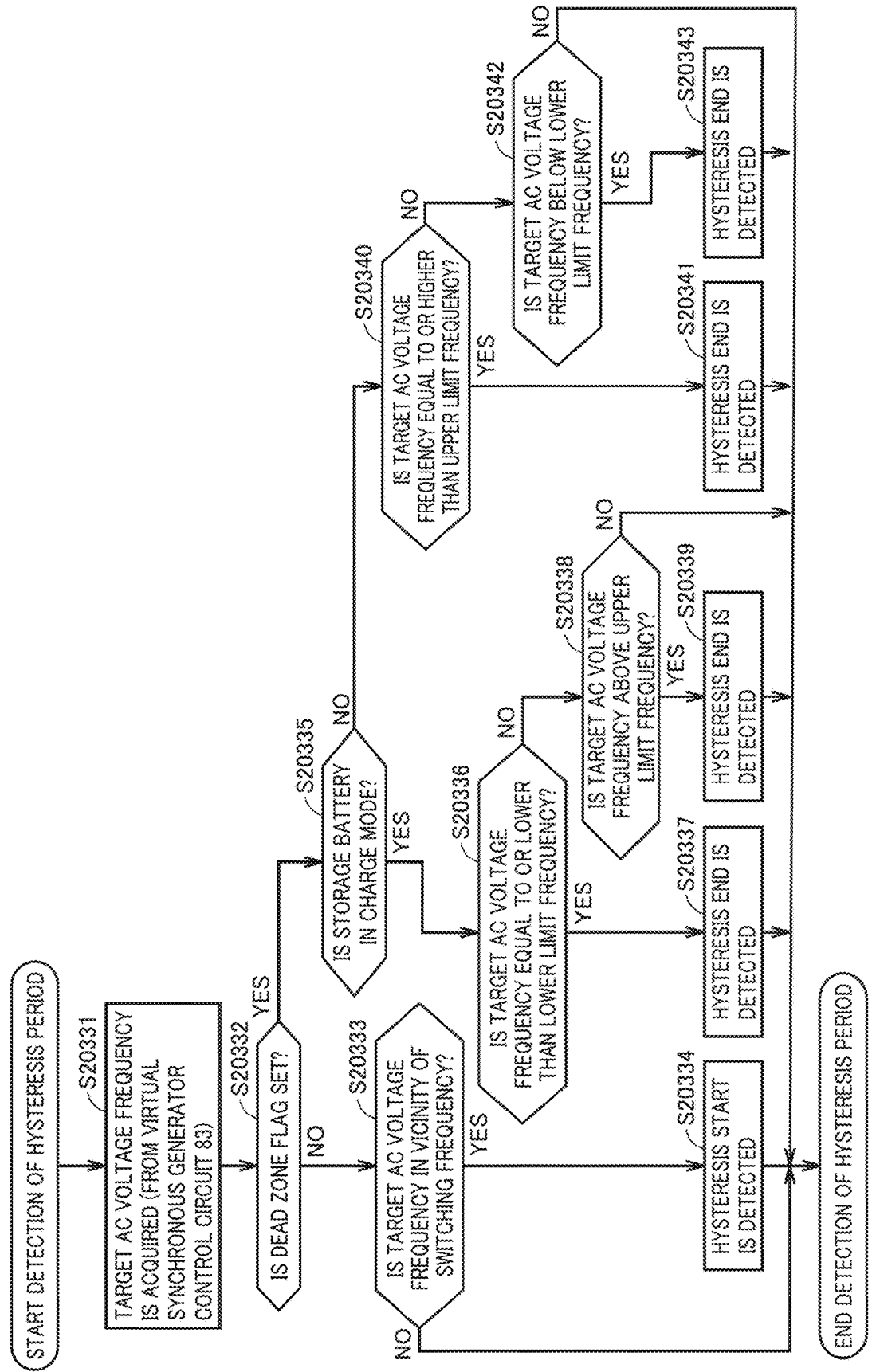
FIG. 41 is a flowchart for explaining the detail of a process of detecting a hysteresis period.

FIG. 41 is a flowchart for explaining the detail of a process of detecting a hysteresis period. Upon start of the process, dead zone period detecting circuit 90 detects a hysteresis period, based on switching frequency ΔF0 output from switching frequency calculating circuit 89, the upper limit frequency and the lower limit frequency of the hysteresis, and the frequency information of target AC voltage used when second DC/AC converter 408 is operated by voltage control. In the second embodiment, a hysteresis period is detected based on the frequency information of target AC voltage used when second DC/AC converter 408 is voltage-controlled. However, embodiments are not limited thereto. For example, similar effects can be achieved by control using the detection result of the system frequency output from AC frequency detecting circuit 81, in the same manner as in the first embodiment.

As illustrated in FIG. 41, upon start of the process, at S20331, dead zone period detecting circuit 90 acquires the frequency information of target AC voltage output from virtual synchronous generator control circuit 83. Subsequently, at S20332, dead zone period detecting circuit 90 confirms whether a hysteresis has already been detected and the dead zone flag is set. If the dead zone flag is not set (NO at S20332), at S20333, it is confirmed whether the frequency of target AC voltage is in the vicinity of switching frequency $\Delta F0$ of the storage battery (that is, in the vicinity of the frequency of the hysteresis). In the second embodiment, control is performed assuming that the start of a hysteresis period is detected within a range of switching frequency $\Delta F0 \pm 0.01 \times \Delta Fmax$, in consideration of the influence of variations in sampling phase of voltmeter 410.

If the frequency of target AC voltage is in the vicinity of switching frequency $\Delta F0$ (YES at S20333), at S20334, the start of a hysteresis period is detected. If the frequency of target AC voltage is not in the vicinity of switching frequency $\Delta F0$ (NO at S20333), or if the start of a hysteresis period is detected at S20334, the process of detecting a hysteresis period ends.

On the other hand, if the dead zone flag is set (YES at S20332), at S20335, dead zone period detecting circuit 90 confirms whether storage battery 40 is in the charge mode. Unlike the first embodiment, in the second embodiment, a hysteresis is imparted to the $\Delta P/\Delta F$ characteristic, rather than a dead zone. Thus, the determination of the end of hysteresis period differs depending on whether storage battery 40 is in the charge mode or the discharge mode. Referring to FIG. 38A to FIG. 38C, the concept of a specific condition of the end of a hysteresis will be described.

FIG. 38A illustrates a $\Delta P/\Delta F$ characteristic in a case where power target value Pref given from CEMS 31 is a positive value (discharge). As illustrated in FIG. 38A, when second DC/AC converter 408 is in the discharge mode, $\Delta P$ is fixed at a point of time in the vicinity of $\Delta P=-$Pref (a point of time in the vicinity of $\Delta F=\Delta F0$), and the output of second DC/AC converter 408 is set to "zero". The output of second DC/AC converter 408 is set to "zero" until $\Delta F$ of the system voltage exceeds the hysteresis width (hysteresis width when discharge is switched to charge). In doing so, the dead zone flag is set. When $\Delta F$ is within the hysteresis width, the generated power of mega-solar plant 26 decreases to cause a deficit of power supplied to the system, and then when $\Delta F$ decreases and falls below switching frequency $\Delta F0$, the dead zone flag is reset and power conversion device 41 operates in the discharge mode. On the other hand, when $\Delta F$ exceeds the upper limit frequency of the hysteresis, $\Delta P$ is set to a value indicated by the $\Delta P/\Delta F$ characteristic given from CEMS 31, and second DC/AC converter 408 is operated in the charge mode.

Similarly, when second DC/AC converter 408 is in the charge mode, $\Delta P$ is fixed at a point of time in the vicinity of $\Delta P=-$Pref (a point of time in the vicinity of $\Delta F=\Delta F0$), and the output of second DC/AC converter 408 is set to "zero". The output of second DC/AC converter 408 is set to "zero" until $\Delta F$ of the system voltage falls below the hysteresis width (hysteresis width when charge is switched to discharge). In doing so, the dead zone flag is set. When $\Delta F$ is within the hysteresis width, the generated power of mega-solar plant 26 increases to cause an excess of power supplied to the system, and then when $\Delta F$ increases and goes above switching frequency $\Delta F0$, the dead zone flag is reset and power conversion device 41 operates in the charge mode. On the other hand, when $\Delta F$ falls below the lower limit frequency of the hysteresis, $\Delta P$ is set to a value indicated by the $\Delta P/\Delta F$ characteristic given from CEMS 31, and second DC/AC converter 408 is operated in the discharge mode.

FIG. 38B illustrates a $\Delta P/\Delta F$ characteristic in a case where power target value Pref given from CEMS 31 is a negative value (charge). As illustrated in FIG. 38B, when second DC/AC converter 408 is in the charge mode, $\Delta P$ is fixed at a point of time in the vicinity of $\Delta P=$Pref (a point of time in the vicinity of $\Delta F=\Delta F0$), and the output of second DC/AC converter 408 is set to "zero". The output of second DC/AC converter 408 is set to "zero" until $\Delta F$ of the system voltage falls below the hysteresis width (hysteresis width when charge is switched to discharge). In doing so, the dead zone flag is set. When $\Delta F$ is within the hysteresis width, the generated power of mega-solar plant 26 increases to cause an excess of power supplied to the system, and $\Delta F$ increases and goes above switching frequency $\Delta F0$, the dead zone flag is reset and power conversion device 41 operates in the charge mode. On the other hand, when $\Delta F$ falls below the lower limit frequency of the hysteresis, $\Delta P$ is set to a value indicated by $\Delta P/\Delta F$ characteristic given from CEMS 31, and second DC/AC converter 408 is operated in the discharge mode.

Similarly, when second DC/AC converter 408 is in the discharge mode, $\Delta P$ is fixed at a point of time in the vicinity of $\Delta P=$Pref (a point of time in the vicinity of $\Delta F=\Delta F0$), and the output of second DC/AC converter 408 is set to "zero". The output of second DC/AC converter 408 is set to "zero" until $\Delta F$ of the system voltage goes above the upper limit frequency of the hysteresis width (hysteresis width when discharge is switched to charge). In doing so, the dead zone flag is set. When $\Delta F$ is within the hysteresis width, the generated power of mega-solar plant 26 decreases to cause a deficit of power supplied to the system, and then when $\Delta F$ decreases and falls below switching frequency $\Delta F0$, the dead zone flag is reset and power conversion device 41 operates in the discharge mode. On the other hand, when $\Delta F$ goes above the upper limit frequency of the hysteresis, $\Delta P$ is set to a value indicated by the $\Delta P/\Delta F$ characteristic given from CEMS 31, and second DC/AC converter 408 is operated in the charge mode.

FIG. 38C illustrates a $\Delta P/\Delta F$ characteristic in a case where the power target value given from CEMS 31 is substantially zero (charge/discharge mode). As illustrated in FIG. 38C, when second DC/AC converter 408 is in the charge mode, $\Delta P$ is fixed at a point of time in the vicinity of $\Delta P=0$ (a point of time in the vicinity of $\Delta F=\Delta F0=0$), and the output of second DC/AC converter 408 is set to "zero". The output of second DC/AC converter 408 is set to "zero" until $\Delta F$ of the system voltage falls below the lower limit frequency of the hysteresis width (hysteresis width when charge is switched to discharge). In doing so, the dead zone flag is set. When $\Delta F$ is within the hysteresis width, the generated power of mega-solar plant 26 increases to cause an excess of power supplied to the system, and then when $\Delta F$ increases and goes above switching frequency $\Delta F0$, the dead zone flag is reset and power conversion device 41 operates in the charge mode. On the other hand, when ΔF falls below the lower limit frequency of the hysteresis, ΔP is set to a value indicated by the ΔP/ΔF characteristic given from CEMS 31, and second DC/AC converter 408 is operated in the discharge mode.

Similarly, when second DC/AC converter 408 is in the discharge mode, ΔP is fixed at a point of time in the vicinity of ΔP=0 (a point of time in the vicinity of ΔF=ΔF0=0), and the output of second DC/AC converter 408 is set to "zero". The output of second DC/AC converter 408 is set to "zero" until ΔF of the system voltage goes above the upper limit frequency of the hysteresis width (hysteresis width when discharge is switched to charge). In doing so, the dead zone flag is set. When ΔF is within the hysteresis width, the generated power of mega-solar plant 26 decreases to cause a deficit of power supplied to the system, and then when ΔF decreases and falls below switching frequency ΔF0, the dead zone flag is reset and power conversion device 41 operates in the discharge mode. On the other hand, when ΔF goes above the upper limit frequency of the hysteresis width, ΔP is set to a value indicated by the ΔP/ΔF characteristic given from CEMS 31, and second DC/AC converter 408 is operated in the charge mode.

Returning to FIG. 41, if storage battery 40 is in the charge mode at S20335 (YES at S20335), at S20336, dead zone period detecting circuit 90 confirms whether the frequency of target AC voltage is equal to or lower than the lower limit frequency of the hysteresis. If the frequency of target AC voltage is equal to or lower than the lower limit frequency of the hysteresis (YES at S20336), at S20337, dead zone period detecting circuit 90 determines that the end of the hysteresis period is detected, and terminates the process. On the other hand, if the frequency of target AC voltage is higher than the lower limit frequency of the hysteresis (NO at S20336), at S20338, dead zone period detecting circuit 90 confirms whether the frequency of target AC voltage goes above the upper limit frequency of the hysteresis. If the frequency of target AC voltage is above the upper limit frequency of the hysteresis (YES at S20338), at S20339, dead zone period detecting circuit 90 determines that the end of hysteresis is detected, and terminates the process. If the frequency of target AC voltage is equal to or lower than the upper limit frequency of the hysteresis (NO at S20338), dead zone period detecting circuit 90 terminates the process.

On the other hand, if storage battery 40 is in the discharge mode (NO at S20335), at S20340, dead zone period detecting circuit 90 confirms whether the frequency of target AC voltage is equal to or higher than the upper limit frequency of the hysteresis. If the frequency of target AC voltage is equal to or higher than the upper limit frequency of the hysteresis (YES at S20340), at S20341, dead zone period detecting circuit 90 determines that the end of hysteresis is detected, and terminates the process. On the other hand, if the frequency of target AC voltage is lower than the upper limit frequency of the hysteresis (NO at S20340), at S20342, dead zone period detecting circuit 90 confirms whether the frequency of target AC voltage falls below the lower limit frequency of the hysteresis. If the frequency of target AC voltage falls below the lower limit frequency of the hysteresis (YES at S20342), at S20343, dead zone period detecting circuit 90 determines that the end of hysteresis is detected, and terminates the process. If the frequency of target AC voltage is equal to or lower than the lower limit frequency of the hysteresis (NO at S20342), dead zone period detecting circuit 90 terminates the process.

Returning to FIG. 40, when the process of detecting a hysteresis period ends (S2033), at S2027, eighth control circuit 87 confirms whether the dead zone flag is set. If the dead zone flag is not set (NO at S2027), at S2028, eighth control circuit 87 confirms whether the start of hysteresis is detected. In the second embodiment, the start of hysteresis is detected using the frequency of target AC voltage output from virtual synchronous generator control circuit 83. It can also be detected by the detection result of frequency output from AC frequency detecting circuit 81 or by whether the absolute value of charge/discharge power of storage battery 40 is equal to or less than a prescribed value, in the same manner as in the first embodiment.

Upon detection of the start of hysteresis (YES at S2028), at S2029, dead zone period detecting circuit 90 sets the dead zone flag in a not-shown register.

If the dead zone flag is set (YES at S2027), at S2031, dead zone period detecting circuit 90 confirms whether the end of hysteresis is detected. If the end of hysteresis has been detected (YES at S2031), dead zone period detecting circuit 90 resets the dead zone flag in a not-shown register.

If the start of hysteresis is not detected (NO at S2028) or if the end of hysteresis is not detected (S2031), or if the dead zone flag is set (S2029) or the dead zone flag is reset (S2032), at S2030, fourth control circuit 409 generates a control command value for controlling second DC/AC converter 408. The generation of a control command value by inverter voltage control circuit 85 is similar to the process described in the first embodiment and will not be further elaborated.

Returning to FIG. 33, upon generating a control command value of second DC/AC converter 408 at S204, at S205, virtual synchronous generator control circuit 83 (FIG. 11) executes virtual synchronous generator control. In the second embodiment, the one cycle of the AC voltage is set as the control period in the same manner as in the first embodiment. The control period may be an integer multiple of one cycle of AC voltage or a predetermined period such as a one second period.

FIG. 14 is a block diagram illustrating a configuration of virtual synchronous generator control circuit 83. Upon determining that the control timing has come, eighth control circuit 87 (FIG. 11) instructs virtual synchronous generator control circuit 83 to generate information on frequency and phase to be used in voltage control. In the second embodiment, the frequency and phase of a sine wave generated by third sine wave generating circuit 851 (FIG. 13) in inverter voltage control circuit 85 are updated at the zero cross point, in the same manner as in the first embodiment. Therefore, in the second embodiment, the control period is the period of the zero cross point detected by AC frequency detecting circuit 81. The operation of virtual synchronous generator control circuit 83 is the same as the operation described in the first embodiment and will not be further elaborated.

Returning to FIG. 33, when the process of virtual synchronous generator control ends at S205, at S206, fourth control circuit 409 confirms whether a transmission request for measurement data has been received from CEMS 31. If a transmission request has been received from CEMS 31 (YES at S206), at S207, eighth control circuit 87 (FIG. 11) notifies CEMS 31 of measurement data via communication I/F 412 (FIG. 7).

On the other hand, if notification of measurement data is given at S207 or if a transmission request has not been received from CEMS 31 (NO at S206), eighth control circuit 87 proceeds to S208 and confirms whether control information has been received from CEMS 31.

If control information has been received from CEMS 31 (YES at S208), at S209, eighth control circuit 87 sets a control information reception flag. If the process at S209 ends or if control information has not been received from CEMS 31 (NO at S208), at S210, eighth control circuit 87 confirms whether the zero cross point detection flag is set. If the zero cross point detection flag is not set (NO at S210), the process returns to S201.

On the other hand, if the zero cross point detection flag is set (YES at S210), at S211, second sine wave generating circuit 812 (FIG. 12) takes in information on frequency and phase of the system voltage and, at S212, resets the zero cross point detection flag.

Upon resetting the zero cross point detection flag at S212, at S213, second sine wave generating circuit 812 updates the information on frequency and phase of the system voltage to the information taken in at S211.

Upon completion of the process at S213, at S214, eighth control circuit 87 confirms whether control information has been received from CEMS 31 (whether the control information reception flag is set). If the reception flag is not set (NO at S214), the process returns to S201.

On the other hand, if the reception flag is set (YES at S214), at S215, eighth control circuit 87 replaces each of the frequency target value (reference frequency Fref) and power target value Pref with the received data.

At S216, control parameter generating circuit 88 generates control parameters (speed adjustment rate Kgd, damping coefficient Dg, and inertia constant M) of virtual synchronous generator control. FIG. 36 is a flowchart illustrating a process of generating control parameters (S216 in FIG. 33). In the second embodiment, a case where the slope of the ΔP/ΔF characteristic is input from CEMS 31 as information necessary for generating control parameters of virtual synchronous generator control in the same manner as the first embodiment will be described. In the second embodiment, control parameters are generated using system information (reference frequency Fref, power target value Pref, ΔFmax information) and inverter capacity Cinv, as information necessary for generating control parameters, in addition to the slope of the ΔP/ΔF characteristic, in the same manner as in the first embodiment.

As illustrated in FIG. 36, upon starting generation of control parameters, at S2161, control parameter generating circuit 88 initializes speed adjustment rate Kgd and damping coefficient Dg by setting each of speed adjustment rate Kgd and damping coefficient Dg to a predetermined initial value. At S2162, control parameter generating circuit 88 calculates the slope of the ΔP/ΔF characteristic, using speed adjustment rate Kgd and damping coefficient Dg. In the second embodiment, a case where a virtual synchronous generator model that mimics the operation of virtual synchronous generator control circuit 83 (FIG. 11) is implemented in control parameter generating circuit 88 (FIG. 11) and control parameters are generated using this model, in the same manner as in the first embodiment, will be described.

At S2162, control parameter generating circuit 88 inputs the set speed adjustment rate Kgd and damping coefficient Dg to a virtual synchronous generator model to calculate the slope of the ΔP/ΔF characteristic.

Upon calculating the slope of the ΔP/ΔF characteristic at S2162, at S2163, control parameter generating circuit 88 compares the calculated slope of the ΔP/ΔF characteristic with the slope of the ΔP/ΔF characteristic generated at S0563 (FIG. 30) in FIG. 28. Specifically, control parameter generating circuit 88 confirms whether the deviation between these two slopes of the ΔP/ΔF characteristics falls within a predetermined permissible range.

If the deviation between the slopes falls within the permissible range, control parameter generating circuit 88 determines that the two slopes of the ΔP/ΔF characteristics agree (YES at S2163) and proceeds to S2169.

On the other hand, if the deviation between the slopes does not fall within the permissible range, control parameter generating circuit 88 determines that the two slopes of the ΔP/ΔF characteristics do not agree (NO at S2163). In this case, control parameter generating circuit 88 proceeds to S2164 and changes damping coefficient Dg. Control parameter generating circuit 88 adds a prescribed value to damping coefficient Dg at present.

Upon changing damping coefficient Dg at S2164, at S2165, control parameter generating circuit 88 confirms whether damping coefficient Dg falls within a predetermined prescribed range. If damping coefficient Dg falls within the prescribed range (YES at S2165), control parameter generating circuit 88 returns to S2162 and calculates the slope of the ΔP/ΔF characteristic using the changed damping coefficient Dg.

On the other hand, if damping coefficient Dg falls outside the prescribed range (NO at S2165), control parameter generating circuit 88 determines that speed adjustment rate Kgd at present does not provide an appropriate characteristic and, at S2166, returns damping coefficient Dg to an initial value and changes speed adjustment rate Kgd. Specifically, control parameter generating circuit 88 adds a prescribed value to speed adjustment rate Kgd at present (initial value).

Upon changing speed adjustment rate Kgd at S2166, at S2167, control parameter generating circuit 88 confirms whether speed adjustment rate Kgd falls within a predetermined prescribed range. If speed adjustment rate Kgd falls outside the prescribed range (NO at S2167), control parameter generating circuit 88 proceeds to S2168 and sets speed adjustment rate Kgd and damping coefficient Dg to respective default values prepared in advance, because appropriate speed adjustment rate Kgd and damping coefficient Dg fail to be obtained. The process proceeds to S2169.

On the other hand, if speed adjustment rate Kgd falls within a prescribed range at S2167 (YES at S2167), control parameter generating circuit 88 returns to S2162 and calculates the slope of the ΔP/ΔF characteristic using the changed speed adjustment rate Kgd and damping coefficient Dg. Control parameter generating circuit 88 repeats the process at S2162 to S2167 until the determination is YES at S2163 or until the determination is NO at S2167. In the second embodiment, damping coefficient Dg and speed adjustment rate Kgd are calculated from the relation between damping coefficient Dg and the frequency of AC system voltage illustrated in FIG. 19, in the same manner as in the first embodiment.

Upon setting of speed adjustment rate Kgd and damping coefficient Dg, at S2169, control parameter generating circuit 88 calculates inertia constant M. Inertia constant M is calculated based on the response time required for virtual synchronous generator control. Specifically, the response performance of virtual synchronous generator control is determined by governor time constant Tg in governor control circuit 833 (FIG. 14) and time constant M/Dg in mass system computing circuit 837 (FIG. 14) obtained by the swing equation. In the second embodiment, since a default value of governor time constant Tg is used and governor time constant Tg is not generated, only the time constant of mass system computing circuit 837 is controlled, in the same manner as in the first embodiment. The time constant of mass system computing circuit 837 is obtained by M/Dg from the above expression (3). Therefore, inertia constant M is calculated by multiplying the time constant of mass system computing circuit 837 defined by a default value by damping coefficient Dg.

Upon calculation of inertia constant M at S2069, at S2170, control parameter generating circuit 88 calculates a hysteresis frequency. FIG. 37 is a flowchart illustrating a process of calculating a hysteresis frequency (S2170 in FIG. 36).

As illustrated in FIG. 37, upon start of the process, at S21701, control parameter generating circuit 88 acquires power target value Pref. Further, at S21702, control parameter generating circuit 88 acquires the dead zone width information given from CEMS 31. At S21703, switching frequency calculating circuit 89 calculates switching frequency $\Delta F0$ at which charge/discharge of storage battery 40 is switched, using the $\Delta P/\Delta F$ characteristic output from control parameter generating circuit 88 and the power target value Pref given from eighth control circuit 87. Specifically, switching frequency calculating circuit 89 calculates $\Delta F$ at which $\Delta P=-Pref$ in the $\Delta P/\Delta F$ characteristic, as switching frequency $\Delta F0$.

Upon calculation of switching frequency $\Delta F0$ at S21703, at S21704, switching frequency calculating circuit 89 calculates the upper limit frequency and the lower limit frequency of the hysteresis, using switching frequency $\Delta F0$ and the dead zone width information acquired at S21702. Specifically, the slope of $\Delta P/\Delta F$ characteristic$=-Pref/\Delta F0$. Therefore, switching frequency $\Delta F0$ is $-Pref/(\text{the slope of the } \Delta P/\Delta F \text{ characteristic})$.

As illustrated in FIG. 38A to FIG. 38B, when storage battery 40 is switched from discharge to charge, the lower limit frequency of the hysteresis is set to $\Delta F0$, and the upper limit frequency of the hysteresis is set to $\Delta F0+\text{hysteresis}$ width. On the other hand, when storage battery 40 is switched from charge to discharge, the upper limit frequency of the hysteresis is set to $\Delta F0$, and the lower limit frequency of the hysteresis is set to $\Delta F0-\text{hysteresis}$ width. Switching frequency calculating circuit 89 outputs the calculated upper limit frequency and lower limit frequency of the hysteresis to dead zone period detecting circuit 90 and terminates the process of generating control parameters.

Returning to FIG. 33, upon completion of calculation of control parameters for virtual synchronous generator control (speed adjustment rate Kgd, damping coefficient Dg, and inertia constant M) at S216, control parameter generating circuit 88 notifies eighth control circuit 87 of it and outputs the calculated control parameters to eighth control circuit 87.

Upon receiving the calculated control parameters, eighth control circuit 87 outputs the control parameters to virtual synchronous generator control circuit 83 for updating. Upon completion of updating of the control parameters, at S217, eighth control circuit 87 clears (resets) the register (not shown) with the reception flat set and returns to S201.

As explained above, in the distributed power source system according to the second embodiment, when the generated power of energy creation devices and the power consumption of loads balance due to fluctuations in power consumption of loads or fluctuations in solar radiation, the power conversion device is controlled such that supply power to a distributed power source such as storage battery or supply power from a distributed power source becomes zero. Thus, unnecessary charge/discharge and repeated charge/discharge among a plurality of distributed power sources due to sensor errors of voltmeters and ammeters can be suppressed, so that the power loss due to unnecessary charge/discharge and the progress of deterioration of storage batteries can be suppressed.

Furthermore, as a method of creating a $\Delta P/\Delta F$ characteristic in a case where a plurality of power conversion devices having static inverters equipped with virtual synchronous generator control are connected to a system, first, assuming that a plurality of power conversion devices 41 for which a power target value is to be generated are a single power conversion device, a reference $\Delta P/\Delta F$ characteristic is generated, and then switching frequency $\Delta F0$ at which charge/discharge is switched is calculated using the generated reference $\Delta P/\Delta F$ characteristic and the total of power target values of a plurality of power conversion devices 41. Then, the $\Delta P/\Delta F$ characteristic of each power conversion device 41 is generated using the switching frequency $\Delta F0$ and the power target value. According to this method, the drooping characteristic ($\Delta P/\Delta F$ characteristic) with the same switching frequency $\Delta F0$ among a plurality of target power conversion devices 41 can be applied to each power conversion device 41. A hysteresis is imparted to the drooping characteristic applied to each power conversion device 41, whereby the static inverter is controlled using the drooping characteristic with the dead zone when the power consumption of consumer loads and the generated power of energy creation devices balance. According to this method, even when voltmeters and ammeters have sensor errors, unnecessary charge/discharge or repeated charge/discharge among a plurality of distributed power sources (storage batteries) can be suppressed. As a result, power loss due to unnecessary charge/discharge and damage to storage batteries can be suppressed.

As explained above, according to the first and second embodiments, in distribution system 24 in which a plurality of power conversion devices 41 having static inverters equipped with virtual synchronous generator control are installed, a dead zone or a hysteresis is imparted to the drooping characteristic ($\Delta P/\Delta F$ characteristic) in the vicinity of switching of charge/discharge of storage battery 40, whereby when the power consumption of consumer loads and the generated power of energy creation devices such as mega-solar plant 26 balance and charge/discharge from storage battery 40 is unnecessary, unnecessary charge/discharge or repeated charge/discharge among a plurality of storage batteries can be suppressed, in spite of sensor errors of voltmeters and ammeters. This can suppress power loss due to unnecessary charge/discharge and damage to storage batteries.

According to the first and second embodiments, when an operation plan (power target value) is created for power conversion device 41 for a storage battery, control parameters for virtual synchronous generator control (specifically, the slope of the $\Delta P/\Delta F$ characteristic) are generated, based on the capacity of the static inverter in each power conversion device 41 and switching frequency $\Delta F0$ calculated based on the power target value. With this configuration, the frequency at which the dead zone (or hysteresis) is started in each power conversion device 41 can be equalized among a plurality of power conversion devices 41.

As an example of the drooping characteristic ($\Delta P/\Delta F$ characteristic) with a dead zone or a hysteresis, the characteristics illustrated in FIG. 24A to FIG. 24C and FIG. 38A to FIG. 38C have been described. However, embodiments are not limited thereto. For example, the dead zone (or hysteresis) when charge is switched to discharge and the dead zone (or hysteresis) when discharge is switched to charge may vary, for example, in accordance with the SOC of storage battery 40. For example, when the SOC is low, the dead zone (or hysteresis) is imparted such that charge is given priority, and when the SOC is high, the dead zone (or hysteresis) is imparted such that discharge is given priority.

Furthermore, in the first and second embodiments, the start of dead zone (or hysteresis) is detected using switching of charge/discharge of storage battery 40, or the frequency of AC voltage target value output from virtual synchronous generator control circuit 83. However, embodiments are not limited to this configuration. For example, similar effects can be achieved by control using the detection result of AC frequency of the system voltage output from AC frequency detecting circuit 81.

The upper limit frequency and the lower limit frequency of the dead zone (or hysteresis) are calculated in CEMS 31, based on the inverter capacity of second DC/AC converter 408 of power conversion device 41 and the SOC of storage battery 40. However, embodiments are not limited to this configuration. For example, the upper limit frequency and the lower limit frequency may be set to predetermined values.

The width of dead zone (or hysteresis) may be generated not by CEMS 31 but by each power conversion device 41 based on the inverter capacity of second DC/AC converter 408 and the SOC of storage battery 40, and this configuration can achieve similar effects.

In the first and second embodiments, virtual synchronous generator control is implemented in power conversion device 41. However, embodiments are not limited thereto. Similar effects can be achieved, for example, even when virtual synchronous generator control is implemented in an energy creation device such as a wind generator, as a matter of course. In particular, a wind generator has propellers to rotate a motor and therefore the power generator has an inertial force, thereby achieving similar effects, as a matter of course.

In the first and second embodiments, distribution system 24 equipped with a plurality of large-capacity storage batteries such as storage batteries 40 has been described. However, virtual synchronous generator control may be implemented in a power conversion device for home storage batteries or a power conversion device for electric vehicles to perform control similar to CEMS 31, as a matter of course. In this case, hundreds of power conversion devices are to be connected to distribution system 24. Further, in terms of storage battery capacity, similar effects can be achieved when large-capacity storage batteries such as storage batteries 40 (for example, a few hundred kW to a few MW) and home storage batteries (a few kW) are disposed, as a matter of course.

In the first and second embodiments, power conversion device 41 has been described. However, embodiments are not limited thereto. Even in a case where virtual synchronous generator control is implemented in a such a system that supplies the generated power from solar batteries (which are not limited to mega-solar plants and may be home solar batteries), wind generators, and/or fuel cells to a system, in which static inverters are controlled as voltage sources, similar effects can be achieved by a configuration that generates control parameters for virtual synchronous generator control similarly, as a matter of course. Furthermore, vehicle-mounted storage batteries on electric vehicles (EVs), plug-in hybrid electric vehicles (PHEVs), or fuel cell vehicles (FCVs) can be used.

In the first and second embodiments, the technology in the present disclosure is applied to a distribution system. However, embodiments are not limited thereto. Similar effects can be achieved by applying the technology in the present disclosure to power transmission systems or independent micro-grids. Further, the first and second embodiments have been described, taking three-phase alternating current as an example. However, embodiments are not limited thereto. Single-phase alternating current or single-phase three-wire alternating current may be employed, as a matter of course. Further, even when power conversion devices for system storage batteries (three-phase alternating current) and storage battery systems for home use (single-phase alternating current) coexist, similar effects can be achieved by a configuration that generates control parameters for virtual synchronous generator control similarly, as a matter of course.

In the first and second embodiments, the capacity of the static inverter and the power target value are used in calculation when control parameters for virtual synchronous generator control are generated for the static inverter in power conversion device 41. However, embodiments are not limited thereto. When the ratio of the storage capacity of the storage battery to the capacity of the static inverter varies, for example, when the storage battery capacity of storage battery 40a is twice as large as the capacity of the static inverter in power conversion device 41a and the storage battery capacity of storage battery 40b is three times as large as the capacity of the static inverter in power conversion device 41b, the operation plan (power target value) is generated in consideration of the capacity ratio, or the capacity ratio is considered when information necessary for generating control parameters for virtual synchronous generator control is generated, thereby achieving similar effects, as a matter of course.

In the first and second embodiments, when control parameters for virtual synchronous generator control are generated in CEMS 31, control parameters are generated in CEMS 31 and the information transmitted is the power target value as well as the system information and the slope of the $\Delta P/\Delta F$ characteristic (or information necessary for generating control parameters). However, embodiments are not limited thereto. Similar effects can be achieved by a configuration in which at least information that enables generation of control parameters in a power conversion device with virtual synchronous generator control connected to distribution system 24, and information necessary for setting a dead zone (or hysteresis) are transmitted from CEMS 31, as a matter of course.

In the first and second embodiments, when control parameter of the virtual synchronous generator control unit are determined, a virtual synchronous generator model is contained, or alternatively, the relation between damping coefficient Dg and the frequency illustrated in FIG. 19 is stored as table data for a plurality of values of speed adjustment rate Kgd, and a combination of speed adjustment rate Kgd and damping coefficient Dg that substantially agrees with the slope of the $\Delta P/\Delta F$ characteristic is searched for, based on $\Delta F_{max}$ information, or alternatively, the relation between speed adjustment rate Kgd and the frequency illustrated in FIG. 18 is stored as table data for a plurality of values of damping coefficient Dg, and a combination of speed adjustment rate Kgd and damping coefficient Dg that substantially agrees with the slope of the $\Delta P/\Delta F$ characteristic is searched for, based on $\Delta F_{max}$ information. However, embodiments are not limited thereto. For example, the virtual synchronous generator control unit may be contained in the form of mathematical model or any other method may be employed, as a matter of course.

Further, in the first and second embodiments, when control parameters for virtual synchronous generator control are determined, the $\Delta P/\Delta F$ characteristic is generated. However, embodiments are not limited thereto. For example, a distribution system model (digital twin) below substation 20 is implemented in CEMS 31, and information necessary for calculating control parameters is generated such that the operation is optimized in a conceivable use case using the distribution system model. Further, AI may be implemented to calculate the control parameters.

In the first and second embodiments, the communication period between CEMS 31 and DSO 21 is 30 minutes, and the communication period between CEMS 31 and each power conversion device 41 is 5 minutes. However, embodiments are not limited thereto. For example, the communication period between CEMS 31 and each power conversion device 41 may be 1 minute or may be even further shorter, as a matter of course.

In the first and second embodiments, the governor model in governor control circuit 833 is made as a first-order lag system. However, similar effects can be achieved by a second-order lag system or a low pass filter (LPF), as a matter of course.

Further, in the first and second embodiments, the mass system computing circuit is modeled with the integrator and the feedback loop illustrated in FIG. 16. However, embodiments are not limited thereto. For example, it may be modeled with a first-order lag system, a second-order lag system, or an LPF, as a matter of course.

Further, in the first and second embodiments, VQ control, which is often carried out in virtual synchronous generator control, is not described for simplicity of explanation. However, the present method may be employed in a power conversion device equipped with VQ control as virtual synchronous generator control to achieve similar effects, as a matter of course. Further, the configuration of mass system computing circuit 837 is not limited to the configuration illustrated in FIG. 16.

Description of Modifications

In the first and second embodiments, for ease of explanation, the control circuits of power conversion device 27 for a mega-solar plant and power conversion device 41 for a storage battery have the configurations illustrated in FIG. 6 to FIG. 16, and CEMS 31 is configured by hardware (H/W) as illustrated in FIGS. 3 to 5. However, the functions of each block or some blocks that are depicted in the blocks may be implemented by software (S/W) implemented on a central processing unit (CPU) to achieve similar control functions. Alternatively, the functions of at least some blocks may be divided into software and hardware to implement similar control functions.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

11 communication circuit, 12 memory circuit, 13, 88 control parameter generating circuit, 14 operation plan creating circuit, 15 transmission data generating circuit, 16 control circuit, 20 substation, 21 distribution automation system (DSO), 22, 201, 206, 210, 401, 406, 410 voltmeter, 23 step voltage regulator (SVR), 24 distribution system, 25 communication line, 26 mega-solar plant, 27 power conversion device for mega-solar plant, 28 switch, 29 impedance, 30 synchronous generator, 31 CEMS, 40, 40a to 40c system storage battery, 41, 41a to 40c power conversion device for storage battery, 51 MPPT control circuit, 52 voltage control circuit, 53 first switching circuit, 54 fifth control circuit, 60 current control circuit, 61, 810 phase detecting circuit, 62 first sine wave generating circuit, 63, 66, 101, 832, 836, 852 subtractor, 64 first PI control circuit, 65, 91, 103 multiplier, 67 sixth control circuit, 68 second PI control circuit, 69 first PWM converter, 71 charge control circuit, 72 discharge control circuit, 73 second switching circuit, 74 seventh control circuit, 81 AC frequency detecting circuit, 82 effective power calculating circuit, 83 virtual synchronous generator control circuit, 84 inverter current control circuit, 85 inverter voltage control circuit, 86 third switching circuit, 87 eighth control circuit, 89 switching frequency calculating circuit, 90 dead zone period detecting circuit, 92 first-order lag system model, 93 limiter circuit, 102 integrator, 104 divider, 105, 835 adder, 106 phase calculating circuit, 100a to 100d town, 110 factory, 135 third management circuit, 131 reference ΔP/ΔF characteristic calculating circuit, 132 ΔP/ΔF characteristic calculating circuit, 136 control circuit, 141 storage battery operation plan creating circuit, 142 power generation predicting circuit, 143 power consumption predicting circuit, 144 storage battery operation plan correcting circuit, 145 first management circuit, 146 second management circuit, 202, 207, 211, 402, 407, 411 ammeter, 203 first DC/DC converter, 204 first control circuit, 205, 405 DC bus, 208 first DC/AC converter, 209 second control circuit, 212, 412 communication I/F, 403 second DC/DC converter, 404 third control circuit, 408 second DC/AC converter, 409 fourth control circuit, 811 frequency detecting circuit, 812 second sine wave generating circuit, 833 governor control circuit, 837 mass system computing circuit, 851 third sine wave generating circuit, 853 third PI control circuit, 854 second PWM converter, 855 first current limiting circuit, 600 load.

The invention claimed is:

1. A power conversion device connected to an AC system and equipped with virtual synchronous generator control, the power conversion device comprising:
   a converter to convert a first DC voltage output from a distributed power source into a second DC voltage;
   an inverter to convert the second DC voltage output from the converter into an AC voltage and output the AC voltage to the AC system;
   a communication circuit to receive information necessary for the virtual synchronous generator control given from a management device that manages the distributed power source;
   a first voltmeter to measure the second DC voltage;
   a second voltmeter to measure an AC system voltage of the AC system;
   a converter control circuit to control the converter;
   a virtual synchronous generator control circuit to impart a transient characteristic of a synchronous generator to the inverter; and
   an inverter control circuit to control the inverter as a voltage source, based on AC system voltage information input from the virtual synchronous generator control circuit, wherein
   the information necessary for virtual synchronous generator control includes a power target value of the power conversion device,
   the virtual synchronous generator control circuit calculates a switching frequency at which charge/discharge of the distributed power source is switched, based on the information necessary for virtual synchronous generator control, and the converter control circuit uses the switching frequency to create a frequency range of the AC system voltage for providing a dead zone in which charge/discharge power of the distributed power source is zero in a drooping characteristic of the power conversion device, or a hysteresis in switching of charge/discharge of the distributed power source, and the converter control circuit performs control such that charge/discharge power of the distributed power source becomes zero in the frequency range.

2. The power conversion device according to claim 1, wherein the virtual synchronous generator control circuit includes
a governor control circuit to mimic a governor function of a synchronous generator, and
a mass system computing circuit to mimic a swing equation of the synchronous generator, the governor control circuit calculates an offset value to be added to the power target value, based on a reference frequency of the AC system voltage and a frequency of the AC system voltage, and outputs an addition value of the power target value and the offset value to the mass system computing circuit, and the mass system computing circuit generates a frequency and a phase of the AC system voltage such that a deviation of an effective power of the AC system from the addition value is zero, and outputs the generated frequency and phase to the inverter control circuit.

3. The power conversion device according to claim 1 or 2, wherein the inverter control circuit generates a target AC voltage, based on the AC system voltage information input from the virtual synchronous generator control circuit, and controls the inverter as a voltage source, based on the generated target AC voltage and the AC system voltage measured by the second voltmeter.

4. The power conversion device according to any one of claims 1 to 3, wherein the converter control circuit controls charge/discharge power of the distributed power source such that the second DC voltage measured by the second voltmeter attains a predetermined voltage, and when a frequency of the AC system voltage falls within the frequency range, the converter control circuit performs control such that charge/discharge power of the distributed power source becomes zero.

5. The power conversion device according to any one of claims 1 to 4, wherein when detecting that charge/discharge power of the distributed power source is zero, the converter control circuit determines that a frequency of the AC system voltage falls into the frequency range, and performs control such that charge/discharge power of the distributed power source becomes zero, and when detecting that the frequency of the AC system voltage falls outside the frequency range, the converter control circuit performs control such that charge/discharge for the distributed power source is resumed.

6. The power conversion device according to any one of claims 1 to 5, further comprising an AC frequency detecting circuit to detect a frequency of the AC system voltage,
wherein the converter control circuit detects that the frequency of the AC system voltage falls outside the frequency range, based on a detection result of the AC frequency detecting circuit.

7. The power conversion device according to claim 2, wherein the converter control circuit detects that the frequency of the AC system voltage falls outside the frequency range, based on the addition value input to the mass system computing circuit or frequency information of the AC system voltage output from the mass system computing circuit.

8. The power conversion device according to claim 2, wherein the converter control circuit detects that the frequency of the AC system voltage falls within the frequency range, based on the addition value input to the mass system computing circuit or frequency information of the AC system voltage output from the mass system computing circuit.

9. The power conversion device according to any one of claims 1 to 8, further comprising:
an ammeter to measure an AC current of the AC system; and
an effective power calculating circuit to calculate an AC effective power output by the inverter, based on measurement values of the ammeter and the second voltmeter, wherein the virtual synchronous generator control circuit calculates the drooping characteristic of the power conversion device, based on a capacity of the inverter, the power target value, and a control parameter for virtual synchronous generator control, the drooping characteristic indicates a relation of a differential frequency of a frequency of the AC voltage output by the inverter from a reference frequency of the AC system voltage, to a differential power of the AC effective power from the power target value, and the virtual synchronous generator control circuit calculates the switching frequency, using the drooping characteristic.

10. The power conversion device according to claim 9, wherein when the power target value corresponds to discharge of the distributed power source, the converter control circuit sets the switching frequency to a lower limit frequency of the frequency range and performs control such that discharge power of the distributed power source becomes zero in the frequency range, when the power target value corresponds to charge of the distributed power source, the converter control circuit sets the switching frequency to an upper limit frequency of the frequency range and performs control such that charge power of the distributed power source becomes zero in the frequency range, and when the power target value is zero, the converter control circuit sets the switching frequency to zero, sets the frequency range with the switching frequency at center, and performs control such that charge/discharge power of the distributed power source becomes zero in the frequency range.

11. The power conversion device according to claim 9, wherein when the distributed power source is switched from discharge to charge, the converter control circuit performs control such that charge power of the distributed power source becomes zero, until a frequency of the AC voltage output by the inverter exceeds a frequency obtained by adding a width of the hysteresis to the switching frequency, and when the distributed power source is switched from charge to discharge, the converter control circuit performs control such that charge power of the distributed power source becomes zero, until a frequency of the AC voltage output by the inverter becomes lower than a frequency obtained by subtracting the width of the hysteresis from the switching frequency.

12. The power conversion device according to any one of claims 1 to 11, wherein the converter control circuit receives information on a width of the dead zone or a width of the hysteresis from the management device.

\* \* \* \* \*